(12) United States Patent
Soumiya et al.

(10) Patent No.: US 6,671,257 B1
(45) Date of Patent: Dec. 30, 2003

(54) FEEDBACK CONTROL METHOD AND DEVICE IN ATM SWITCHING SYSTEM

(75) Inventors: Toshio Soumiya, Kanagawa (JP); Koji Nakamichi, Kanagawa (JP); Takeshi Kawasaki, Kanagawa (JP); Naotoshi Watanabe, Kanagawa (JP); Michio Kusayanagi, Kanagawa (JP); Kenichi Kawarai, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 210 days.

(21) Appl. No.: 09/613,597

(22) Filed: Jul. 10, 2000

Related U.S. Application Data

(62) Division of application No. 08/813,707, filed on Mar. 3, 1997, now Pat. No. 6,094,418.

(30) Foreign Application Priority Data

| Mar. 7, 1996 | (JP) | 8-050060 |
| Mar. 8, 1996 | (JP) | 8-051517 |
| Jul. 12, 1996 | (JP) | 8-183517 |
| Feb. 24, 1997 | (JP) | 9-38854 |

(51) Int. Cl.$^7$ .......................... H04L 12/56; G06F 13/00
(52) U.S. Cl. ................ 370/230.1; 370/232; 370/236.1; 370/253; 370/395.1; 709/235
(58) Field of Search ................ 370/229, 230, 370/230.1, 231, 232, 235, 236, 236.1, 252, 253, 389, 395.1, 395.4, 395.41, 465; 709/230, 232, 233, 234, 235, 238

(56) References Cited

U.S. PATENT DOCUMENTS

| 4,551,833 A | 11/1985 | Turner |
| 4,769,815 A | 9/1988 | Hinch et al. |
| 5,193,151 A | 3/1993 | Jain |
| 5,313,454 A | 5/1994 | Bustini et al. |
| 5,521,907 A | 5/1996 | Ennis, Jr. et al. |
| 5,546,377 A * | 8/1996 | Ozveren .................. 370/13 |
| 5,633,859 A * | 5/1997 | Jain et al. .................. 370/234 |
| 5,675,576 A * | 10/1997 | Kalampoukas et al. ..... 370/232 |
| 5,748,901 A | 5/1998 | Afek et al. |
| 5,784,358 A * | 7/1998 | Smith et al. .................. 370/230 |
| 5,864,536 A | 1/1999 | Foglar |
| 5,864,538 A | 1/1999 | Chong et al. |

FOREIGN PATENT DOCUMENTS

| DE | 40 09 542 A1 | 9/1991 |
| DE | 41 34 476 C1 | 6/1993 |
| DE | 44 47 240 C1 | 5/1996 |
| DE | 19531 611 | 11/1996 |
| DE | 195 27 061 A1 | 1/1997 |
| EP | 0 661 851 A2 | 7/1995 |
| EP | 0 782 302 A2 | 7/1997 |
| GB | WO 97/01913 | 1/1997 |

OTHER PUBLICATIONS

Kaltenbach et al., "Das grosse Computer Lexikon," Markt & Technik, Verlag AG 1990, p. 177, 201, 295, 303.

German Office Action, with partial translation, dated Feb. 8, 2000.

* cited by examiner

*Primary Examiner*—Alpus H. Hsu
(74) *Attorney, Agent, or Firm*—Katten Muchin Zavis Rosenman

(57) ABSTRACT

In an ATM switching system, an ABR service is implemented with a specific ABR control capability. A subscriber line processing device includes calculating a turnaround delay time of a cell, based on a period during which the cell doubles back at a terminal. A switch or a demultiplexer capable of detecting congestion. A rate calculator calculates a transmission rate corresponding to an output channel, and writes the calculated rate to the cell. A rate changer changes the transmission rate according to congestion. The rate changer counts the number of communicating connections. Then the number of communicating connections which should exist in a certain predetermined period is estimated based on the counted number of communicating connections. A coefficient is determined based on the estimated number of communicating connections and an actual number of communicating connections, and a next estimated value is estimated using the coefficient.

18 Claims, 45 Drawing Sheets

PARAMETER STORING MEMORY

| CONNECTION IDENTIFIER | SEQUENCE NUMBER SN | B-RM CELL ARRIVAL TIME T0 |
|---|---|---|
|  |  |  |
|  |  |  |
|  |  |  |

⋮   ⋮   ⋮

F I G. 4

MEASURED DELAY TIME STORING MEMORY

| CONNECTION IDENTIFIER | MEASURED DELAY TIME $T_1$ | MEASURED DELAY TIME $T_2$ | ... | MEASURED DELAY TIME $T_N$ |
|---|---|---|---|---|
| ... | ... | ... | ... | ... |

FIG. 5

METHOD FOR DETERMINING DELAY PARAMETERS $\tau_2$ AND $\tau_3$ BASED ON EXPONENTIAL DISTRIBUTION

ACTIVE VC TABLE

FIG. 9

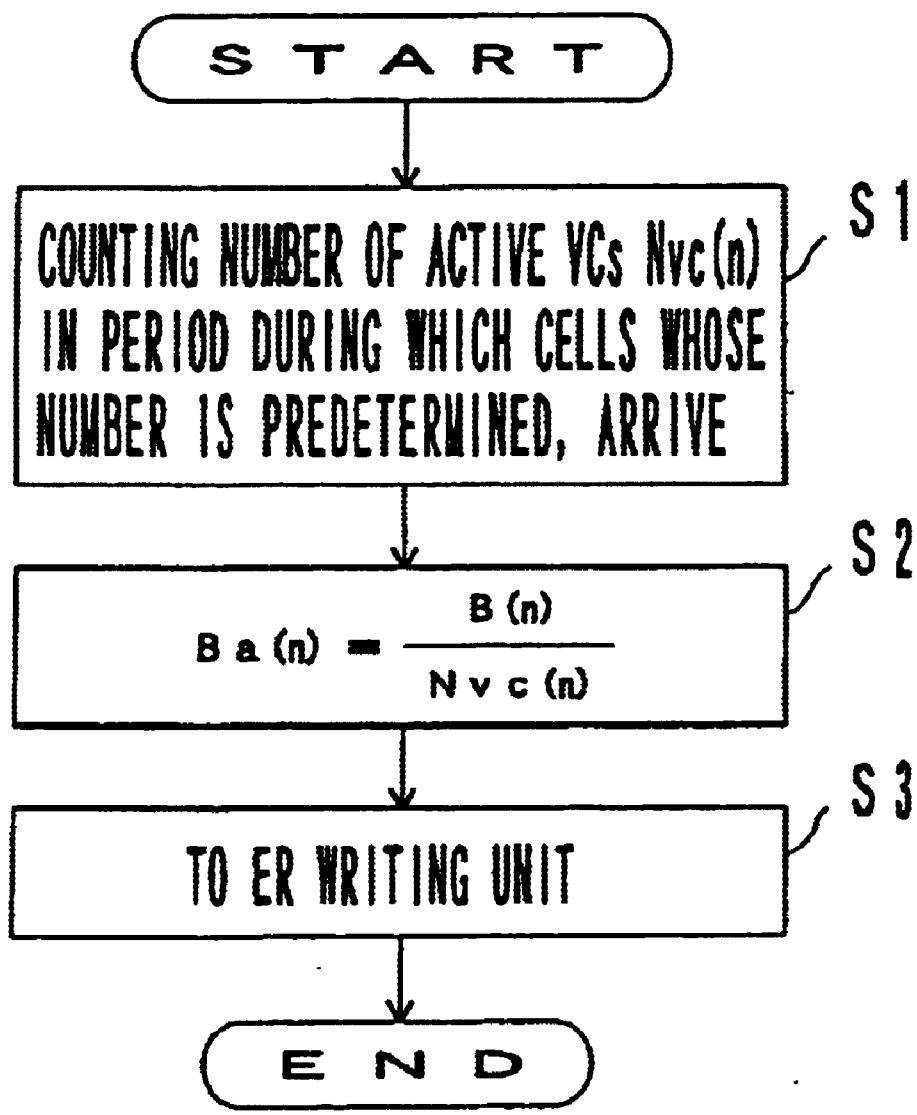
F I G. 1 0

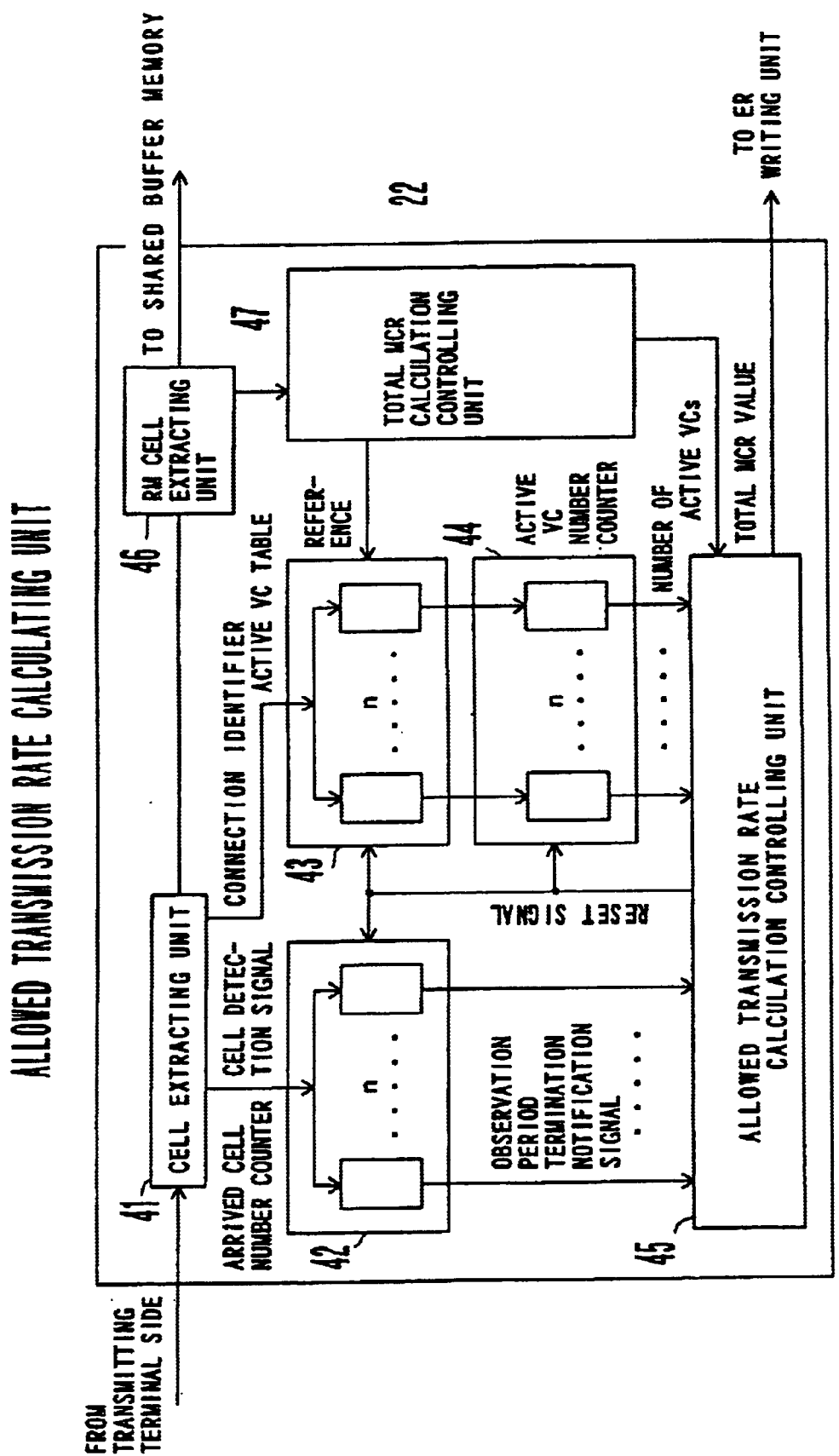
F I G. 12

FIG. 13

ER CHANGE PARAMETER TABLE

| ADDRESS MANAGEMENT THRESHOLD VALUE | DECREASING COEFFICIENT |
|---|---|
| TH1 | $\alpha 1$ |
| TH2 | $\alpha 2$ |
| TH3 | $\alpha 3$ |
| ⋮ | ⋮ |
| THm | $\alpha m$ |

FIG. 19

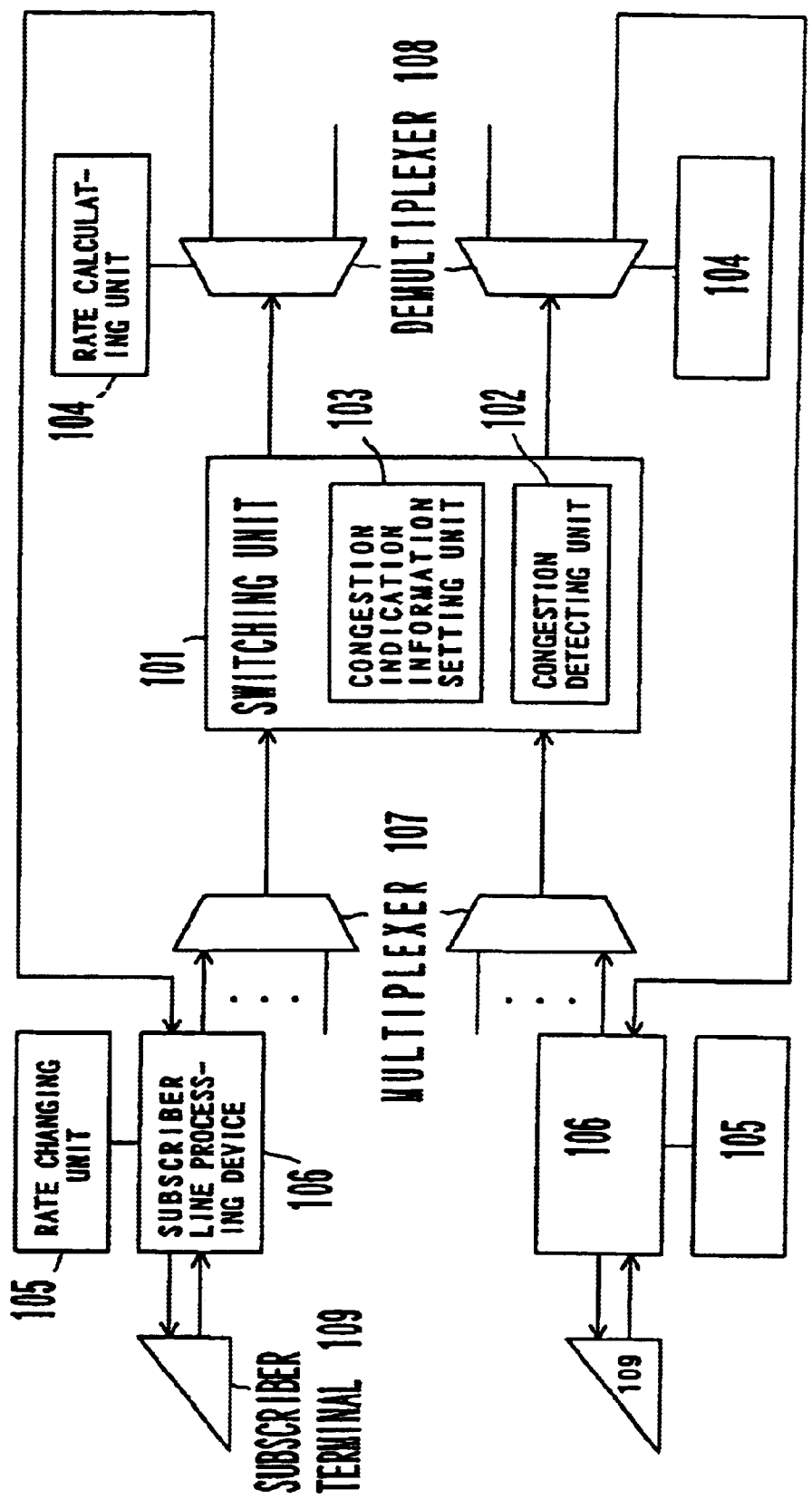
F I G. 2 0

STRUCTURE OF ACTIVE CONNECTION STORING TABE MEMORY

| CONNECTION IDENTIFIER | CELL ARRIVAL IDENTIFICATION FLAG |
|---|---|
| | |
| ... | ... |
| | |

MAXIMUM NUMBER OF CONNECTIONS WHICH CAN BE STORED "L"

FIG. 33

CONNECTION NUMBER COUNTING METHOD USING ESTIMATE (1)

$T_M$ : OBSERVATION PERIOD (FIXED TIME)
$T$ : DURATION DURING WHICH "N" COMMUNICATING CONNECTIONS ARE OBSERVED
$N$ : COMMUNICATING CONNECTION NUMBER OBSERVATION THRESHOLD VALUE
$N_{ACTIVE}$ : NUMBER OF COMMUNICATING CONNECTIONS OBSERVED UNTIL TIME $T_M$ ELAPSES
$\alpha$ : ESTIMATE MODIFYING COEFFICIENT

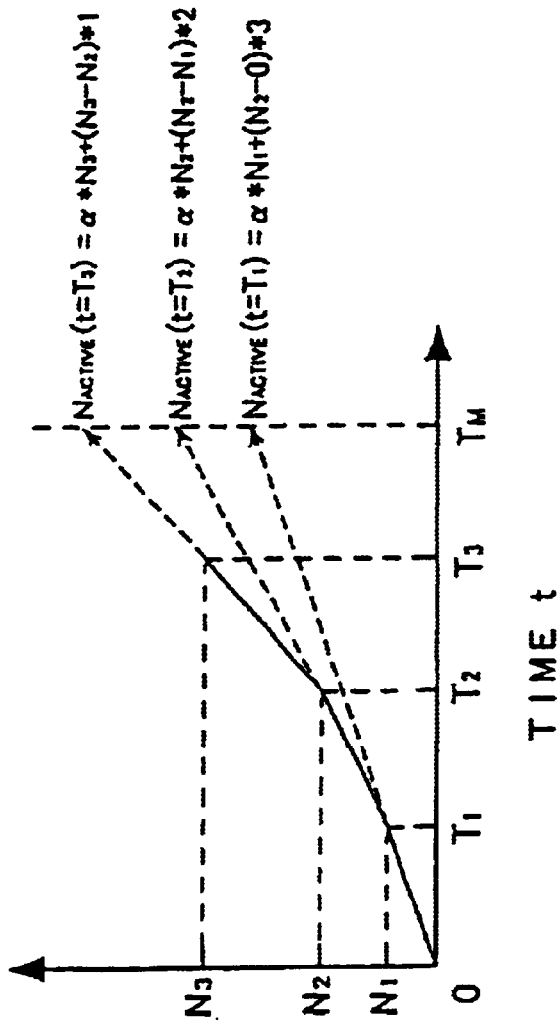
F I G. 41

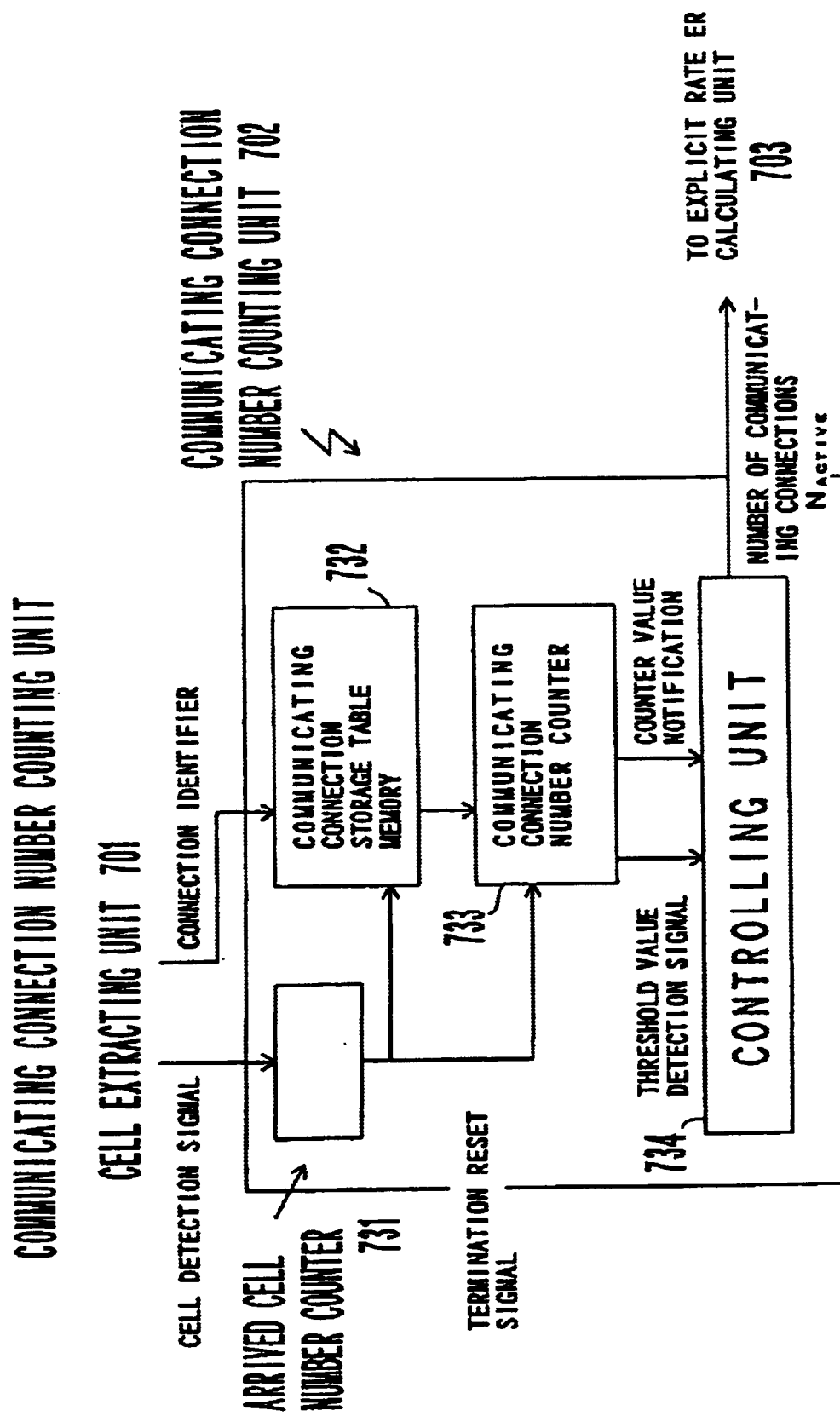
F I G. 4 2

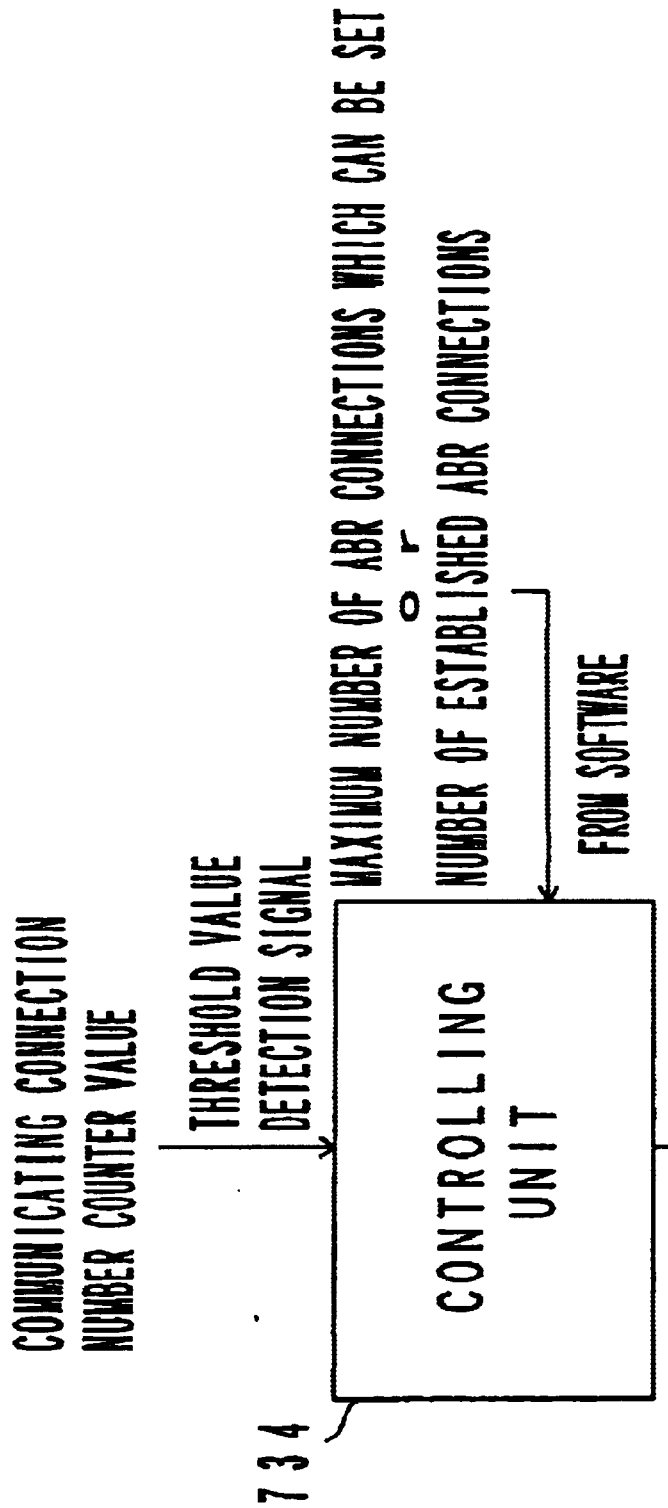
F I G. 43

FEEDBACK CONTROL METHOD AND DEVICE IN ATM SWITCHING SYSTEM

This application is a divisional application of allowed U.S. application Ser. No. 08/813,707, filed on Mar. 3, 1997, now U.S. Pat. No. 6,094,418.

BACKGROUND OF THE INVENTION

1. Field of the Invention

The present invention relates to a technology for preventing a network congestion based on feedback control, in an ABR (Available Bit Rate) communication service.

2. Description of the Related Art

Currently, the ATM Forum and ITU-T propose a service called the ABR service as a service for applying a data exchange technique implemented with an ATM (Asynchronous Transfer Mode) method, to a high-speed data communications network such as a LAN (Local Area Network), WAN (Wide Area Network), etc. With the ABR service, a switch feeds congestion information in a network back to a transmitting terminal, thereby avoiding congestion in the network. More specifically, the switch changes a transmission rate of the transmitting terminal while monitoring a use state of network resources, so that the network is efficiently operated, and congestion and a cell loss in the network can be prevented, in the ABR service. Provided below is the explanation about the ABR service.

<ABR Service>

In a communication system using the ABR service, a resource management cell (hereinafter abbreviated to an RM cell) is used to notify information about network resources of a terminal. A transmitting terminal transmits the RM cell each time it transmits a predetermined number of user data cells. The RM cell reaches a receiving terminal via an ATM network, and doubles back to the transmitting terminal.

FIG. 1 is a schematic diagram showing the format of the RM cell. In the same manner as a user data cell, the RM cell is composed of a 5-byte (or 5-octet) header and a 48-byte payload as shown in this figure.

A GFC/VPI field in the header is used as a GFC (General Flow Control) field in a UNI (User Network Interface), while it is used as part of a VPI (Virtual Path Identifier) field in an NNI (Network Node Interface). Accordingly, the virtual path identifier VPI is handled as 8bits in the UNI, while it is handled as 12 bits in the NNI. Furthermore, a VCI field indicates a virtual channel identifier of 16 bits, and a PT field indicates a payload type of 3 bits, in the header. If the value of the payload type is "000", it indicates a user cell of no (without) congestion. If the value of the payload type is "110", it indicates an RM cell. A CLP field indicates a cell loss priority indication of 1 bit. An HER field indicates a header error control of 8bits.

In the 48-byte payload of the RM cell, an RM PROTOCOL ID field of 1 byte is an RM protocol identifier, and a DIR field of 1 bit is a direction indication bit. If the value of the DIR field is "0", it indicates an F-RM cell (Forward RM cell). If the value of the DIR field is "1", it indicates a B-RM cell (Backward RM cell). A BN field of 1 bit indicates a backward explicit congestion notification bit indicating a B-RM cell generated in a switch or a receiving terminal in an ATM network. A CI field of 1 bit indicates a congestion indication bit. An NI field of 1 bit indicates a cell rate no increase bit. An RA field of 1 bit indicates a request acknowledge response bit which is not used in an ABR service. Res fields of 3 bits indicate unused bits.

An ER field of 2 bytes indicates an explicit cell rate. A CCR field of 2 bytes indicates a current cell rate. An MCR field of 2 bytes indicates a minimum cell rate that is declared when a connection is established. A QL field of 4 bytes indicates a queue length which is unused in an ABR service according to an ATM forum regulation. An SN field of 4 bytes indicates a sequence number. Res fields of 30 bytes plus 6 bits indicate unused bits. A CRC field of 10 bits indicates a cyclic redundancy code check bit.

An ATM switch in an ATM network notifies information about the network to a transmitting terminal by writing resource information (band information and congestion information) about the condition of the switch to an RM cell passing through the switch. The transmitting terminal which receives the RM cell to which the band and congestion information, etc. are written, recalculates its ACR (Allowed Cell Rate) according to the information, and makes a communication at a rate equal to or lower than the ACR.

Furthermore, the transmitting terminal declares/negotiates a PCR (Peak Cell Rate) which is a maximum transmission rate, and an MCR (Minimum Cell Rate) which is a minimum request rate, to/with the network, at the beginning of the communication. The transmitting terminal cannot transmit ATM cells (hereinafter referred to as cells) at a rate higher than the PCR which is determined by the negotiation. Additionally, the ATM network secures a rate equal to or higher than the MCR determined by the negotiation. Therefore, the ACR at the transmitting terminal varies between the MCR and the PCR ($MCR \leq ACR \leq PCR$).

With these operations, the ATM network side can avoid and be restored from the congestion, and the terminal side can transmit cells at a high rate on the condition that the network resources are not congested.

<Operations Performed by an ABR Terminal>

Operations performed by a transmitting terminal (ABR transmitting terminal) and a receiving terminal (ABR receiving terminal), which use the ABR service to make communications, are the target of standardization in the ATM Forum. Provided below is the brief explanation about the principal operations performed by these terminals.

ABR Transmitting Terminal:

The transmitting terminal transmits cells at a rate equal to or lower than the allowed cell rate ACR at each time point. The ABR transmitting terminal transmits one RM cell each time it transmits a predetermined number (Nrm-1) of user data cells. When receiving the RM cell, the transmitting terminal increases the ACR by a predetermined value if the CI (Congestion Indicator) bit, which is the congestion indication bit in the RM cell, is set to "0" (indicating non-congestion). On the other hand, the transmitting terminal decreases the ACR by a predetermined value if the CI bit is set to "1" (indicating congestion). Simultaneously with the above described operations, the transmitting terminal makes a comparison between an explicit rate ER (Explicit Rate) included in the RM cell and the previously recalculated ACR, and defines the lower rate as a new ACR. Note that, however, the value of the ACR must be within a range of $MCR \leq ACR \leq PCR$.

For an F-RM cell transmission, the transmitting terminal sets the peak cell rate PCR, which is declared by the user at the time of establishing a cell-call, in the ER field of the F-RM cell, sets the allowed cell rate ACR in the CCR field, and sets the minimum cell rate MCR in the MCR field.

When receiving a B-RM cell, the transmitting terminal can raise the cell rate within a range which is not beyond the peak cell rate PCR, according to a predetermined rule, on the condition that the congestion indication bit CI indicates non-congestion, and the cell rate no increase bit NI indicates that the cell rate can be increased. If the congestion indication bit CI indicates congestion, the transmitting terminal lowers the cell rate within a range which is not lower than the minimum cell rate MCR, according to a predetermined rule. Accordingly, the allowed cell rate ACR of the transmitting terminal is changed within the range MCR≦ACR≦PCR. If congestion does not occur in the ATM network, the transmitting terminal performs a transmission at the peak cell rate PCR or a cell rate close to the PCR.

ABR Receiving Terminal:

An ABR receiving terminal terminates a user data cell transmitted from a transmitting terminal, and returns a received RM cell to the transmitting terminal. If an EFCI (Explicit Forward Congestion Indication) bit indicating whether or not congestion occurs is set to "1" in the user data cell which is received immediately before the reception of the RM cell at that time, the receiving terminal assigns the value "1" to the congestion indication bit CI in the RM cell to be returned, and returns that RM cell.

<Operations Performed by an ATM Switch>

Operations for implementing the ABR service, which are performed on an ATM network side, that is, operations performed by an ATM switch, are grouped into two major types, and respectively called an EFCI mode and an ER mode.

A switch in the EFCI mode sets the EFCI bit in a user data cell passing through the ATM switch in a congested state. With this setting, the congestion in the switch can be notified to the receiving terminal, which then returns the RM cell whose CI bit is set by the receiving terminal itself. As a result, the congestion can be notified to the transmitting terminal.

A switch in the ER mode calculates a rate at which terminals can perform a transmission based on a congested state, and an available band in the switch, also calculates the explicit rate ER which is a rate at which a transmitting terminal is allowed to perform a transmission, and writes that ER to the ER field of an RM cell passing through the ATM switch in a forward direction (from the transmitting side to the receiving side), or in a backward direction (from the receiving side to the transmitting side). With these operations, the ATM switch can directly instruct the terminals of the rate, thereby performing rate control more precisely.

Furthermore, the switch itself can generate an RM cell, and transmit the generated RM cell to the transmitting terminal in addition to an RM cell transmitted from a terminal, regardless of the EFCI mode or the ER mode. At this time, the ATM switch can set the CI bit in the RM cell, or write a calculated explicit rate ER to the generated RM cell, depending on its congested state or available band.

The ATM Forum targets the above described operations as the ATM switch operations to be standardized. A specific control method or an implementation method, however, are not the target of standardization. For example, a method for detecting a congested state in an ATM switch, or an algorithm for calculating the explicit rate ER, is not to be standardized.

To assure a communication quality for each user in an ATM network, a rate of flow of cells from each user is monitored in a UNI (User-Network Interface), which is a network-terminal interface arranged at an entry point of the network. If cells exceeding an allowed rate are transmitted, a UPC (Usage Parameter Control) capability for discarding those violation cells, etc. must be provided.

If violation cells are allowed to flow into the network, congestion occurs due to a massive flow of cells into a communications channel. Therefore, there is a possibility that the quality of communications, not only of that user but also another user, cannot be assured. Since it must be also monitored whether or not the user observes a rate instructed from the network by an RM cell in addition to a rate of flow of cells contracted between the user and the network at the time of establishment of the call, the monitoring rate under the UPC control must dynamically be changed depending on the contents of the RM cell.

Under the UPC control, a switch cannot change the monitoring rate immediately after it writes an ER or congestion indication to an RM cell. This is because a delay is caused due to a time required for the following operations: the RM cell reaching a transmitting terminal; the transmitting terminal changing the ACR depending on the contents of the received RM cell; and the cell transmitted after that reaching the ATM switch. Therefore, the monitoring rate must be changed after a turnaround delay time elapses. The ATM switch making the ABR communication therefore needs to measure a delay time required for the UPC.

In the ABR communication, the monitoring rate must be changed after the ER written to the RM cell is changed according to the monitoring rate in the UNI, and the above described amount of delay time elapses.

To possibly prevent a user side from erroneously determining a cell as a violation cell in the UPC, when the user side obeys an instruction from a switch, the ATM Forum and the ITU-T are currently discussing whether or not to make the UPC lower the rate according to the maximum value $\tau_2$ of a delay time, or raise the rate according to a minimum value $\tau_3$ of the delay time.

Since the transmitting terminal terminates an RM cell which has returned from the switch to the transmitting terminal, the total amount of transmission time obtained by adding a travel time of the cell transmitted from the switch to the transmitting terminal to the travel time of the cell transmitted from the transmitting terminal to the switch, may be used as the above described amount of delay time to be measured.

Because clock phases for measuring delays on both on the transmitting and switch sides must be synchronous with high precision in order to define the above described total amount as an accurate delay time, this is difficult to realize.

Additionally, the following two problems must be overcome in order to implement the ABR service in an ATM switching system.

Problem 1: Operations performed by an ABR terminal are the target of standardization as described above, but specific operations performed by an ATM switch are not the target of standardization. Accordingly, the ATM switch must include a control capability for implementing the operations of the above described EFCI mode or ER mode in order to support the ABR service in the ATM switch. Consequently, the ATM switch requires a new control capability which is not included in a conventional ATM switch.

Problem 2: Since a switching speed of an ATM switch is remarkably high in a large scale ATM switching system, a capability of calculating/changing the explicit rate ER can hardly be implemented in all of the buffers.

SUMMARY OF THE INVENTION

The present invention aims at overcoming the above described problems. A first object of the present invention is to provide a delay time measuring method which can monitor and control a flow of cells flowing from a transmitting terminal to a network in an ABR communication by setting a suitable value as a delay parameter to be set in a UPC. A second object of the present invention is to provide an ABR control method and an ABR control system which can avoid congestion, and improve line use efficiency at the same time. A third object of the present invention is to provide a specific ABR control capability which can accommodate the ABR service even in a large-scale ATM switching system, etc.

A method according to the present invention is a method for measuring a delay time by a switch in an ATM network providing an ABR service. This method comprises the steps of detecting a first RM cell flowing in a first direction in the ATM network; storing an arrival time, connection identifier, and a sequence number of the detected first RM cell; obtaining an arrival time of a second RM cell, which flows in a second direction opposite to the first direction, when the second RM cell, having the same connection identifier and sequence number as the stored connection identifier and sequence number, arrives; and calculating a turnaround delay time required in a period during which an RM cell arrives at the switch, doubles back at an ABR terminal, and returns to the switch, by subtracting the arrival time of the first RM cell from the arrival time of the second RM cell.

This method may further comprise the steps of measuring the turnaround delay time in a direction of an ABR connection an "N" (an arbitrary number) number of times, if ABR connections are bidirectionally established between terminals; and setting maximum and minimum values of the measured turnaround delay times as maximum and minimum values of delay parameters used in a UPC, for an ABR connection in a different direction.

Additionally, this method may further comprise the steps of once measuring the turnaround delay time in a direction of an ABR connection, if ABR connections are bidirectionally established between terminals; and setting maximum and minimum values of turnaround delay times calculated based on an exponential distribution whose average is the measured turnaround delay time, as maximum and minimum values of delay parameters used in a UPC, for an ABR connection in a different direction.

A switch according to the present invention is a switch in an ATM network providing an ABR service. The switch comprises a first detecting unit for detecting a first RM cell flowing in a first direction in the ATM network; a storing unit for storing an arrival time, connection identifier, and a sequence number of the first RM cell detected by the first detecting unit; a second detecting unit for detecting a second RM cell flowing in a second direction in the ATM network; and a calculating unit for calculating a turnaround delay time required in a period during which an RM cell arrives at the switch, doubles back at an ABR terminal, and returns to the switch, by subtracting the arrival time of the first RM cell from the arrival time of the second RM cell, if the connection identifier and sequence number of the second RM cell match the connection identifier and sequence number of the first RM cell, which are stored in said storing unit.

The switch may further comprise a UPC parameter controlling unit for measuring the turnaround delay time in a direction of an ABR connection an "N" (an arbitrary integer) number of times, and setting maximum and minimum values of measured turnaround delay times as maximum and minimum values of delay parameters used in a UPC, for an ABR connection in a different direction, if ABR connections are bidirectionally established between terminals.

Additionally, the switch may further comprise a UPC parameter controlling unit for measuring the turnaround delay time in a direction of an ABR connection, and setting maximum and minimum values of the turnaround delay time calculated based on an exponential distribution whose average is the measured turnaround delay time, as maximum and minimum values of delay parameters used in a UPC, for an ABR connection in a different direction, if ABR connections are bidirectionally established between terminals.

A storage medium according to the present invention is a computer-readable storage medium. The storage medium stores a program which executes the above described method for measuring a delay time according to the present invention in a switch in an ATM network providing an ABR service.

An ABR controlling method according to the present invention is a method for notifying an allowed transmission rate to a terminal of an ATM network. This method comprises the steps of obtaining the number of active connections in which one or more cells arrive during an observation period, in correspondence with an output channel; and notifying a value obtained by dividing a band of the output channel by the number of active connections, to a transmitting terminal, as the allowed transmission rate. Accordingly, the transmission rate suitable for the number of active connections, can be set.

Another ABR controlling method according to the present invention is a method for notifying an allowed transmission rate to a transmitting terminal in an ATM network. This method comprises the steps of obtaining a number of active connections in which one or more cells arrive during an observation period, in correspondence with an output channel; subtracting a value which is a total of minimum cell rates of the active connections corresponding to the output channel from a band of the output channel, dividing the result of the subtraction by the number of active connections, and adding the minimum cell rate corresponding to each of the active connections to the divided value, and notifying the allowed transmission rate to the transmitting terminal. With this process, the allowed transmission rate can be set in order not to be lower than the minimum cell rate.

The above described ABR controlling method may further comprise the steps of setting an arbitrary number of threshold values for at least either of a shared buffer memory which temporarily stores cells from a transmitting terminal, and an address management FIFO buffer memory which manages addresses of the shared buffer memory; setting a decreasing coefficient in correspondence with any of the threshold values; and notifying a value obtained by multiplying the allowed transmission rate by the decreasing coefficient corresponding to any of the threshold values, to the transmitting terminal, when an amount of storage exceeds any of the threshold values. Accordingly, the allowed transmission rate obtained based on the band of an output channel and the number of active VCs (virtual connections), is adjusted according to a state prior to an occurrence of congestion, thereby preventing congestion without fail.

Additionally, this method may further comprise the step of notifying the allowed transmission rate to the transmitting terminal as the minimum cell rate, when the amount of stored cells exceeds a particular threshold value.

Furthermore, a number of arrived cells is counted for each output channel, and a period during which a predetermined number of cells arrive, is designated as an observation period, according to this method.

Still further, the observation period is designated as a fixed period, according to this method. The fixed period is set, for example, by a timer.

An ABR controlling system according to the present invention is a system for notifying an allowed transmission rate of a transmitting terminal in an ATM network, as shown later in FIG. 7. The system comprises a shared buffer memory for temporarily storing cells transmitted from a transmitting terminal; an allowed transmission rate calculating unit for calculating the allowed transmission rate in correspondence with an output channel; an address management FIFO buffer memory for managing addresses of cells stored in said shared buffer memory; a congestion detection controlling unit for detecting congestion based on an amount of storage of the address management FIFO buffer memory or the shared buffer memory; and ER writing unit for writing the allowed transmission rate received from the allowed transmission rate calculating unit as it is, or a value obtained by lowering the allowed transmission rate according to a congestion notification signal received from the congestion detection controlling unit, to an RM cell, in order to notify the allowed transmission rate to the transmitting terminal, wherein the allowed transmission rate calculating unit obtains a number of active connections in which one or more cells arrive during an observation period, for each output channel, and calculates the allowed transmission rate by dividing the band of the output channel by the obtained number.

The allowed transmission rate calculating unit may comprise an arrived cell number counter for counting a number of arrived cells in correspondence with an output channel, and designating an observation period when the counted number reaches a predetermined number; an active VC (virtual connection) table to which a connection identifier of an arrived cell, which corresponds to the output channel, is written; an active VC number counter for obtaining the number of active VCs by counting the connection identifier which corresponds to the output channel, and is written to the active VC table; and an allowed transmission rate calculation controlling unit for calculating the allowed transmission rate by dividing the band of the output channel by the number of active VCs counted by the active VC number counter which corresponds to the output channel for which the arrived cell number counter counts the predetermined number of cells.

This unit may further comprise a total MCR calculation controlling unit for outputting a total MCR value by adding a minimum cell rate of an active connection for each output channel; an active VC number counter for obtaining the number of active connections during an observation period; and an allowed transmission rate calculation controlling unit for calculating the allowed transmission rate by subtracting the total MCR value during the observation period, which is obtained by the total MCR calculation controlling unit, from the band of the output channel, dividing the subtracted value by the number of active connections, and adding the minimum cell rate corresponding to the connection, to the divided value.

The ER writing unit may comprise an ER change parameter table in which a plurality of threshold values corresponding to the amount of storage of the address management FIFO buffer memory or said shared buffer memory, and decreasing coefficients corresponding to the plurality of threshold values, are set; and an ER calculating unit for multiplying the allowed transmission rate from said allowed transmission rate calculating unit, by the decreasing coefficient read from said ER change parameter table, based on information conveying that the amount of storage of said address management FIFO buffer memory or said shared buffer memory exceeds the plurality of threshold value.

A storage medium according to the present invention is a computer-readable storage medium, and stores a program which executes the above described ABR controlling method for notifying an allowed transmission rate of a terminal in an ATM network providing an ABR service.

An ATM switching system according to the present invention is a system for adjusting a transmission rate of cells by feeding back a congested state in the ATM switching system. The system comprises a congestion detecting unit for detecting a congested state of the ATM switching system; a congestion indication information setting unit for setting congestion indication information for indicating the congested state, in the cell switched by the ATM switching system, according to the congested state detected by the congestion detecting unit; a rate calculating unit for calculating an explicit rate for assigning a transmission rate to a transmission channel of a cell which relates to an occurrence of the congested state; and a rate changing unit for detecting an occurrence ratio of congestion in the transmission channel, changing the explicit rate based on the occurrence ratio, and reassigning the changed explicit rate to the cell fed back to the terminal.

The rate changing unit may make a comparison between the occurrence ratio of the congestion and a predetermined threshold value, and change the explicit rate calculated by said rate calculating unit based on the result of the comparison. Additionally, the rate changing unit may change the explicit rate, by dividing the explicit rate calculated by said rate calculating unit by a divisor value determined based on the result of the comparison. Furthermore, the rate changing unit may detect a number of cells in which the congestion indication information is set, which arrived during a predetermined observation period, and recognize the occurrence ratio of the congestion according to the number of arrived cells. Still further, the rate changing unit may recognize the occurrence ratio of the congestion based on an arrival interval of cells in which the congestion indication information is set. Still further, the rate changing unit may smooth a setting ratio of the congestion indication information included in a received cell, based on the setting ratio of the congestion indication information recognized before receiving the cell, make a comparison between the smoothed setting ratio and a predetermined threshold value, and change the explicit rate calculated by said rate calculating unit based on the result of the comparison.

Still further, the rate changing unit smooths a setting ratio of the congestion indication information included in a received cell, based on the following equation:

$$C(n)=\beta \cdot \text{Now}(n)+(1-\beta) \cdot C(n-1)$$

C(n): the setting ratio after a current smoothing operation.
β: a weight ($0 \leq \beta \leq 1$).
Now(n): an unsmoothed setting ratio which is currently detected.
C(n−1): the setting ratio after a previous smoothing operation.

Still further, the rate changing unit may make a comparison between a setting ratio of the congestion indication information included in a received cell, and a plurality of predetermined threshold values, determine one of a plurality of predetermined values according to the plurality of predetermined threshold values, based on the comparison, and change the explicit rate calculated by the rate calculating unit, based on the determined value.

Still further, the rate changing unit may change the explicit rate calculated by said rate calculating unit, by a predetermined ratio, when a user data cell in which the congestion indication information is set arrives in a certain observation period.

The congestion indication information setting unit may set the congestion indication information as an explicit forward congestion indication bit in a payload type field in a header of the user data cell.

Additionally, the rate calculating unit may assign the calculated explicit rate to a resource management cell which is transmitted on the transmission channel and fed back to the terminal, while the rate changing unit may extract a resource management cell to which the explicit rate calculated by the rate calculating unit is assigned, change the explicit rate assigned to the resource management cell based on the occurrence ratio of the congestion, reassign the changed explicit rate to the extracted resource management cell, and retransmit the resource management cell to the transmission channel.

Furthermore, the rate calculating unit may count a number of active virtual connections in a transmission channel for each output channel, divide a transmission rate assigned for each output channel by the number of active virtual connections for each output channel, and calculate the explicit rate based on the result of the division.

Still further, the rate calculating unit may be arranged in correspondence with a demultiplexer which demultiplexes transmission channels in the ATM switching system. Still further, the rate calculating unit may be arranged in correspondence with an SRM which configures a switching unit in the ATM switching system.

An ATM switching method according to the present invention is a method for adjusting a transmission rate of a cell by feeding a congested state in an ATM switching system, back to a terminal. The method comprises the steps of detecting a congested state in an ATM switching system; setting congestion indication information for indicating the congested state in a cell switched in the ATM switching system, according to the detected congested state; calculating an explicit rate designating a transmission rate for a transmission channel of a cell relating to an occurrence of the congested state; and detecting an occurrence ratio of congestion in the transmission channel, changing the explicit rate based on the occurrence ratio, and assigning the changed explicit rate to the cell fed back to the terminal.

The method may further comprise the step of making a comparison between the occurrence of the congestion and a predetermined threshold value, and changing the explicit rate based on the result of the comparison. Additionally, this method may further comprise the step of changing the explicit rate by dividing the explicit rate by a divisor value determined based on the result of the comparison. Furthermore, the method may further comprise the step of detecting a number of cells in which the congestion indication information is set, which arrived during a predetermined observation period, and recognizing the occurrence ratio of the congestion according to the number of arrived cells. Still further, this method may comprise the step of recognizing the occurrence ratio of the congestion, based on an arrival interval of cells in which the congestion indication information is set.

The ATM switching method according to the present invention may further comprise the steps of smoothing a setting ratio of the congestion indication information included in a cell, based on the setting ratio of the congestion indication information, which is recognized before receiving the cell; making a comparison between the smoothed setting ratio and a predetermined threshold value; and changing the explicit rate based on the result of the comparison.

This method may further comprise the step of smoothing the setting ratio of the congestion indication information included in a cell, based on the following equation:

$$C(n) = \beta \cdot \text{Now}(n) + (1-\beta) \cdot C(n-1)$$

$C(n)$: the setting ratio after a current smoothing operation.

$\beta$: a weight ($0 < \beta \leq 1$).

$\text{Now}(n)$: an unsmoothed setting ratio which is currently detected.

$C(n-1)$: the setting ratio after a previous smoothing operation.

Furthermore, this method may further comprise the steps of making a comparison between a setting ratio of the congestion indication information included in a cell and a plurality of predetermined threshold values; determining one of a plurality of predetermined values according to the plurality of predetermined threshold values, based on the comparison; and changing the explicit rate based on the determined value.

A storage medium according to the present invention is a computer-readable storage medium, and stores a program executing the above described ATM switching method for notifying an allowed transmission rate in an ATM network providing an ABR service to a terminal.

A communicating connection number counting system according to the present invention is a system for use in a cell switching network controlling an interval of a packet (cell) transmission at a transmitting terminal according to a state of the network. The system comprises a cell extracting unit for detecting a cell switched in the cell switching network; a connection counter for counting a number of connections in which at least one packet (cell) arrives, detected by said cell extracting unit, as a number of communicating connections; and a controlling unit for determining the number of communicating connections, which is recognized by said connection counter, before a predetermined period elapses from an observation start point.

The observation start point may be defined as a time point at which a cell arrives in said cell extracting unit, while the predetermined period may be defined as a period during which a predetermined number of cells arrive in said cell extracting unit. Additionally, the observation start point may be defined as a time point, while the predetermined period may be defined as a time interval.

The controlling unit may determine the number of communicating connections, each time a predetermined number of cells arrives in said cell extracting unit. Additionally, the controlling unit may determine the number of communicating connections at predetermined time intervals.

A second communicating connection number counting system according to the present invention is a system for use in a cell switching network controlling an interval of a packet (cell) transmission at a transmitting terminal according to a state of the network. The system comprises a cell extracting unit for detecting a cell switched in the cell switching network; a connection counter for counting a number of connections in which at least one packet (cell) arrives, detected by said cell extracting unit, as a number of communicating connections; and a controlling unit for estimating and determining the number of communicating connections to be recognized by said connection counter, after a predetermined time TM elapses from an observation start point.

The controlling unit may define an amount of time during which predetermined "N" communicating connections are recognized, from the observation start point, as "T", and determine the number of communicating connections after the time TM elapses from the observation start point as $N_{ACTIVE} = \alpha \times N \times TM/T$, by using a coefficient $\alpha$.

Additionally, the controlling unit may count an actual number of communicating connections $N_{ACTIVE-R}$ within the time TM from the observation start point, determine a new coefficient $\alpha$ by making a comparison between the $N_{ACTIVE-R}$ and the $N_{ACTIVE}$, and use the new coefficient $\alpha$ in order to determine a next number of communicating connections.

Furthermore, the controlling unit may define a period during which predetermined "Ni" communicating connections are recognized, from the observation start point, as a time "Ti", and determine the number of communicating connections $N_{ACTIVE}$ after the time TM elapses from the observation start point, as $N_{ACTIVE} = Ni \times TM/Ti$, each time the time Ti elapses.

Still further, the controlling unit may divide the time TM into "n" shorter periods Tks, define the number of communicating connections, which is recognized until a shorter period Tk elapses from the observation start point, as a number "N", and determine the number of communicating connections $N_{ACTIVE}$ after the time TM elapses from the observation start point, as $N_{ACTIVE} = N \times n$.

Still further, the controlling unit may divide the time TM into "n" shorter periods Tks, define the number of communicating connections, which is recognized until a shorter period Tk elapses from the observation start point, as a number "N", determine the number of communicating connections $N_{ACTIVE}$ after the time TM elapses from the observation start point, as $N_{ACTIVE} = \alpha \times N \times n$, count an actual number of communicating connections $N_{ACTIVE-R}$ within the time TM from the observation start point, determine a new coefficient $\alpha$ by making a comparison between the $N_{ACTIVE-R}$ and the $N_{ACTIVE}$, and use the new coefficient $\alpha$ in order tong determine a next number of communicating connections.

Still further, the controlling unit may divide the time TM into "n" shorter periods Tks, define the number of communicating connections, which is recognized within a shorter period Tk, each time the shorter period Tk elapses, as a number "Nk", and determine the number of communicating connections $N_{ACTIVE}$ as $N_{ACTIVE} = Nk + (Nk - Nk - 1) \times (n-k)$, each time the shorter period Tk elapses from the observation start point,.

The communicating connection number counting system may further comprise a storing unit for storing a connection identifier of a cell which has arrived in said cell extracting unit, and setting an identification flag in correspondence with the connection identifier if the connection identifier has not been stored, wherein the controlling unit may set a maximum number "M" of connections which can be set in a switch, as the $N_{ACTIVE}$ when the number of communicating connections counted by said connection counter, until the predetermined time TM elapses from the observation start point, exceeds a maximum number "L" of connections which can be stored in said storing unit.

If the $N_{ACTIVE}$ exceeds the maximum number "M" of connections which can be set in the switch, the number of connections established in the switch is set as the $N_{ACTIVE}$.

If the $N_{ACTIVE}$ exceeds the maximum number "M" of connections which can be set in the switch, the number of connections which are currently established in the switch is set as the $N_{ACTIVE}$.

The communicating connection number counting method according to the present invention is a method for use in a cell switching network which controls an interval of a packet (cell) transmission at a transmitting terminal according to a state of the network. This method may comprise the steps of detecting a cell switched in the cell switching network; counting a number of connections in which at least one packet (cell) is detected, as a number of communicating connections; and determining the number of communicating connections which is counted before a predetermined period elapses from an observation start point. This method may further comprise the step of implementing a capability in the above described first communicating connection number counting system.

A second communicating connection number counting method according to the present invention is a method for use in a cell switching network which controls an interval of a packet (cell) transmission at a transmitting terminal, according to a state of the network. This method comprises the steps of detecting a cell switched in the cell switching network; counting a number of connections in which at least one packet (cell) is detected, as a number of communicating connections; and estimating and determining the number of communicating connections to be recognized by a connection counter, until a predetermined time TM elapses from an observation start point. This method may further comprise the step of implementing a capability in the above described second communicating connection number counting system.

A storage medium according to the present invention is a computer-readable storage medium, and stores a program which executes a capability for counting a number of communicating connections in a cell switching network which controls an interval of a packet (cell) transmission at a transmitting terminal according to a state of the network. The capability comprises the steps of detecting a cell switched in the cell switching network; counting a number of connections in which at least one packet (cell) is detected, as the number of communicating connections; and determining the number of communicating connections which is counted before a predetermined period elapses from an observation start point. This storage medium may further comprise a capability for implementing the operations of the above described first system and the steps of the above described first method.

A second storage medium according to the present invention is a computer-readable storage medium, and stores a program which executes a capability for counting a number of communicating connections in a cell switching network which controls an interval of a packet (cell) transmission at a transmitting terminal according to a state of the network. The capability comprises the steps of detecting a cell switched in the cell switching network; counting a number of connections in which at least one packet (cell) is detected as the number of communicating connections; and estimating and determining the number of communicating connections to be recognized by a connection counter, until a predetermined time TM elapses from an observation start point. This storage medium may further comprise a capability for implementing the operations of the above described second system, and the steps of the above described second method.

The present invention covers each device, each system, and a storage medium (such as a magnetic disk, optical disk, magneto-optical disk, ROM, RAM, etc.), which stores the computer programs for implementing the methods together or separately. The present invention also covers the use of the programs which are separately stored in a plurality of storage media.

BRIEF DESCRIPTION OF THE DRAWINGS

FIG. 4 is a schematic diagram showing the structure of a parameter storing memory according to the present invention;

FIG. 5 is a schematic diagram showing the structure of a measured delay time storing memory according to the present invention;

FIG. 9 is a schematic diagram showing the structure of an active VC table according to the present invention;

FIG. 10 is a flowchart showing the first allowed transmission rate calculating method according to the present invention;

FIG. 12 is a schematic diagram showing the second configuration of the allowed transmission rate calculating unit according to the present invention;

FIG. 13 is a schematic diagram showing the structure of an active VC table;

FIG. 19 is a schematic diagram explaining an ER change parameter table;

FIG. 20 is a schematic diagram showing the basic configuration of an ATM switching system according to the present invention;

FIG. 33 is a schematic diagram showing the structure of an active connection storing table memory according to the present invention;

FIG. 41 is a schematic diagram showing the fourth example of the connection number counting method using an estimate according to the present invention;

FIG. 42 is a schematic diagram showing the configuration of the communicating connection number counting unit according to the present invention;

FIG. 43 is a schematic diagram showing the first process performed by a controlling unit according to the present invention;

DESCRIPTION OF THE PREFERRED EMBODIMENT

Provided below is the explanation about an embodiment according to the present invention.

Figure 1:
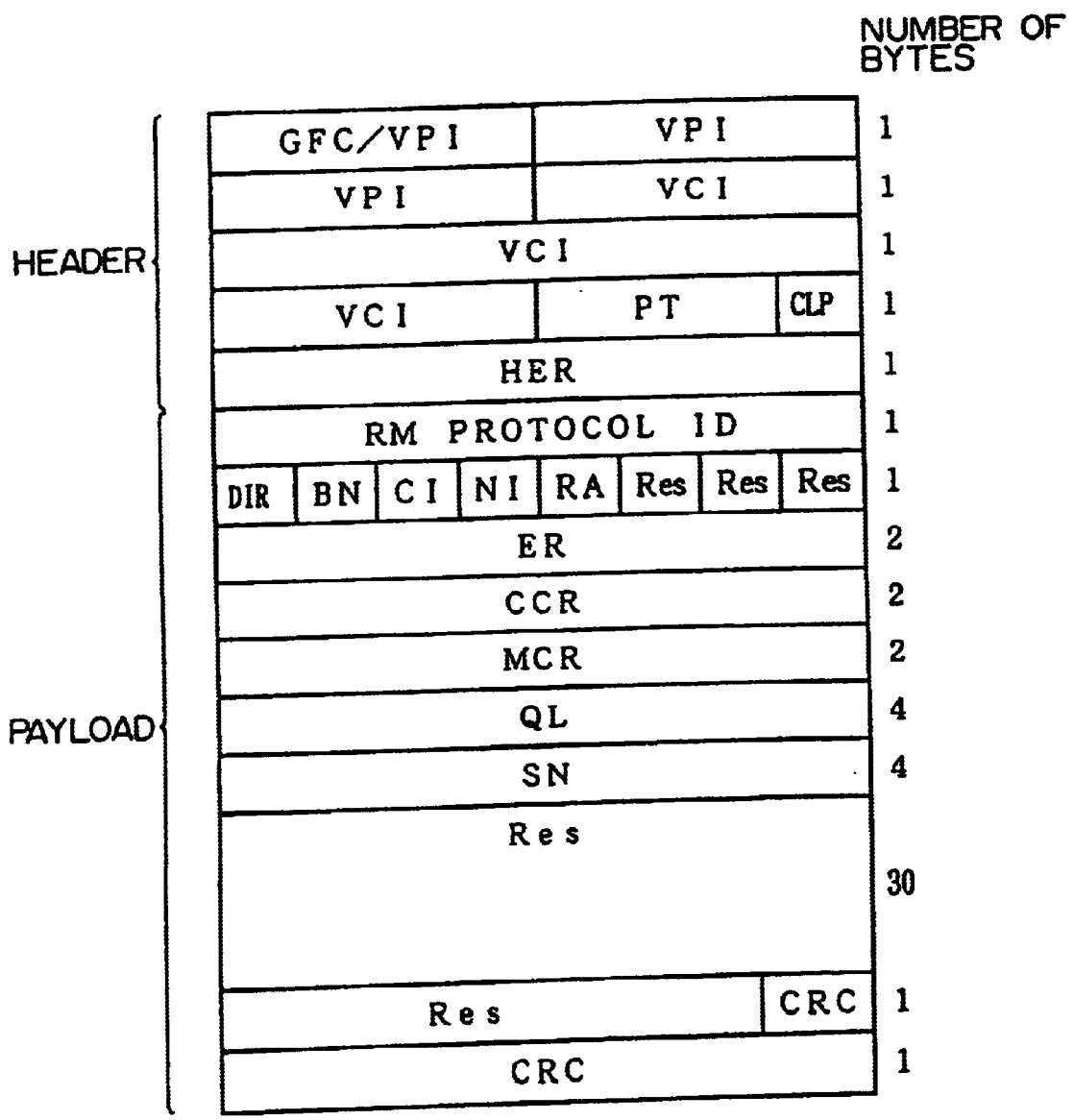
FIG. 1 is a schematic diagram showing the typical structure of an RM cell.
Figure 2:
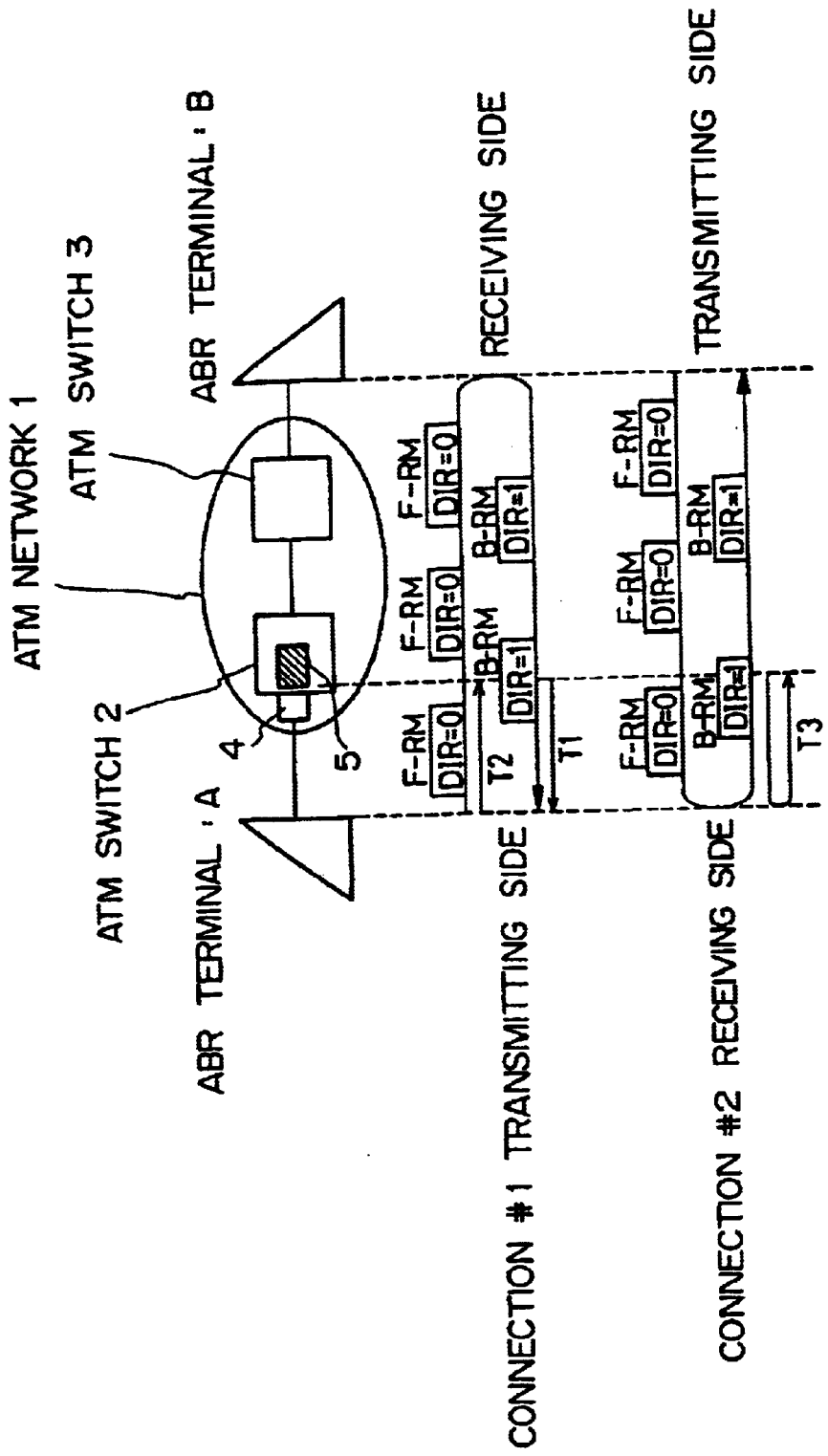
FIG. 2 is a schematic diagram showing the principle of an ATM switching system according to the present invention.

FIG. 2 is a schematic diagram showing the configuration of an ATM switching system according to the present invention. In this figure, 1 indicates an ATM network; 2 and 3 indicate ATM switches; and A and B indicate ABR terminals respectively corresponding to the ATM switches 2 and 3. This figure shows the case in which a delay caused between the ATM switch 2 and the ABR terminal A is measured. 4 indicates a UPC device for an ABR service in a UNI corresponding to the ABR terminal A. 5 indicates a delay time measuring unit for measuring an amount of delay time.

If bidirectional ABR connections #1 and #2 exist for the ABR terminals A and B, the backward ABR connection #2 is used to measure a total amount of delay times T1+T2 caused in the forward ABR connection #1. Here, the delay time T1 is an amount of propagation time from the delay time measuring unit 5 to the ABR terminal A, while the delay time T2 is an amount of propagation time from the ABR terminal A to the delay time measuring unit 5. A time T3, during which a certain RM cell in the connection #2 passes through the delay time measuring unit 5, doubles back at the ABR terminal A, and reaches the delay time measuring unit 5, is defined as a delay time obtained for the ABR connection #1.

According to the present invention, a time Ta at which an RM cell initially passes through the delay time measuring unit 5, is stored, a time at which the RM cell is again detected by the delay time measuring unit 5 after it doubles back from an opposing terminal, is defined as Tb, and Ta−Tb is calculated, so that a delay time (turnaround delay time) is obtained. At this time, the sequence number (SN) included in that RM cell is used to verify that the detected RM cell is the identical cell. The ITU-T and ATM Forum prescribe that the SN is assigned at a transmitting terminal, and it is not changed at a receiving terminal. Accordingly, the matching between the SNs allows the detected cell to be identified as being identical.

Provided below is the explanation about the specific methods for attaining the aims of the present invention.

(1) When a forward RM cell from the ATM network 1 is detected by the delay time measuring unit 5 in the switch 2 in the ATM network 1 providing an ABR service, its connection identifier and sequence number are first stored together with its arrival time Ta. When a backward RM cell whose connection identifier and sequence number are the same as the stored identifier and number arrives, its arrival time Tb is obtained. Then, a turnaround delay time T during which the RM cell arrives at the switch 2, doubles back at the opposing ABR terminal 2 on the receiving side 2, and returns to the switch 2, is calculated by subtracting the stored arrival time Ta from the arrival time Tb.

(2) If ABR connections are bidirectionally established between terminals in the above described step (1), the turnaround delay time T in one of the bidirectional ABR connections is measured an N (arbitrary integer number) number of times. The maximum and minimum measurement values are respectively set as maximum and minimum values $\tau_2$ and $\tau_3$ of delay parameters used under a UPC for the ABR connections in the other direction.

(3) If ABR connections are bidirectionally established between terminals in the above described step (1), the turnaround delay time T in one direction of the ABR connection is once measured. The maximum and minimum values of a delay time obtained from an exponential distribution in which the measured value is used as its average, are respectively set as the maximum and minimum values $\tau_2$ and $\tau_3$ of delay parameters used under a UPC for the other direction of the ABR connections.

The explanation provided below is based on the assumption that the amount of time (the amount of delay time) during which the RM cell passes through the delay time measuring unit 5 from the ATM network side, doubles back at the ABR terminal A, and returns to the delay time measuring unit 5 in the above described connection #2 shown in FIG. 2, is calculated, the UPC parameters $\tau_2$ and $\tau_3$ are calculated based on the above described calculated value, and these parameters $\tau_2$ and $\tau_3$ are set as the UPC parameters of the connection #1.

Figure 3:
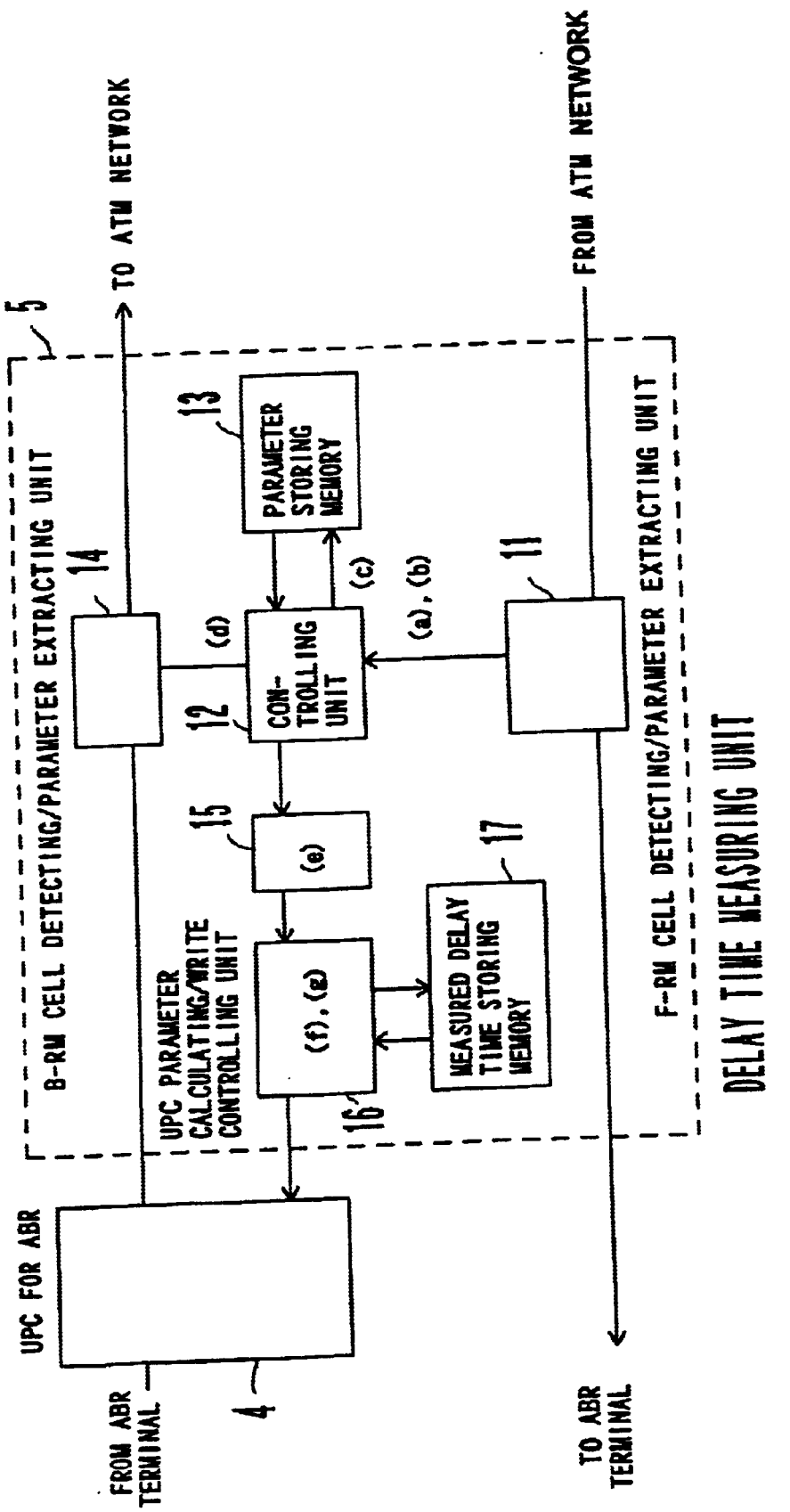
FIG. 3 is a schematic diagram showing a delay time measuring system according to the present invention.

FIG. 3 is a schematic diagram showing an embodiment of a delay time measuring system according to the present invention. It also shows the details of the delay time measuring unit 5. The delay time measuring unit 5 is arranged, for example, in a subscriber line processing device 106 shown in FIG. 20.

In FIG. 3, the same portions as those shown in FIG. 2 are denoted by the same reference numerals. 11 indicates a forward RM cell detecting/parameter extracting unit for an RM cell flowing in a forward direction (a forward RM cell hereinafter referred to as an F-RM cell). 12 indicates a controlling unit. 13 indicates a parameter storing memory. 14 indicates a backward RM cell detecting/parameter extracting unit for an RM cell flowing in a backward direction (a backward RM cell hereinafter referred to as a B-RM cell). 15 indicates a delay time calculating unit. 16 indicates a UPC parameter calculation/write controlling unit. 17 indicates a measured delay time storing memory.

Provided below is the explanation about the operations performed by the delay time measuring unit 5 shown in FIG. 3. The following (a) through (g) describe the operations and their order of the delay time measuring unit 5. FIG. 3 shows each of the portions corresponding to each of the operations.

(a) The F-RM cell detecting/parameter extracting unit 11 detects an F-RM cell from an ATM network side. At this time, a determining unit included in the F-RM cell detecting/parameter extracting unit 11 detects an RM cell whose direction bit (DIR) is set to "0" by referencing that bit in the RM cell. The value of the DIR "0" indicates an F-RM cell.

(b) The connection identifier indicating a connection and the sequence number (SN) in the detected RM cell are extracted and transmitted to the controlling unit 12.

(c) The controlling unit 12 writes the extracted connection identifier, sequence number SN, and the arrival time Ta, to the parameter storing memory 13.

(d) When a cell whose DIR is set to "1" arrives at the B-RM cell detecting/parameter extracting unit 14, its arrival time Tb is detected, and transmitted to the controlling unit 12 together with the sequence number SN of the arrived RM cell. The value of the DIR "1" indicates a B-RM cell. The controlling unit 12 makes a comparison between the SN of the arrived RM cell and the SN stored in the parameter storing memory 13, and determines whether or not they match. If they match, the arrival times Ta and Tb are transmitted to the delay time calculating unit 15.

(e) The delay time calculating unit 15 calculates the difference T between the arrival times (T=Tb−Ta).

(f) The UPC parameter calculation/write controlling unit 16 obtains the delay parameters $\tau_2$ and $\tau_3$ used under a UPC.

(g) The obtained parameters $\tau_2$ and $\tau_3$ are set as UPC parameters for a backward connection #2 having the same connection identifier as that stored in the parameter storing memory 13.

FIG. 4 is a schematic diagram showing the structure of the parameter storing memory 13 according to this embodiment. The parameter storing memory 13 stores data including a plurality of sets of a connection identifier, sequence number SN, and an arrival time of a B-RM cell TO, as shown in this figure.

Provided next is the explanation about methods (first and second methods) for obtaining the delay parameters $\tau_2$ and $\tau_3$ used under a UPC based on a calculated time difference T.

With the first method, the delay time T is measured an N (arbitrary integer number) number of times for a certain connection, and the maximum and minimum values among the measured values are respectively set as $\tau_2$ and $\tau_3$. In this case, the UPC parameter calculation/write controlling unit 16 stores measured delay times Ts in the measured delay time storing memory 17, and determines the maximum and minimum values $\tau_2$ and $\tau_3$ among stored N delay times Ts when the delay time T is measured the N number of times.

FIG. 5 shows the structure of the measured delay time storing memory 17 according to this embodiment. The measured delay time storing memory 17 stores a connection identifier and measured N delay times T1, T2, . . . , TN, as shown in this figure.

With the second method, the delay time T is measured only once, and the delay parameters $\tau_2$ and $\tau_3$ are determined based on the measured delay time T. In this case, the UPC parameter calculation/write controlling unit 16 serves as a unit for calculating an exponential distribution curve in which the measured delay time T is used as its average, and determines the maximum and minimum values of the delay parameters based on the exponential distribution curve.

Figure 6:
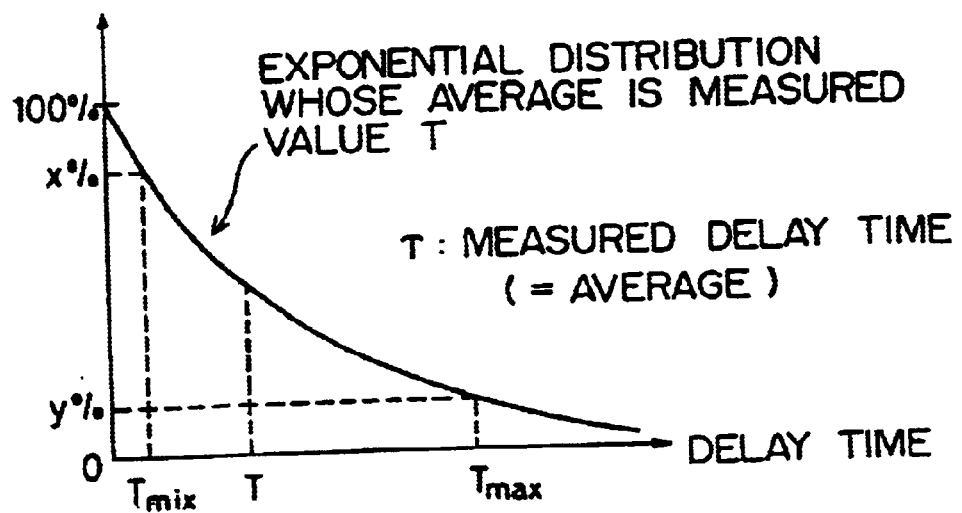
FIG. 6 is a schematic diagram showing a method for determining a delay parameter according to the present invention.

FIG. 6 is a schematic diagram showing a method for determining the delay parameters $\tau_2$ and $\tau_3$, based on an exponential distribution curve. The exponential distribution curve in which the measured delay time T is used as its average, is determined, the value of the measured delay time T corresponding to x % of the exponential distribution curve is determined as the minimum value Tmin of the delay time T, and defined as $\tau_3$, while the value of the delay time T corresponding to y % of the exponential distribution curve is determined as the maximum value Tmax of the delay time T, and defined as $\tau_2$ as shown in this figure. The measured delay time storing memory 17 is not required for implementing the second method. Note that the values of x % and y % can be predetermined in order to obtain the most suitable delay parameters.

Figure 7:
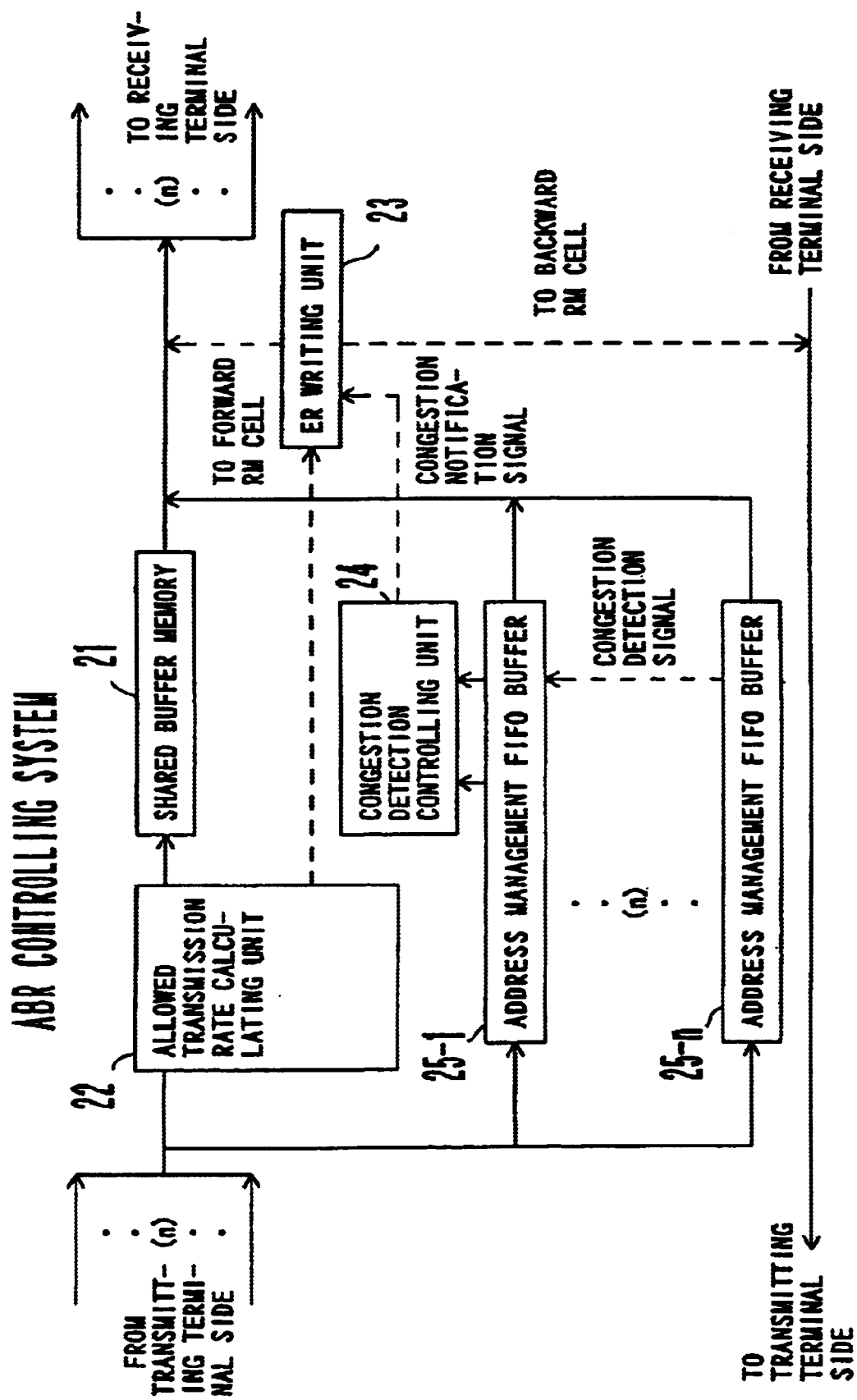
FIG. 7 is a schematic diagram showing the first configuration of an ABR controlling system according to the present invention.

FIG. 7 is a schematic diagram showing the basic configuration of an ABR controlling system according to the present invention. This ABR controlling system comprises a shared buffer memory 21, allowed transmission rate calculating unit (or an explicit rate ER calculating unit) 22, ER writing unit 23, congestion detection controlling unit 24, and address management FIFO buffer memories 25-1 through 25-n. This ABR controlling system corresponds to the main portion of an ATM switch operating in an ER mode. It comprises "n" input channels (channels on an input side) and "n" output channels (channels on an output side).

User and RM cells transmitted from a transmitting terminal via the plurality of input channels, are multiplexed by a multiplexing unit, not shown in this figure, and temporarily stored in the shared buffer memory 21 via the allowed transmission rate calculating unit 22. Then, each of the stored cells is transmitted to an output channel corresponding to the VPI and VCI of its header, and transmitted via a demultiplexing unit, not shown in this figure. A cell storage address in the shared buffer memory 21 is managed by any of the address management FIFO buffer memories 25-1 through 25-n, which corresponds to an output channel identified by the VPI/VCI of the arrived cell. In this way, it is determined whether or not congestion occurs.

One of the address management FIFO buffer memories 25-1 through 25-n, corresponding to the output channel identified by the VPI/VCI of the arrived cell, stores an address to which the arrived cell is written in the shared buffer memory 21. If the number of addresses stored in any of the address management FIFO buffer memories 25-1 through 25-n, which corresponds to a certain output channel, exceeds a predetermined number, it is determined that congestion occurs in that output channel. Then, a congestion detection signal is transmitted to the congestion detection controlling unit 24, which then outputs a congestion notification signal to the ER writing unit 23. In this case, the congestion detection controlling unit 24 can also detect an occurrence of congestion based on the amount of stored cells in the shared buffer memory 21.

The allowed transmission rate calculating unit 22 calculates an allowed transmission rate based on a band available for an ABR communication corresponding to each output channel. In this case, it calculates the allowed transmission rate regardless of whether or not congestion occurs. In a non-congested state, however, an allowed transmission rate corresponding to an output channel is transferred to the ER writing unit 23, and written to the explicit cell rate ER fields for forward and backward RM cells (F-RM and B-RM cells).

When the congestion notification signal is transmitted from the congestion detection controlling unit 24 to the ER writing unit 23, the ER writing unit 23 lowers the allowed transmission rate calculated in the allowed transmission rate calculating unit 22 according to a predetermined rule, and writes the lowered value to the explicit cell rate ER field of the received RM cell. The transmitting terminal receives the RM cell, and lowers its transmission rate according to the allowed transmission rate written to the explicit rate ER field of the received RM cell. With this process, the channel can be restored quickly from the congested state.

Figure 8:
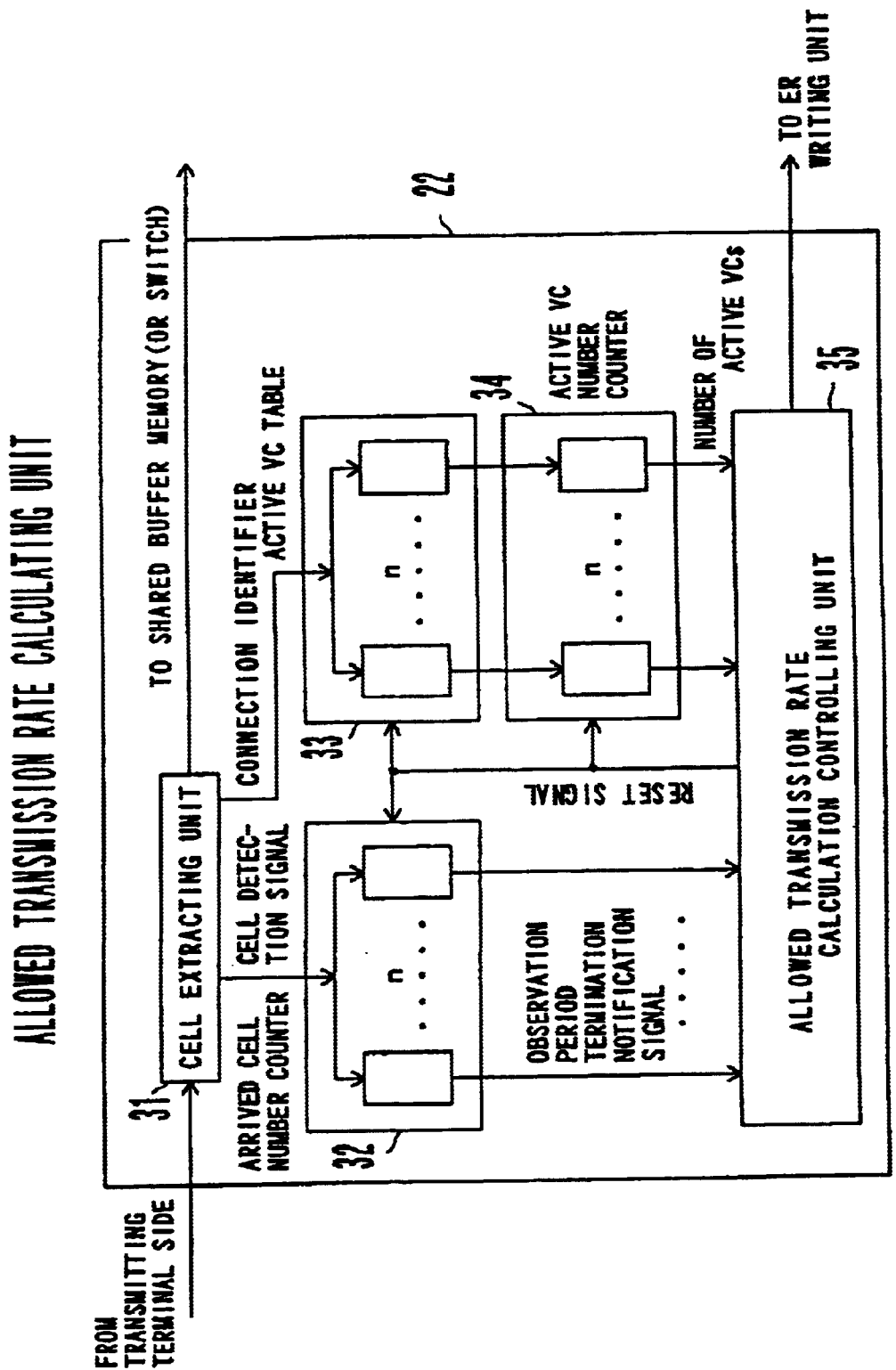
FIG. 8 is a schematic diagram showing the first configuration of the allowed transmission rate calculating unit.

FIG. 8 shows the configuration of the allowed transmission rate calculating unit 22. As shown in this figure, the allowed transmission rate calculating unit 22 comprises a cell extracting unit 31, arrived cell number counter 32, active VC table 33, active VC number counter 34, and an allowed transmission rate calculation controlling unit (or explicit rate ER calculation controlling unit) 35. The cell extracting unit 31 extracts a connection identifier including a VPI/VCI of a cell transmitted from a transmitting terminal side, adds the extracted connection identifier to the active VC table 33, and provides a cell detection signal corresponding to an output channel to the arrived cell number counter 32, based on the connection identifier.

The arrived cell number counter 32 counts an arrived cell for each output channel, and increments its value. When the counter value for each output channel reaches a predetermined value, it outputs an observation period termination notification signal to the allowed transmission rate calculation controlling unit 35.

Figure 9:
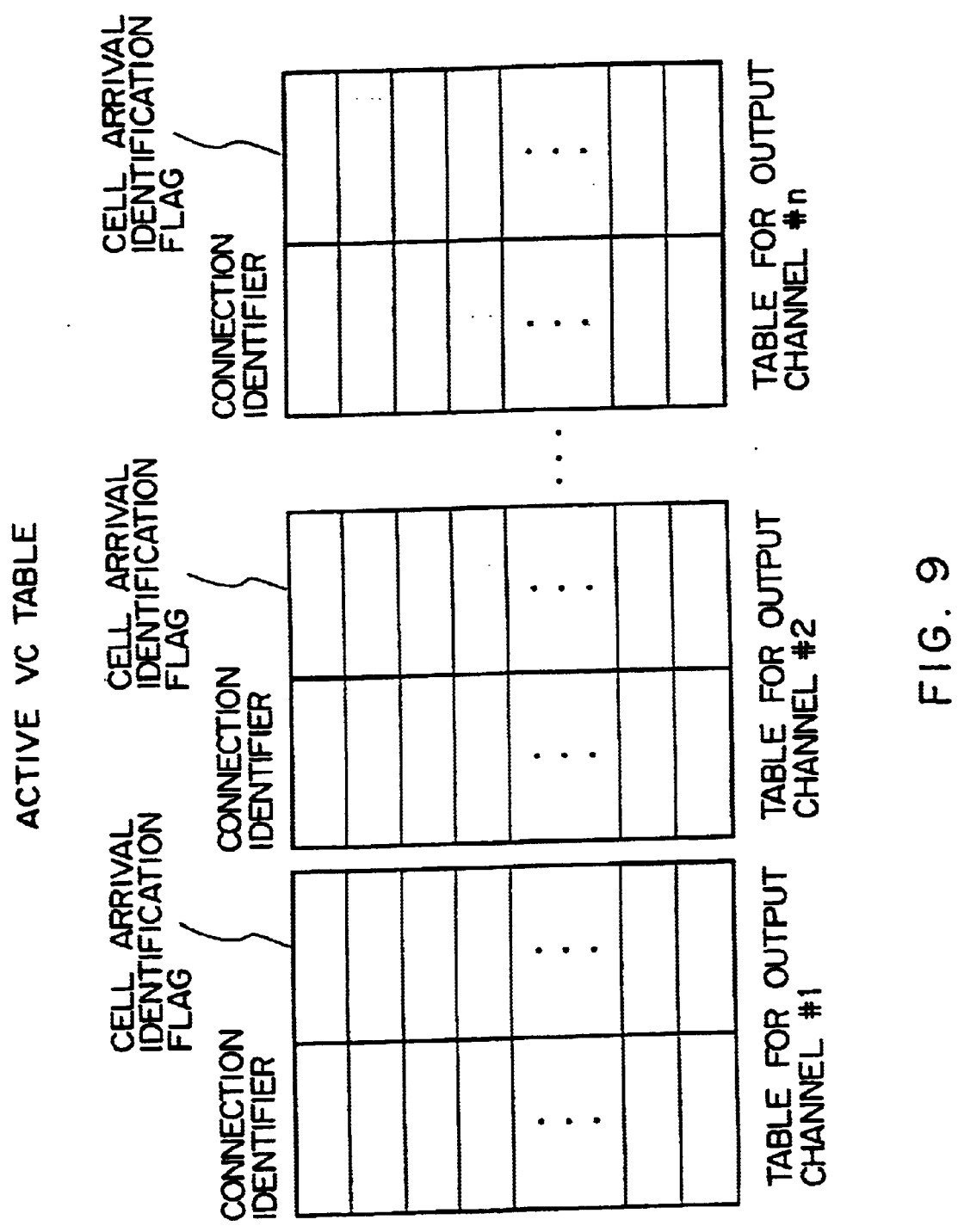

The active VC table 33 includes, for example, tables (tables for respective output channels) corresponding to output channels #1 through #n as shown in FIG. 9. Each of the tables includes fields to which a connection identifier and a cell arrival identification flag are respectively registered. The active VC number counter 34 obtains the number of active VCs by counting cell arrival identification flags in each of the tables for the output channels #1 through #n in the active VC table 33, and incrementing its value.

Assuming that an output channel to which an arrived cell is transmitted is #1, the connection identifier of that cell is written to the table for the output channel #1, and its cell arrival identification flag is set. Then, a counter in the arrived cell number counter 32 corresponding to the output channel #1 is incremented. In the meantime, the active VC number counter 34 counts a cell arrival identification flag for each output channel, and increments its value.

If a cell having the same connection identifier arrives after that, the arrived cell number counter 32 increments its value. However, the cell arrival identification flag corresponding to that connection identifier was previously set in the table for the output channel #1 in the active VC table 33. Therefore, the table for the output channel #1 is left unchanged, and the active VC number counter 34 does not increment its value.

Accordingly, the value of the active VC number counter 34 indicates the number of connections in which user cells have arrived at least once until it is reset by a reset signal, that is, the number of active connections. It may be controlled that the active VC number counter 34 counts a newly written connection identifier, increments its value, sets the cell arrival identification flag in the active VC table 33, which indicates the increment, and counts no more connection identifiers whose cell arrival identification flag has already set in the table.

When receiving an observation period termination notification signal corresponding to an output channel from the arrived cell number counter 32, the allowed transmission rate calculation controlling unit 35 reads the number of active VCs from the active VC number counter 34 for each output channel, and transfers an allowed transmission rate for an output channel to the ER writing unit 23. The allowed transmission rate calculation controlling unit 35 outputs a reset signal to the arrived cell number counter 32, active VC table 33, and the active VC number counter 34, in order to respectively reset the number of arrived cells, connection identifier, cell arrival identification flag, and the number of active VCs.

FIG. 10 is a flowchart showing a first embodiment of an allowed transmission rate calculation process performed by the ABR controlling system according to the present invention.

As shown in this flowchart, the number of active VCs Nvc(n) in a period during which a predetermined number of cells arrive, is counted for each output channel (step Si). When the arrived cell number counter 32 detects that the number of arrived cells reaches the predetermined number for each output channel, it outputs an observation period termination notification signal to the allowed transmission rate calculation controlling unit 35. Then, the number of active VCs Nvc(n) counted and incremented for each output channel is obtained according to the active VC number counter 34.

Then, an allowed transmission rate Ba(n) is calculated based on an equation Ba(n)=B(n)/Nvc(n) (step S2). Note that B(n) indicates a band of each output channel. The allowed transmission rate Ba(n) is transferred to the ER writing unit 32 (step S3), and written to the field of the explicit cell rate ER for forward and backward RM cells. Here, the value obtained by dividing the band B(n) by the number of active VCs is defined as the allowed transmission rate Ba(n). If the number of active VCs is large in this case, the allowed transmission rate Ba(n) becomes lower. As a result, an occurrence of congestion can be prevented.

Figure 11:
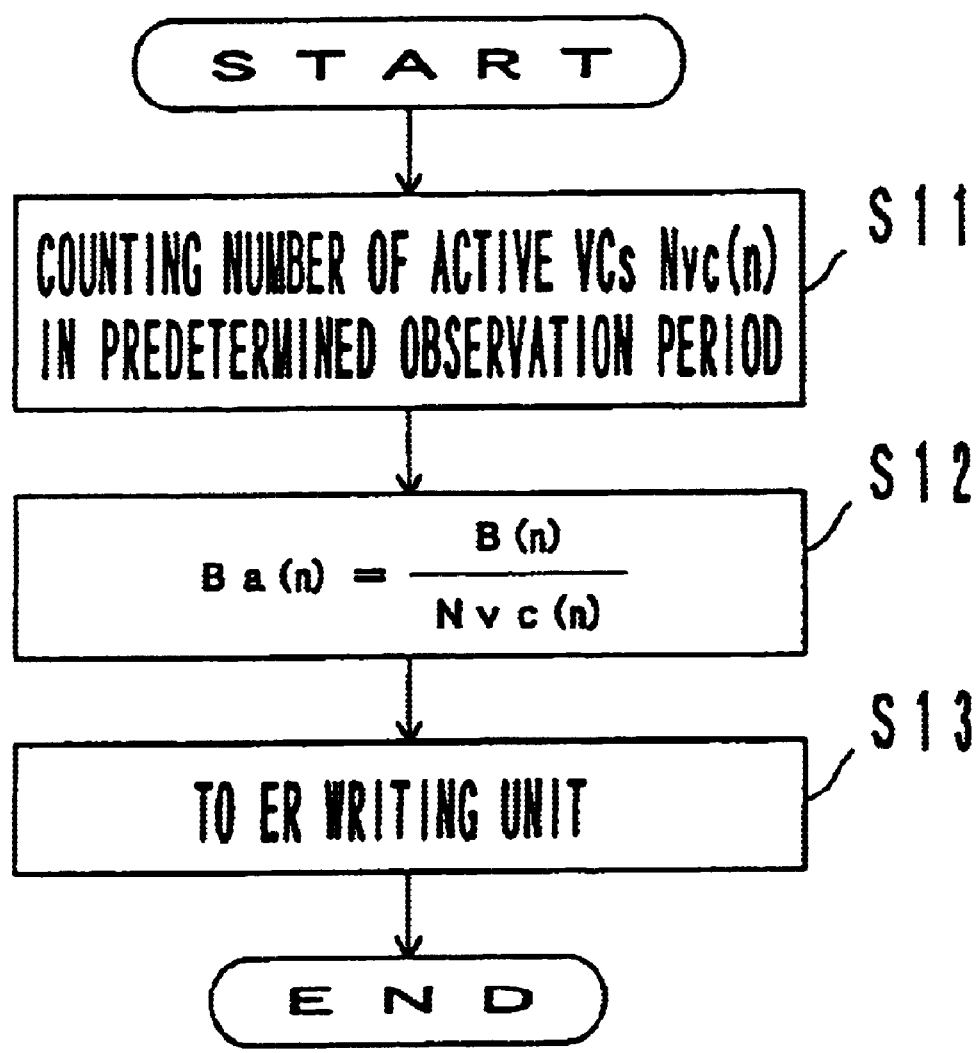
FIG. 11 is a flowchart showing the second allowed transmission rate calculating method according to the present invention.

FIG. 11 is a flowchart showing a second embodiment of the allowed transmission rate calculation process according to the present invention.

In this embodiment, the number of active VCs Nvc(n) for each output channel in a predetermined observation period is counted (step S11). Then, the allowed transmission rate Ba(n) is calculated by using an arithmetic operation similar to that performed in the above described step S2 (step S12). The calculated transmission rate Ba(n) is transferred to the ER writing unit 32 (step S13). The predetermined observation period in this case is implemented by using the arrived cell number counter 32 shown in FIG. 8 as a timer for each output channel, or a common timer, and providing an observation period termination notification signal to the allowed transmission rate calculation controlling unit 35 at predetermined time intervals. With this process, the allowed transmission rate Ba(n) can be obtained in a similar manner as in the first embodiment.

FIG. 12 is a schematic diagram showing the second configuration of the allowed transmission rate calculating unit 22 shown in FIG. 7.

As shown in this figure, the allowed transmission rate calculating unit 22 comprises a cell extracting unit 41, arrived cell number counter 42, active VC table 43, active VC number counter 44, allowed transmission rate calculation controlling unit (or an explicit rate calculation controlling unit) 45, RM cell extracting unit 46, and a total MCR calculation controlling unit 47.

The cell extracting unit 41 extracts a connection identifier of a cell transmitted from a transmitting terminal, and the arrived cell number counter 42 counts that cell for a corresponding output channel and increments its value. When the number of counted cells reaches a predetermined number, the arrived cell number counter 42 outputs an observation period termination notification signal to the allowed transmission rate calculation controlling unit 45. The active VC table 43 determines whether or not the connection identifier corresponding to the output channel was previously written. If NO, the connection identifier is written, and at the same time, the cell arrival identification flag is set. The active VC number counter 44 counts a connection identifier whose cell arrival identifier flag is set, and increments its value.

The RM cell extracting unit 46 extracts the connection identifier and MCR (Minimum Cell Rate) from the arrived cell, and transmits the extracted identifier and MCR to the total MCR calculation controlling unit 47. The total MCR calculation controlling unit 47 references the active VC table 43, and determines whether or not the connection identifier transmitted from the RM cell extracting unit 46 is included in the active VC table 43. If YES, the total MCR calculation controlling unit 47 adds the value of the MCR. As described above, a connection at which one or more cells arrive during an observation period is recognized as being active, and the minimum cell rate MCR of the active connection is added. In this case, an MCR addition identification flag is arranged in the active VC table 43 in order not to repeatedly add the MCR value of an identical connection, and the minimum cell rate MCR, when a corresponding connection is established for the active VC, is output in correspondence with an output channel.

Figure 13:
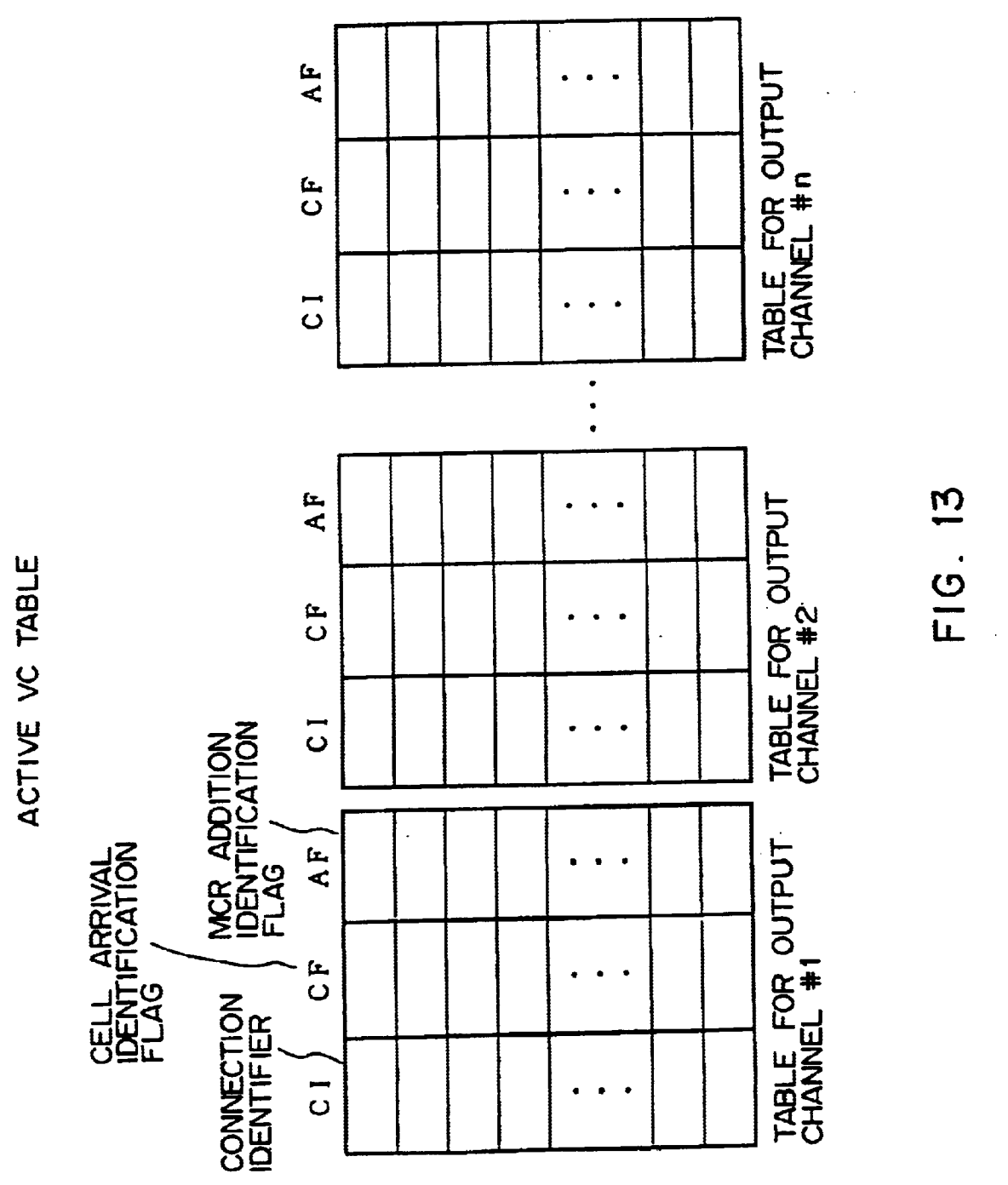

FIG. 13 shows the structure of the active VC table 43.

The active VC table 43 includes tables for output channels #1 through #n corresponding to the respective output channels, as shown in this figure. Each of the tables includes a connection identifier field CI, cell arrival identification flag field CF, and an MCR addition identification flag field AF. After the allowed transmission rate calculation controlling unit 45 calculates an allowed transmission rate for each output channel, it resets a corresponding table for an output channel. Then, it writes the connection identifier of the next arrived cell to the field CI, and sets the cell arrival identification flag in a corresponding field CF. Additionally, the allowed transmission rate calculation controlling unit 45 sets the MCR addition identification flag in the field AF, in order to indicate that an MCR corresponding to a referenced connection was previously added if reference is made to the active VC table 43 by the total MCR calculation controlling unit 47.

When receiving the observation period termination notification signal corresponding to an output channel from the arrived cell number counter 42, the allowed transmission rate calculation controlling unit 25 reads the number of active VCs of that output channel, from the active VC number counter 44, also reads the total MCR value from the total MCR calculation controlling unit 47, and calculates an allowed transmission rate.

If the value obtained by dividing a band of an output channel by the number of active VCs is defined as the allowed transmission rate Ba(n), the allowed transmission rate may sometimes be the minimum cell rate MCR or lower. Since the minimum cell rate MCR is guaranteed for each transmitting terminal, there is a possibility that a transmitting terminal transmits cells at the MCR even if the allowed transmission rate is lower than the MCR. This leads to an occurrence of congestion.

Therefore, each MCR of an active VC is added in correspondence with an output channel, the total MCR value is subtracted from the band of the output channel, and the resultant value is divided by the number of active VCs, as described above. As a result, a rate which exceeds the MCR and becomes available is obtained, and an MCR for each active VC is added to the rate, so that an allowed transmission rate is obtained. Therefore, the MCR is guaranteed for each transmitting terminal, and at the same time, an occurrence of congestion can be prevented.

Figure 14:
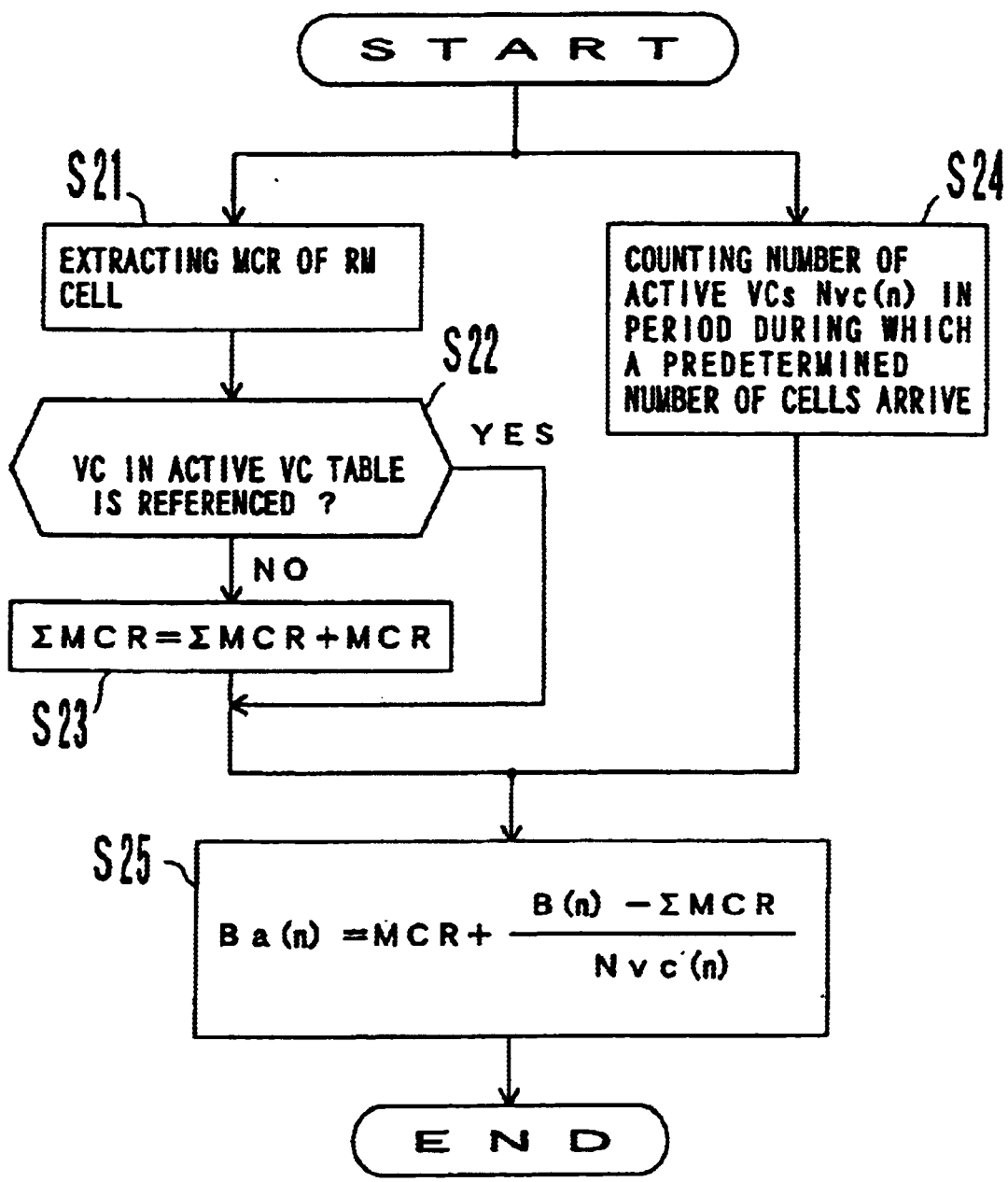
FIG. 14 is a flowchart showing the third allowed transmission rate calculating method according to the present invention.

FIG. 14 is a flowchart showing the allowed transmission rate calculation process performed by the second embodiment of the allowed transmission rate calculating unit. As shown in this figure, an MCR of an RM cell is first extracted (step S21). It is then determined whether or not a corresponding VC is included in the active VC table, and referenced (step S22). That is, the MCR and connection identifier of the extracted RM cell are extracted by the RM cell extracting unit 46, and provided to the total MCR calculation controlling unit 47. The total MCR calculation controlling unit 47 references the active VC table 43 based on the connection identifier of the RM cell, and determines whether or not that connection identifier is included in the active VC table 43. If YES, it is then determined whether or not it was referenced, that is, whether or not the MCR addition identification flag is set.

If it is determined that the connection identifier is included in the active VC table 43, and it was not referenced, the MCR of the connection is added in correspondence with an output channel. That is, the addition ΣMCR=ΣMCR+ MCR is made (step S23). If the connection identifier is not included in the active VC table 43, the MCR is not added. This is because that connection is not an active VC. If it is determined that the connection identifier is included and was referenced, the MCR of that active VC has been previously added. Therefore, no further addition is made.

Simultaneously with the above described process, also the number of active VCs Nvc(n) in a period during which a predetermined number of cells arrive, is obtained (step S24). That is, when the number of arrived cells counted by the arrived cell number counter 42 for each output channel reaches a predetermined number, an observation period termination notification signal is provided to the allowed transmission rate calculation controlling unit 45. The allowed transmission rate calculation controlling unit 45 reads not only the number of active VCs corresponding to an output channel from the active VC number counter 44, but also the total MCR value corresponding to the output channel from the total MCR calculation controlling unit 47.

Then, the allowed transmission rate Ba(n) is calculated based on Ba(n)=MCR+[(B(n)−ΣMCR)/Nvc(n))] (step S25), and transferred to the ER writing unit. Note that the MCR is the minimum cell rate declared when a connection is established, and B(n) is a band of an output channel. With the above described process, an allowed transmission rate which can ensure the MCR for a transmitting terminal corresponding to an active VC, can be instructed.

Figure 15:
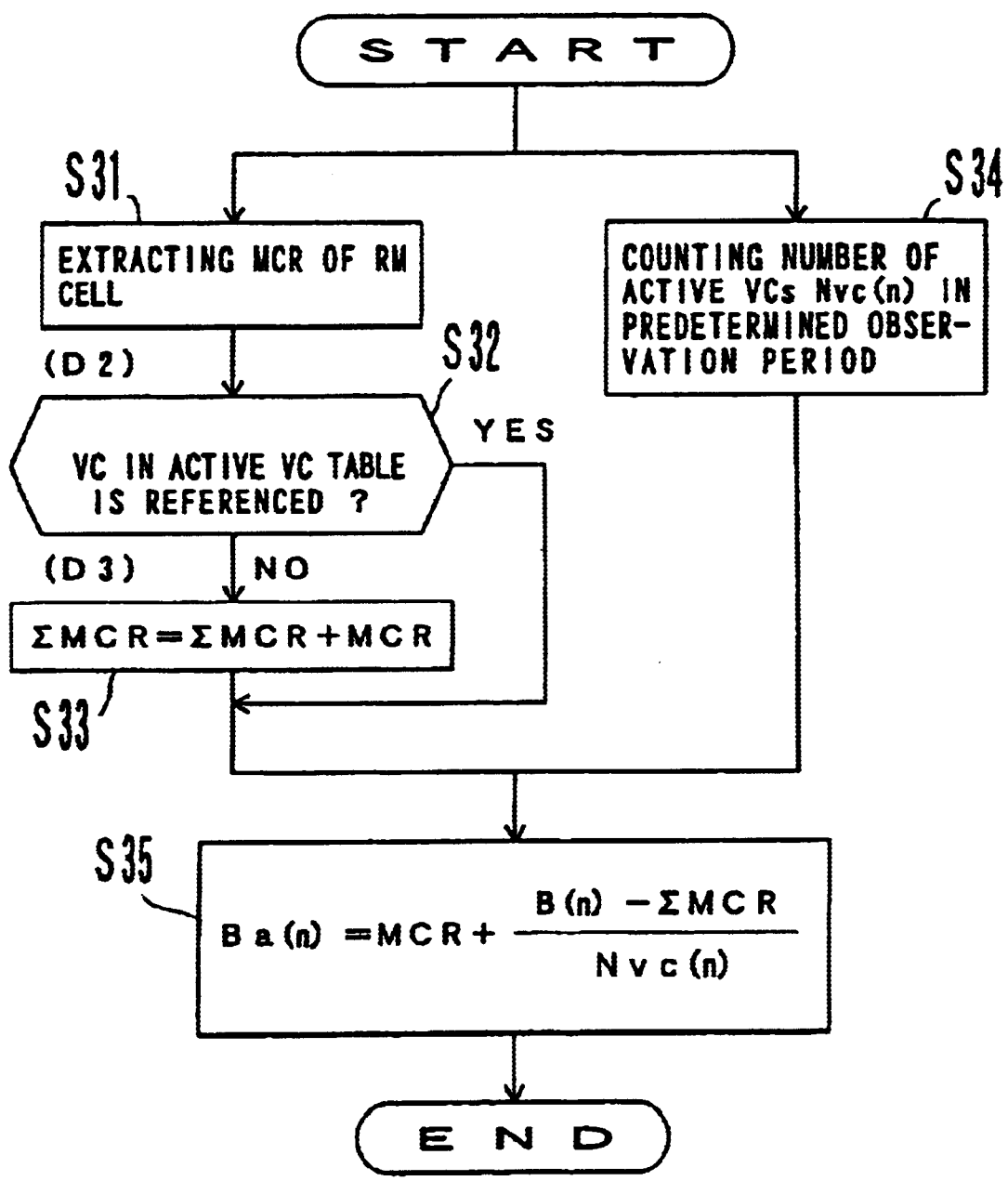
FIG. 15 is a flowchart showing the fourth allowed transmission rate calculating method according to the present invention.

FIG. 15 is a flowchart showing the second allowed transmission rate calculation process performed by the second embodiment of the allowed transmission rate calculating unit.

According to the flowchart shown in FIG. 14, the number of active VCs Nvc(n) in a period during which a predetermined number of cells arrive, is obtained in step S24. The only difference between the processes respectively shown in FIGS. 14 and 15 is that the number of active VCs Nvc(n) in a predetermined observation period is obtained in step S34 of FIG. 15, corresponding to step S24 of FIG. 14. The other steps S31 through S33 and S35 perform the same operations as those performed in steps S21 through S23 and S25. The predetermined observation period in step S34 is measured by arranging and using a timer corresponding to an output channel or a timer common to respective channels, instead of the arrived cell number counter 42 shown in FIG. 12, and notified to the allowed transmission rate calculation controlling unit 45.

Figure 16:
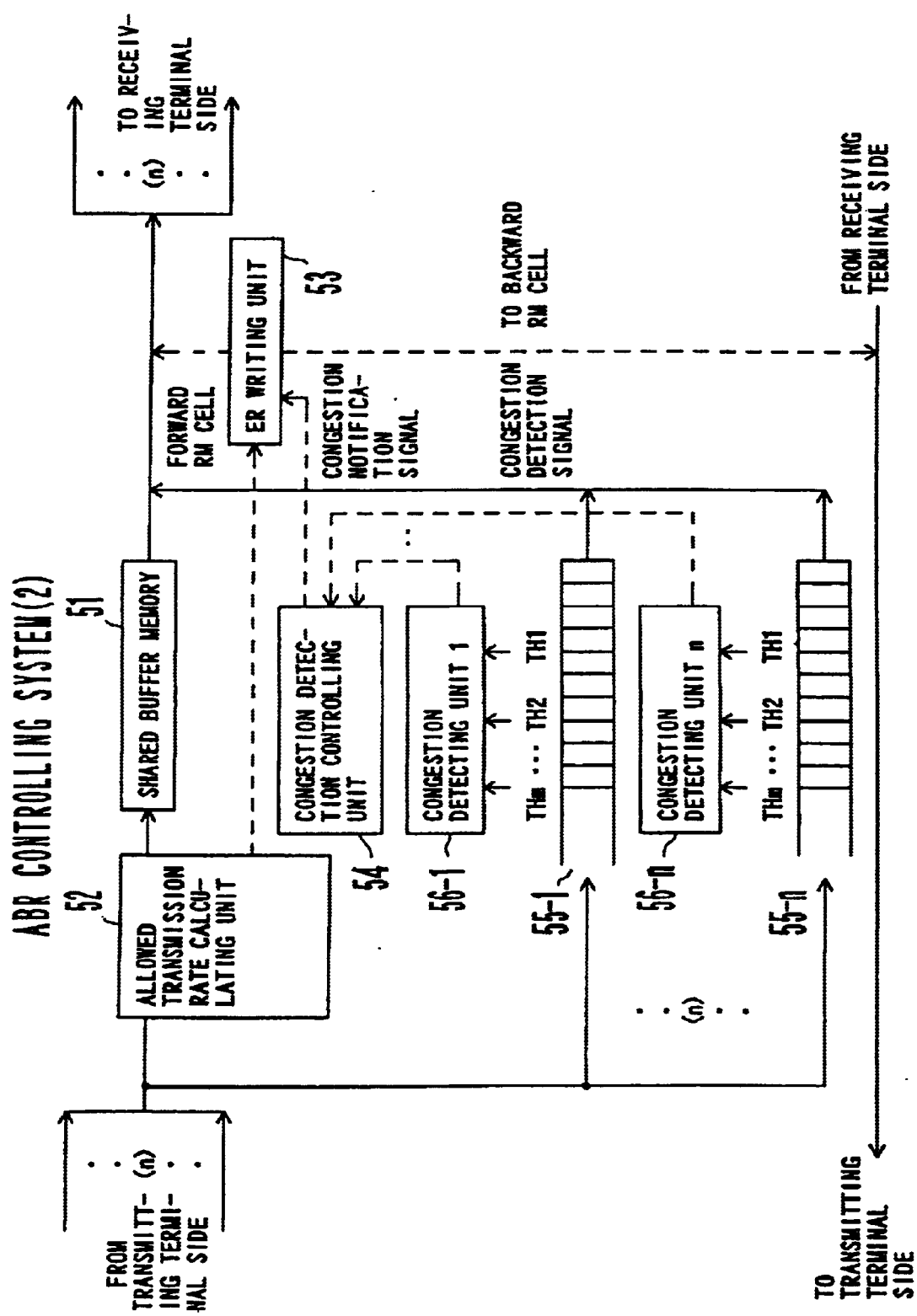
FIG. 16 is a schematic diagram showing the second configuration of the ABR controlling system according to the present invention.

FIG. 16 is a schematic diagram showing the second embodiment of the ABR controlling system according to the present invention. As shown in this figure, this ABR controlling system comprises a shared buffer memory 51, allowed transmission rate calculating unit 52, ER writing unit 53, congestion detection controlling unit 54, address management FIFO buffer memories 55-1 through 55-n which correspond to respective output channels, and congestion detecting units 56-1 through 56-n which correspond to the respective output channels.

User and RM cells from a transmitting terminal side are temporarily stored in the shared buffer memory 51 via the allowed transmission rate calculating unit 52, and each of the cells is output to an output channel corresponding to a VPI/VCI of its header. The addresses of the cells stored in the shared buffer memory 51 are managed by any of the address management FIFO buffer memories 55-1 through 55-n corresponding to an output channel identified by a VPI/VCI of an arrived cell. Each of the congestion detecting units 56-1 through 56-n detects congestion of a corresponding channel.

The structures of the address management FIFO buffer memories 55-1 through 55-n and the shared buffer memory 51 are not shown in the figure. An address to which a cell arrived in the shared buffer memory 31, is stored in any of the address management FIFO buffer memories 55-1 through 55-n, which corresponds to an output channel identified by a VPI/VCI of the arrived cell. In this case, a plurality of address management threshold values TH1 through THm are set in each of the address management FIFO buffer memories 55-1 through 55-n.

If the number of addresses of cells in the shared buffer memory 51, which are stored in an address management FIFO buffer memory corresponding to a certain output channel, exceeds a predetermined address management threshold value THm, it is determined that congestion occurs in that output channel. Then, the congestion detection signal is provided to the congestion detection controlling unit 54. The congestion detection controlling unit 54 outputs the information about which address management threshold value the number of addresses stored in the address management FIFO buffer memory corresponding to the output channel exceeds, to the ER writing unit 53 as a congestion notification signal.

The allowed transmission rate calculating unit 52 behaves in a similar manner as the above described allowed transmission rate calculating unit 22 shown in FIG. 7. That is, it calculates an allowed transmission rate corresponding to a connection, and outputs the calculated rate to the ER writing unit 53. If there is no congestion notification signal from the congestion detection controlling unit 54 at this time, the allowed transmission rate is written to explicit cell rate ER fields of forward and backward RM cells in the connection, and the cells are transmitted.

Figure 17:
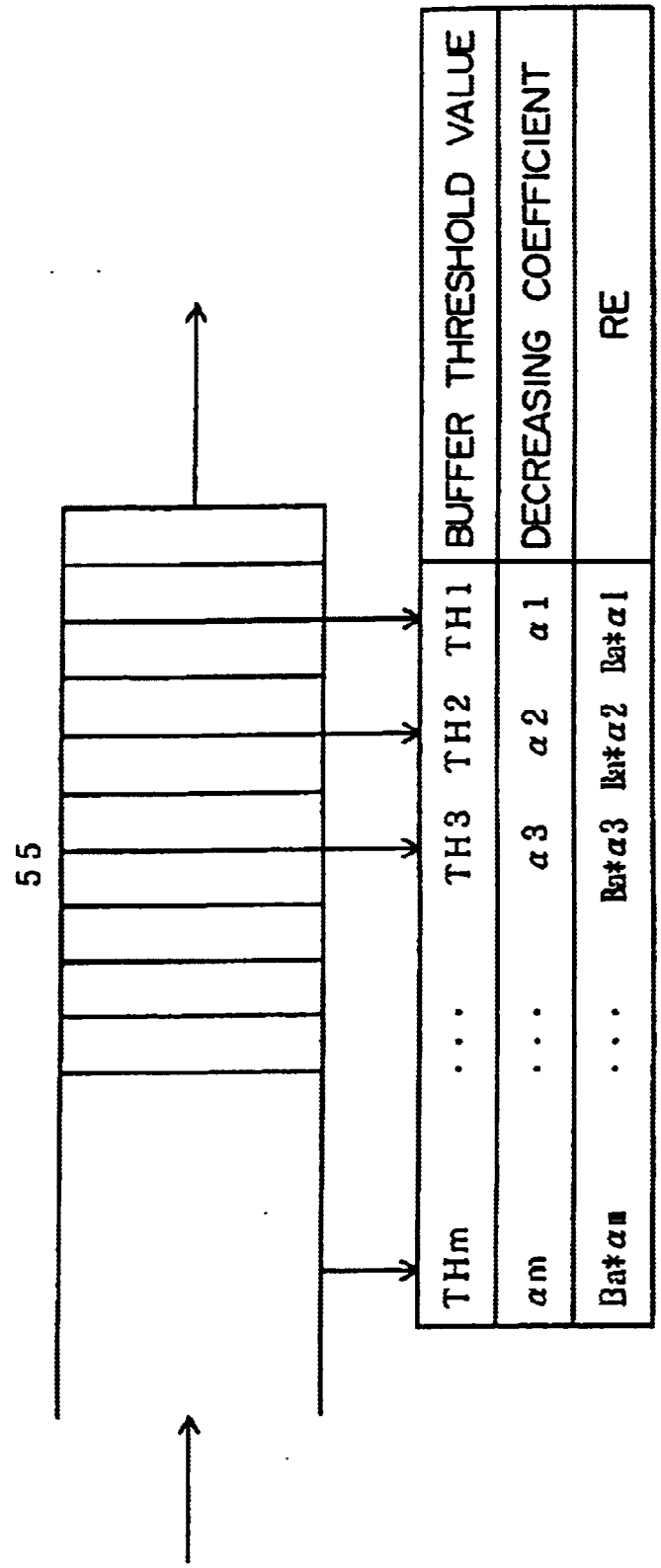
FIG. 17 is a schematic diagram explaining an address management FIFO buffer memory.

FIG. 17 is a schematic diagram explaining the address management FIFO buffer memory 55 (address management FIFO buffer memories 55-1 through 55-n).

The address management FIFO buffer memory 55 stores addresses of cells in the shared buffer memory 51 as a queue for reading the cells from the shared buffer memory 51. The address management threshold values TH1 through THm are set according to a queue length. The address management FIFO buffer memory 55 transmits the information about which address management threshold value a queue length corresponding to the number of stored addresses exceeds, to the congestion detection controlling unit 54 (refer to FIG. 16) via the congestion detecting units 56-1 through 56-n. If the queue length exceeds a particular threshold value THm, the congestion detecting units 56-1 through 56-n transmit a congestion detection signal to the congestion detection controlling unit 54.

Additionally, decreasing coefficients $\alpha1$ through $\alpha m$, with which the allowed transmission rate Ba is multiplied, are set on the condition that the number of stored addresses exceeds each of the threshold values TH1 through THm, for the address management FIFO buffer memory 55. The decreasing coefficients $\alpha1$ through $\alpha m$ are set in correspondence with the respective address management threshold values TH1 through THm. If the number of stored address exceeds any of the address management threshold values TH1 through THm, any of the decreasing coefficients $\alpha1$ through $\alpha m$, which corresponds to that value, is output. The ER writing unit 53 (refer to FIG. 16) multiplies the allowed transmission rate Ba output from the allowed transmission rate calculating unit 52, by any of the decreasing coefficients $\alpha1$ through $\alpha m$ ($1<\alpha1<\alpha2<\ldots<\alpha m$) input via the congestion detection controlling unit 54, and writes the resultant value to the ER fields of forward and backward RM cells as the allowed transmission rate. With the above described process, the allowed transmission rate written to the ER fields of the RM cells can be lowered to a rate which prevents an occurrence of congestion.

FIG. 16 shows the case in which identical address management threshold values TH1 through THm are set in each of the address management FIFO buffer memories 55-1 through 55-m. However, different address management threshold values may be set for respective output channels depending on their characteristics. Additionally, the decreasing coefficients $\alpha1$ through $\alpha$ corresponding to the respective address management threshold values TH1 through THm may be set to different values. Furthermore, address management threshold values may be set for the number of cells stored in the shared buffer memory 51, in a similar manner as in the address management FIFO buffer memories.

Still further, respective address management threshold values may be set for the shared buffer memory 51 and the address management FIFO buffer memories 55-1 through 55-m. Depending on whether or not the number of stored addresses exceeds the respective address management threshold values, an allowed transmission rate calculated by the allowed transmission rate calculating unit 52 may be multiplied by the decreasing coefficients $\alpha1$ through $\alpha m$, thereby lowering the allowed transmission rate to prevent an occurrence of congestion.

In the meantime, the allowed transmission rate calculating unit 52 may employ either a method which sets a period during which a predetermined number of cells arrive, as an observation period for calculating an allowed transmission rate, or a method which sets a predetermined period as the observation period. Additionally, the allowed transmission rate may be calculated in consideration of the minimum cell rate MCR.

Figure 18:
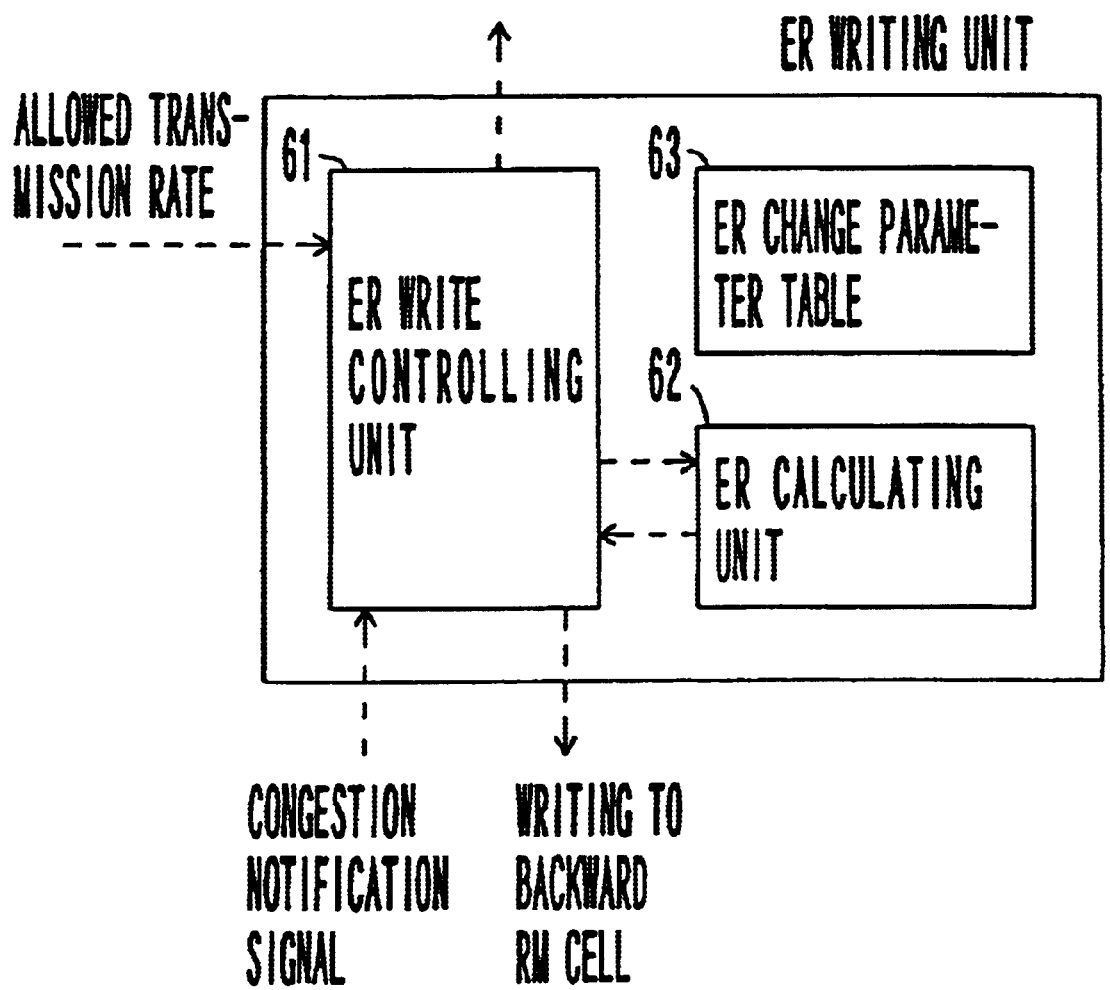
FIG. 18 is a schematic diagram explaining an ER writing unit according to the present invention.

FIG. 18 is a schematic diagram explaining the ER writing unit 53.

As shown in this figure, the ER writing unit 53 comprises an ER write controlling unit 61, ER calculating unit 62, and an ER change parameter table 63. The ER change parameter table 63 includes, for example, the address management threshold values TH1 through THm as shown in figure FIG. 19. It also includes the decreasing coefficients $\alpha1$ through $\alpha m$ ($1>\alpha1>\alpha2 \ldots \alpha m>0$) in correspondence with the address management threshold values TH1 through THm.

When the allowed transmission rate is transmitted from the allowed transmission rate calculating unit 52 to the ER write controlling unit 61, and a congestion notification signal is transmitted from the congestion detection controlling unit 54, the ER calculating unit 62 reads a corresponding decreasing coefficient from the ER change parameter table 63 based on an address management threshold value included in the congestion notification signal, and multiplies the allowed transmission rate transmitted from the allowed transmission rate calculating unit 52 by the read decreasing coefficient, in order to obtain the allowed transmission rate. Then, the allowed transmission rate so obtained is written to the ER fields of forward and backward RM cells, and these cells are transmitted.

The ER change parameter table 63 may be arranged in common to respective output channels. In this case, the ER change parameter table 63 includes tables corresponding to the respective output channels. Each of the tables may store a different decreasing coefficient. Otherwise, different address management threshold values TH1 through THm may be set for the respective output channels, as described above.

Each of the processing capabilities in each of the units according to the above described embodiments can be implemented by a processor, etc., or by dedicated hardware. Additionally, it may be applied to an ABR communication performed in an ATM network service in which the ABR service and another CBR (Constant Bit Rate) service, etc. are mixed. The embodiments of the present invention are not limited to those described above. A variety of capabilities and elements may be added or changed.

FIG. 20 is a schematic diagram showing the basic configuration of an ATM switching system according to the present invention.

The present invention assumes a feedback control system for implementing an ABR service which varies a transmission rate of cells from a transmitting terminal 109, etc., by feeding back a congested state in a cell switch which self-switches a fixed-length cell according to its attached routing information, to the transmitting terminal 109 using a resource management RM cell.

A congestion detecting unit 102 (congestion detecting unit 303 shown in FIG. 22) is arranged in a switching unit 101 (switching unit 201 shown in FIG. 21) in a cell switch, and detects its internal congested state.

A congestion indication information setting unit 103 (internal congestion setting unit 304) is also arranged in the switching unit 101 in the cell switch, and sets congestion indication information for indicating a congested state of a user data cell passing through the switching unit 101 in that cell, depending on the congested state detected by the congestion detecting unit 102. More specifically, the congestion indication information setting unit 103 sets the congestion indication information, for example, as an explicit forward congestion indication bit in the payload type field in the header of the user data cell.

A rate calculating unit 104 (rate calculating unit 206) is arranged for a low-speed transmission channel whose transmission rate is lower than that of the transmission channel of the switching unit 101 in the cell switch, such as a demultiplexer 108 (demultiplexer 205). It is intended to calculate an explicit rate (allowed transmission rate Ba(n)) for designating a transmission rate for the transmitting terminal 109. More specifically, the rate calculating unit 104 counts the number of active virtual connections in which a cell transmitted on the low-speed transmission channel, and whose transmission rate may be changed at the transmitting terminal 109, for each output channel (each subscriber line), divides the transmission rate set for each output channel by the number of active virtual connections for each output channel, and calculates an explicit rate based on the result of the division.

A rate changing unit 105 is arranged in a low-speed transmission channel identical to or different from the low-speed channel, for example, in a downward channel directing from the demultiplexer 108 to a subscriber line processing device 106 (subscriber line processing device 203). It is intended to detect a setting ratio of congestion indication information for a user data cell transmitted on the low-speed transmission channel, change the explicit rate ER calculated by the rate calculating unit 104 based on the setting ratio, and assign the changed explicit rate ER to a resource management cell (RM cell) which is transmitted on the low-speed transmission channel and fed back to the transmitted terminal 109. More specifically, the rate changing unit 105 makes a comparison between, for example, the setting ratio of the detected congestion indication information, and a predetermined threshold value such as a plurality of threshold values set depending on an increase/decrease of the rate, and changes the explicit rate calculated by the rate calculating unit 104 based on the result of the comparison. More specifically, the rate changing unit 105 changes the explicit rate ER calculated by the rate calculating unit 104, for example, by dividing the explicit rate ER that the rate calculating unit 104 calculates by a divisor determined based on the result of the comparison. In these cases, the rate changing unit 105 detects the setting ratio (rate) as the number of arrived user data cells, in each of which the congestion indication information in each observation period repeated at predetermined time intervals is set. Otherwise, the rate changing unit 105 detects the setting ratio as an arrival interval of user data cells, in each of which the congestion indication information is set. The rate changing unit 105 may smooth the setting ratio of the detected congestion indication information based on the setting ratio detected before and/or after the detection of the information, make a comparison between the smoothed setting ratio and a predetermined threshold value, and change the explicit rate ER that the rate calculating unit 104 calculates based on the result of the comparison. The smoothing operation in this case is executed, for example, based on the following equation.

$$C(n) = \beta \cdot \text{Now}(n) + (1-\beta) \cdot C(n-1)$$

C(n) is a setting ratio after a current smoothing operation;
$\beta$ is a weight ($0 < \beta \leq 1$);
Now(n) is an unsmoothed setting ratio which is currently detected; and
C(n−1) is a setting ratio after a previous smoothing operation.

Note that the rate changing unit 105 may change the explicit rate that the rate calculating unit 104 calculates at a predetermined ratio, when a user data cell in which the congestion indication information is set, arrives in each observation period repeated at predetermined time intervals.

According to the present invention, only the capability for setting the congestion indication information in a user data cell, is arranged in the switching unit 101; the capability for calculating the explicit rate, which requires a considerable amount of time, is arranged on a low-speed transmission channel in which the switch speed of cells is relatively low; and the explicit rate ER calculated on the low-speed transmission channel is changed based on the setting state of the congestion indication information for a user data cell. In this way, the restrictions on the hardware configuration can be released, and a congested state of the switch 101 can properly be reflected on the explicit rate ER set in a resource management cell.

In the above described configuration of the present invention, the rate calculating unit 104 may set the calculated explicit rate ER in a resource management cell which is transmitted on a low-speed transmission channel, and fed back to the transmitting terminal 109; the rate changing unit 105 may extract the resource management cell with the explicit rate that the rate calculating unit 104 calculates, from the low-speed transmission channel, change the explicit rate set in the resource management cell based on the setting ratio, and reset the changed explicit rate in the extracted resource management cell, and then retransmit the resource management cell to the low-speed transmission channel.

With this configuration, the rate calculating unit 104 can efficiently notify the explicit rate to the rate changing unit 105.

Additionally, the rate changing unit 105 smooths the setting ratio of the detected congestion indication information based on the detected setting ratio, and changes the explicit rate ER based on the smoothed setting ratio, so that a traffic in a network can be prevented from becoming unstable due to an extreme change of the explicit rate.

Figure 21:
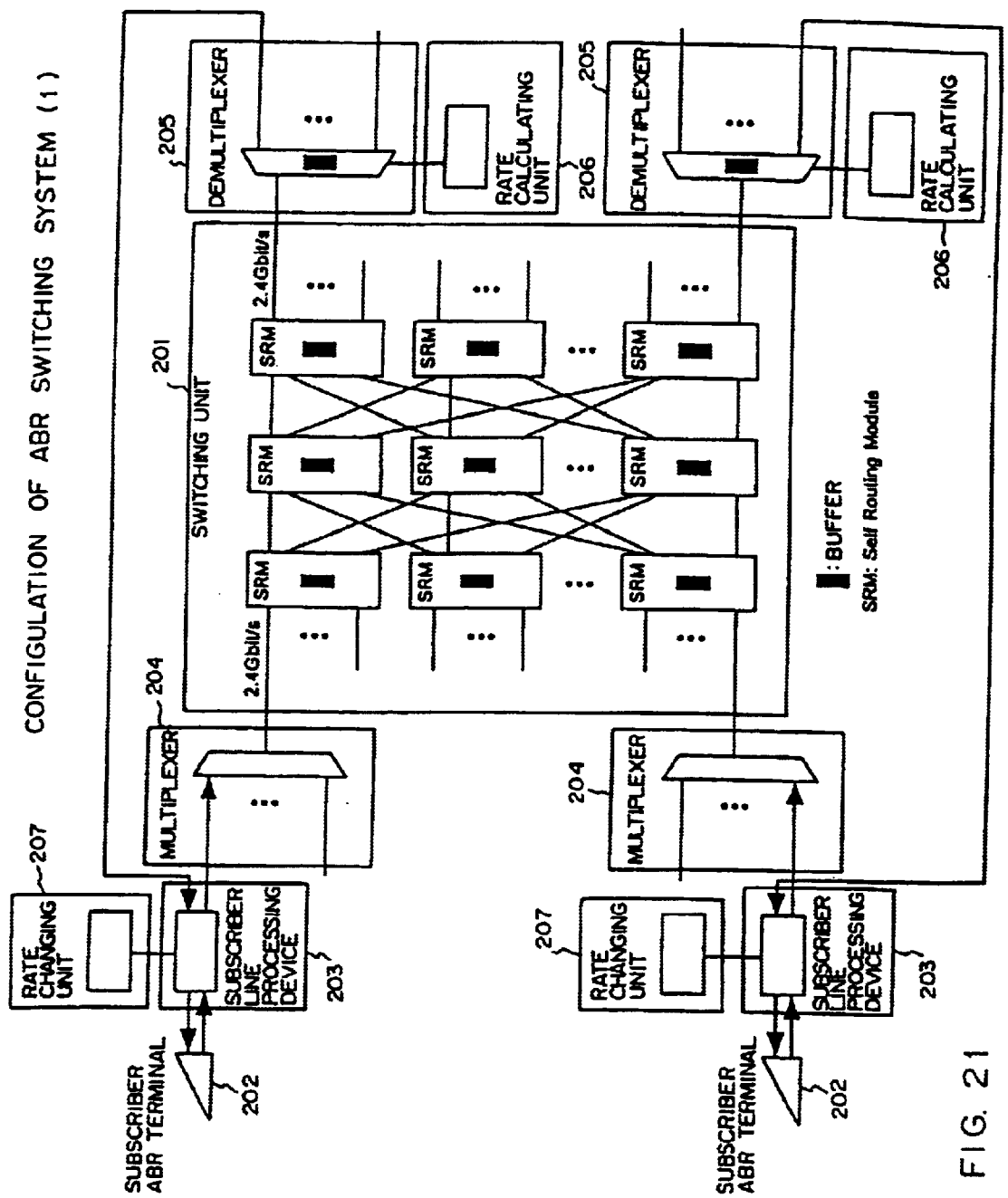
FIG. 21 is a schematic diagram showing the configuration of an ABR switching system according to the present invention.

FIG. 21 is a schematic diagram showing a first embodiment of an ATM switching system according to the present invention.

In this system, a subscriber line processing device 203 terminates a low-speed line to which a subscriber terminal (ABR terminal of a subscriber) 202 is connected, and performs a UPC (Usage Parameter Control) of a rate of flow of cells flowing from the subscriber terminal 202, an accounting process, etc.

A multiplexer 204 multiplexes low-speed lines, at each of which the subscriber line processing device 203 terminates, and connects the multiplexed lines to a high-speed internal input link.

A switching unit 201 is configured by connecting a plurality of self-routing modules (SRMs), each of which switches a high-speed input link to several high-speed output links for each cell. The switching unit 201, which particularly relates to the present invention as will be described later, comprises a capability for setting an EFCI bit in a header of a user data cell depending on an internal congested state.

A demultiplexer 205 demultiplexes the high-speed internal output link connected to the output side of the switching unit 201, into low-speed subscriber lines.

A rate calculating unit 206, which particularly relates to the present invention, is connected to the demultiplexer 205 to calculate the allowed transmission rate Ba(n) which is the basic rate for calculating the explicit rate ER.

Also a rate changing unit 207 particularly relates to the present invention, and is arranged in a backward channel directed from the demultiplexer 205 to the subscriber line processing device 203. It calculates the explicit rate ER based on both the allowed transmission rate Ba(n) calculated by the rate calculating unit 206, and the number of times that the switching unit 201 sets the EFCI bit in a user data cell passing along that channel, and writes the calculated explicit rate ER to an RM cell.

To accommodate a subscriber terminal which uses a service requiring feedback control such as an ABR service in an ATM network, an ATM switch itself requires the capability for calculating/setting the explicit rate ER set in an RM cell in order to control the subscriber terminal, as described above. However, the explicit rate ER must be calculated/set in the order of microseconds. Accordingly, the calculation/setting of the rate cannot be made within such a narrow time frame, in a unit in which cells are quickly switched (such as a switching unit) due to hardware restrictions. Therefore, such a capability cannot be implemented.

Accordingly, the capability for calculating/setting the explicit rate ER is arranged in the demultiplexer 205 which switches cells at a relatively low speed, in the system shown in FIG. 21. In the demultiplexer 205, the cell switching speed is relatively low and its output channel (channel on an output side) is restricted. Therefore, the capability for calculating/setting the explicit rate ER is easy to implement. With this configuration, however, while congestion occurring in the demultiplexer 205 can be suppressed to some extent using the capability for calculating/setting the explicit rate ER, congestion occurring the switching unit 201 cannot be suppressed.

To overcome this problem, a capability for setting an EFCI bit in a header of a user data cell depending on an internal congested state, is arranged in the switching unit 201 of the system shown in FIG. 21. Additionally, a rate changing unit 207, to be described later, is arranged in a backward (downward) channel directed from the demultiplexer 205 to the subscriber line processing device 203. The rate changing unit 207 measures the setting ratio of the EFCI bit for a user data cell passing along the backward channel, calculates the explicit rate ER based on the result of the measurement and the allowed transmission rate Ba(n) calculated by a rate calculating unit 206, which will be described later, and writes this rate to an RM cell passing along the backward channel. With such a configuration, an occurrence of congestion in the switching unit 201 can be suppressed.

Figure 22:
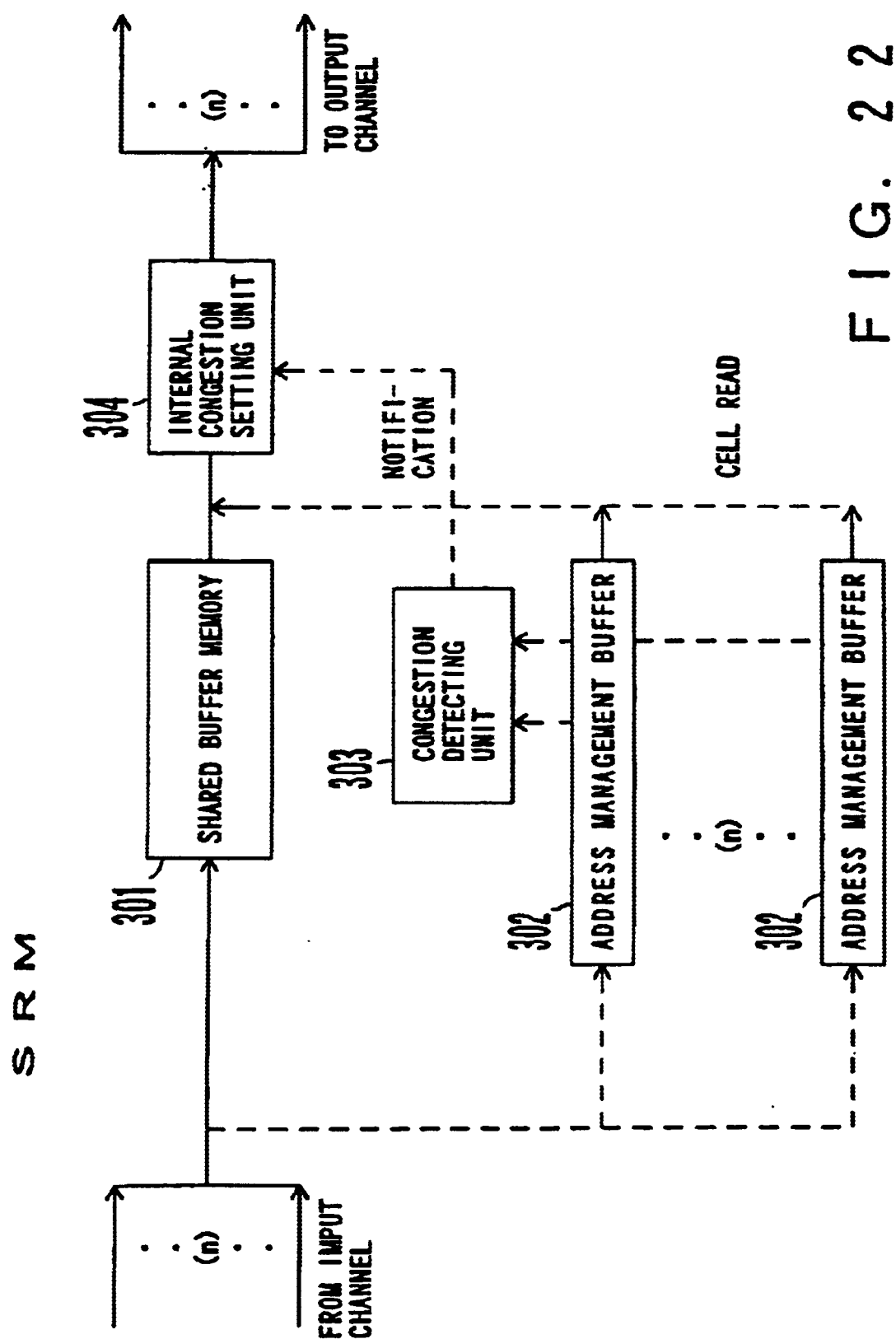
FIG. 22 is a schematic diagram showing the configuration of an SRM in a switching unit according to the present invention.

FIG. 22 is a schematic diagram showing the structure of an SRM configuring the switching unit 201. Also the systems shown in FIGS. 7 and 16 may be implemented by the SRM configuring the switching unit 201.

A shared buffer memory 301 temporarily stores cells respectively input from "n" input channels (internal input links). "n" address management buffers 302 are arranged for respective "n" output channels (or internal output links). If one or more cells to be output to each channel are stored in the shared buffer memory 301, their addresses are stored in one of the address management buffers 302. The cells stored at the addresses in the shared buffer memory 301, which correspond to the addresses stored in the address management buffer 302 in correspondence with an output channel, are sequentially read out, and output to the output channel. After the cells are read out, the corresponding addresses in the address management buffer 302 are deleted.

A congestion detecting unit 303 makes a comparison between the number of addresses stored in the address management buffer 302, corresponding to an output channel and a predetermined threshold value, for each output channel. With this operation, congestion in each output channel is detected. Here, the number of addresses stored in each of the address management buffers 302 indicates that cells, the number of which is equal to each of the number of the stored addresses, remain in the shared buffer memory 301 for an output channel corresponding to the address management buffer 302. Accordingly, a congested state of each output channel can be detected by monitoring the number of addresses. The congestion detecting unit 303 then notifies existence/non-existence of congestion to an internal congestion setting unit 304.

When a cell to be output to an output channel is read from the shared buffer memory 301, the internal congestion setting unit 304 sets the EFCI bit in a header of a user data cell, when the user data cell to be output to the output channel in which congestion occurs is read from the shared buffer memory 301, based on a notification from the congestion detecting unit 303.

Figure 23:
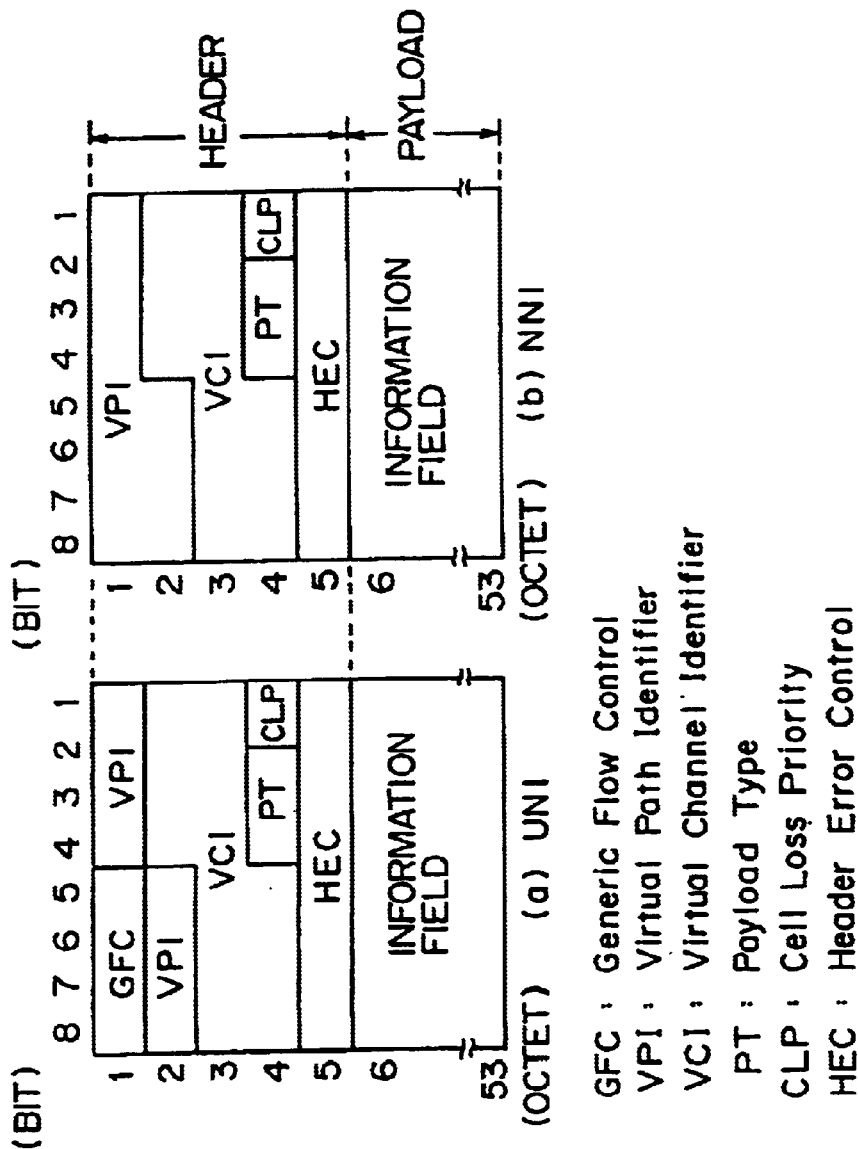
FIG. 23 is a schematic diagram showing the data format of a cell.

FIG. 23 is a schematic diagram showing the typical data format of a cell. (a) in FIG. 23 shows the format of a UNI (User Network Interface) which is an interface of a subscriber line, while (b) in FIG. 23 shows the format of an NNI (Network Node Interface) which is an interface of an inter-office relay line. As shown in FIG. 23, a cell includes a header and a payload. Communication data (user data or each type of control data) are stored in an information field which is a payload. In the header, a general flow control field GFC is used to control a conflict of cells in a LAN (Local Area Network), etc. A virtual path identifier VPI is address information for identifying a virtual path VP of a cell, while a virtual channel identifier VCI is address information for identifying a virtual channel VC of the cell. A cell loss priority CLP field is used to control a priority of a cell transfer. A header error control field HEC is an error check code for detecting/correcting a data error in the header. A payload type field PT particularly relates to the present invention, and stores information indicating a cell type and an EFCI bit. The length of the payload type field PT is 3 bits. In a user data cell, the value "0" is assigned to the third bit (leftmost bit) of the payload type field PT. Additionally, the second bit (central bit) of the payload type field PT serves as the EFCI bit in the user data cell. If the value of the EFCI bit is "0", it indicates that congestion does not occur in the user data cell. If the value of the EFCI bit is "1", it indicates that congestion occurs in the user data cell.

The internal congestion setting unit 304 shown in FIG. 22 assigns the value "1" indicating an occurrence of congestion to the EFCI bit in the user data cell, when a user data cell of an output channel whose occurrence of congestion is notified by the congestion detecting unit 303, is read out. In the meantime, 3-bit data "110" is assigned to the payload type field PT of an RM cell to be described later.

In the switching unit 201, an overhead of several octets, which stores a self-routing tag, is added to the beginning of each cell. Also the values of VPI and VCI are converted, but the 3-bit data assigned to the payload type field PT is transmitted as it is.

Figure 24:
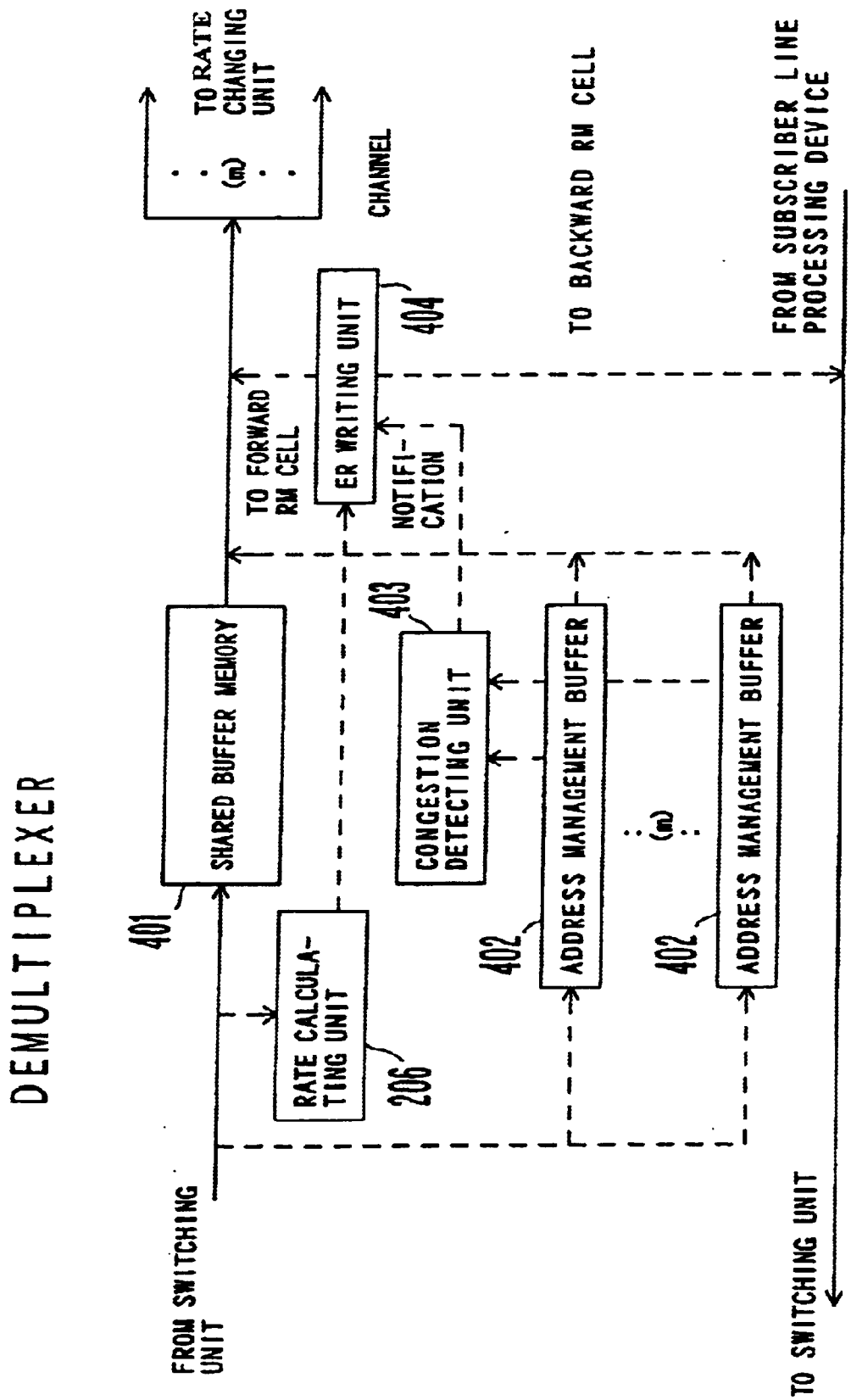
FIG. 24 is a schematic diagram showing the configuration of a demultiplexer.

FIG. 24 is a schematic diagram showing the structure of the demultiplexer 205. The fundamental structure of the demultiplexer 205 is similar to that of the SRM configuring the switching unit 201 shown in FIG. 21.

A shared buffer memory 401 temporarily stores cells input from one output channel of the switching unit 201.

"m" address management buffers 402 are arranged for respective "m" subscriber lines (respective "m" subscriber line processing devices 203). Each of the address management buffers 402 stores one or more addresses storing one or more cells to be output to each subscriber line, in the shared buffer memory 401. The cells stored at the addresses in the shared buffer memory 401, which correspond to the addresses stored in any of the address management buffers 402 corresponding to each subscriber line, are sequentially read out, and output to each subscriber line. When the cells are read out, the corresponding addresses in the address management buffer 402 are deleted.

The congestion detecting unit 403 detects existence/non-existence of congestion (or congestion level) of each subscriber line, by making a comparison between the number of addresses stored in each of the address management buffers 402 corresponding to each subscriber line, and a predetermined threshold value (or a plurality of threshold values), for each subscriber line. Here, the number of addresses stored in each of the address management buffers 402 indicates that cells, the number of which is equal to the number of addresses, remain in the shared buffer memory 401, for a subscriber line corresponding to the address management buffer 402. Accordingly, the congested state of each subscriber line can be detected by monitoring each of the numbers of addresses. The congestion detecting unit 403 then notifies the existence/non-existence of congestion (or congestion level) to the ER writing unit 404, for each subscriber line.

The rate calculating unit 206 (also refer to FIG. 21) counts the number of active virtual connections (VCs) for each subscriber line, and calculates the allowed transmission rate Ba(n) which is a transmission rate equally assigned to each VC as a result of dividing the transmission rate of each subscriber line by each number of active VCs. The rate calculating unit 206 notifies the allowed transmission rate Ba(n) for each subscriber line of the ER writing unit 404 and the rate changing unit 207 (refer to FIG. 21) to be described later.

Figure 25:
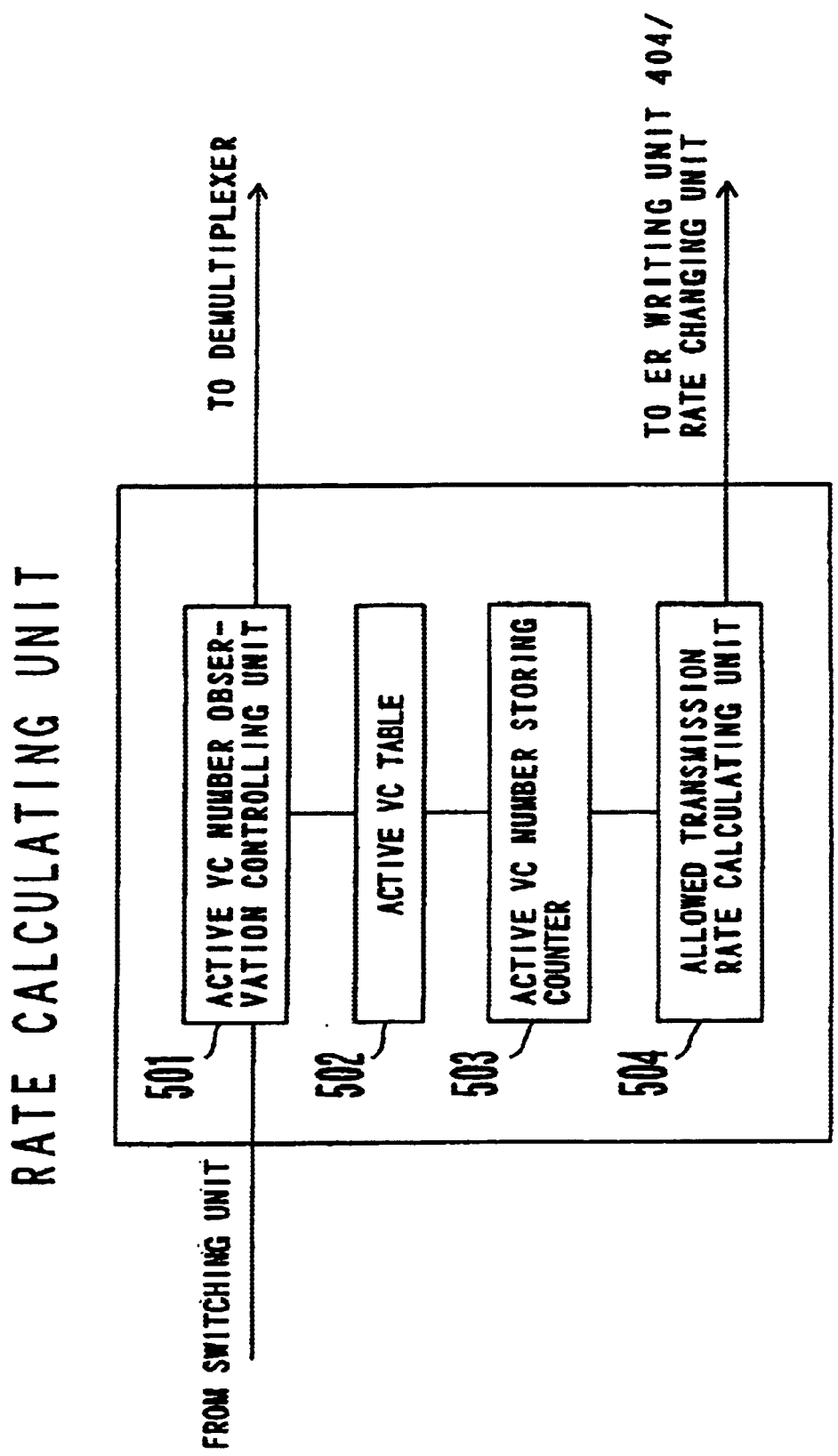
FIG. 25 is a schematic diagram showing a rate calculating unit according to the present invention.

FIG. 25 is a schematic diagram showing the structure of the rate calculating unit 206.

An active VC number observation controlling unit 501 comprises a counter for counting ABR cells (user data cells in each of which information identifying the all as an ABR service cell is set), whose number is predetermined. It stores a connection identifier attached to an ABR cell in an active VC (virtual connection) table 502 corresponding to each subscriber line, by identifying the connection identifier attached to the ABR cell and a subscriber line on an output side upon arrival of the ABR cell, and sets a cell arrival identification flag indicating that the ABR cell arrives during a current observation period, for the virtual connection corresponding to the connection identifier. At the same time, the active VC number observation controlling unit 501 increments an active VC number storing counter 503 which is intended to count the number of active VCs for each subscriber line, and corresponds to each subscriber line. If an ABR cell having the same connection identifier as that in which a cell arrival identification flag is set, stored in the active VC table 502 for each subscriber line, arrives within the same observation period, the active VC number observation controlling unit 501 does not increment the active VC number storing counter 503 for each subscriber line.

When each observation period terminates, the value of the active VC number storing counter 503 for each subscriber line, that is, the number of active VCs for each subscriber line, is notified to an allowed transmission rate calculating unit 504, and at the same time, the contents of the active VC table 502 and the active VC number storing counter 503 are cleared. An observation period is repeatedly and sequentially set at predetermined time intervals, by using a timer, not shown in this figure.

The allowed transmission rate calculating unit 504 calculates the allowed transmission rate Ba(n) which is a transmission rate equally assigned to each VC, as a result of dividing a transmission rate of each subscriber line (normally the same rate) by the value of the active VC number storing counter 503, for each subscriber line. The rate calculating unit 206 notifies the allowed transmission rate Ba(n) of each subscriber line, to the ER writing unit 404 and the rate changing unit 207, to be described later (refer to FIGS. 21 and 27).

In FIG. 24, the allowed transmission rate Ba(n) of each subscriber line notified from the rate calculating unit 206 is assigned to the ER field (described later in FIG. 26) of an RM cell, when the RM cell of each subscriber line is read from the shared buffer memory 401. Otherwise, the ER writing unit 404 may change the allowed transmission rate Ba(n) based on existence/non-existence of congestion (or a congestion level) of each subscriber line, which is notified from the congestion detecting unit 403, and assign this rate to the RM cell, without assigning the unchanged notified allowed transmission rate Ba(n). The congested state of the demultiplexer 205 is reflected on the changed allowed transmission rate Ba(n), in this case. In this way, an RM cell of each subscriber line, to which the allowed transmission rate Ba(n) is assigned, is transferred to each rate changing unit 207, which is arranged in each backward channel directed from the demultiplexer 205 to each subscriber line processing device 203. Then, the explicit rate ER on which the congested state of the switching unit 201 is reflected, is assigned to that RM cell.

Figure 26:
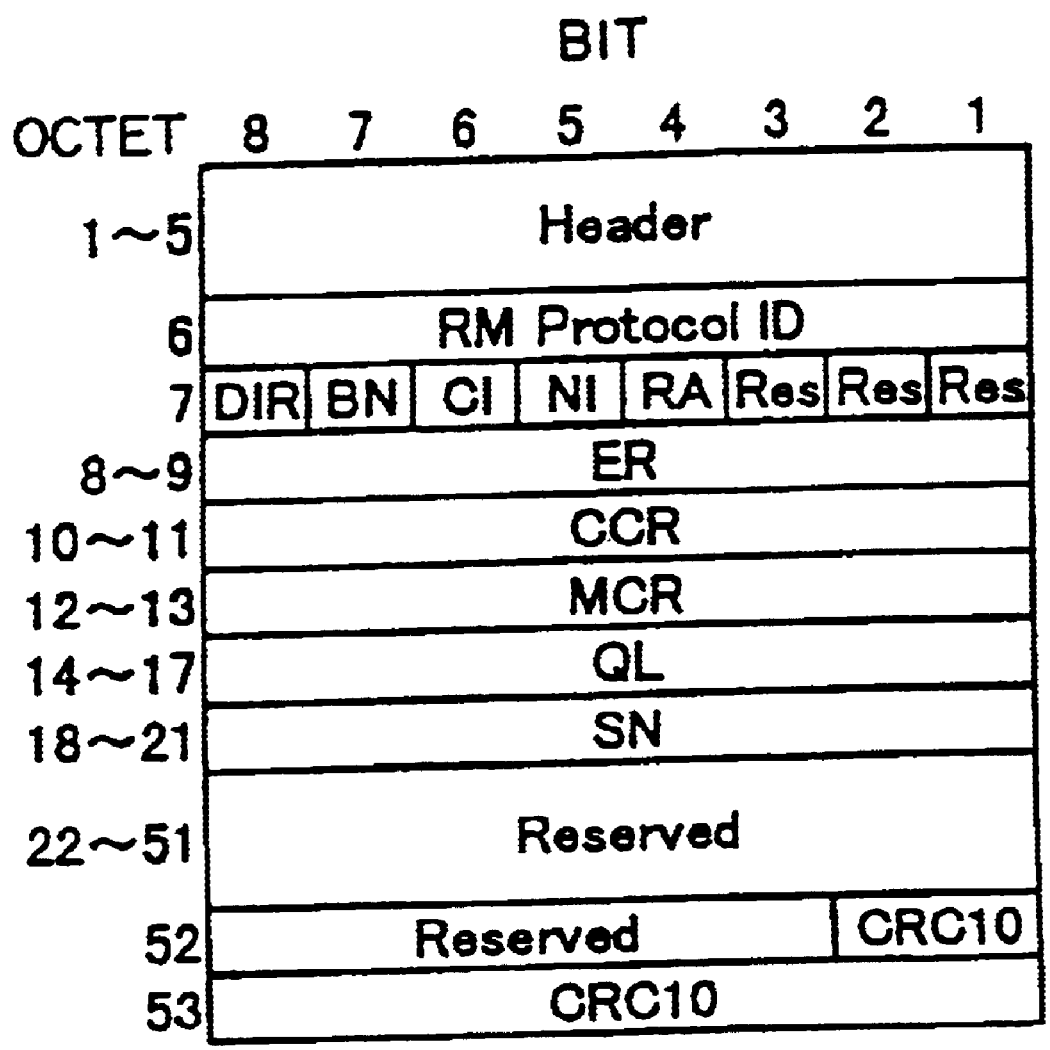
FIG. 26 is a schematic diagram showing a data format of an RM cell.

FIG. 26 is the data format of an RM cell.

In the RM cell, 3-bit data "110" is assigned to the payload type field PT (refer to FIG. 23) in its header. If the RM cell is an RM cell for use in a virtual path connection ABR service, the value "6" is assigned to the VCI field of its header.

Next, the value "1" corresponding to the ABR service, is assigned as an RM protocol ID at the sixth octet of the payload.

The seventh octet of the RM cell is called a message type field in which the following bit information are set.

| | |
|---|---|
| DIR: | Direction indication bit.<br>Forward direction = 0<br>Backward direction = 1 |
| BN: | BECN cell indication bit. This bit is set to "1" if a switching unit or a receiving terminal generates a backward RM cell. With this manipulation, a distinction between a forward RM cell generated by a transmitting terminal and a backward RM cell, can be made. |
| CI: | Congestion indication bit.<br>CI = 1 (indicating congestion)<br>CI = 0 (indicating non-congestion)<br>The allowed transmission rate ACR of a transmitting terminal is requested to be lowered if this bit is "1". |
| NI: | No increase bit. This bit is set in order not to raise the allowed cell rate ACR of a transmitting terminal. Unlike the CI bit, this bit does not request to lower the allowed cell rate ACR. Normally, the transmitting terminal transmits an RM cell whose NI is set to "0". |
| RA: | Request/Acknowledge bit. This bit is not used in the ABR service stipulated by the ATM Forum. |

The explicit rate ER is assigned to the 8th and 9th octets of an RM cell. This ER field particularly relates to the present invention.

Since the fields from the 10th till 51st octets of the RM cell do not particularly relate to the present invention, their detailed explanations are omitted here.

A CRC-10 code assigned to the 52nd and 53rd octets is intended for detecting/correcting a data error.

Figure 27:
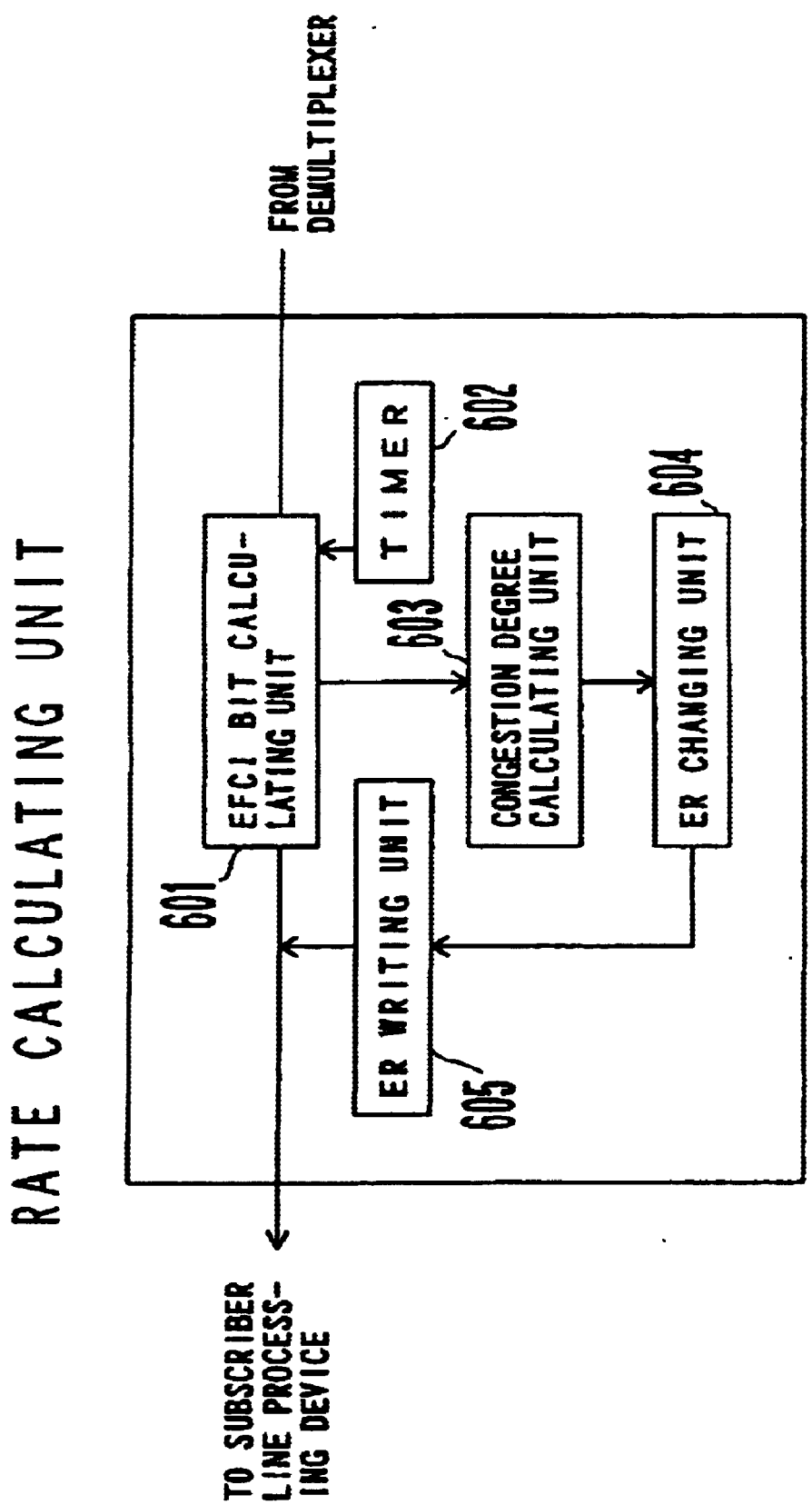
FIG. 27 is a schematic diagram showing the configuration of a rate changing unit according to the present invention.

FIG. 27 is a schematic diagram showing the configuration of the rate changing unit 207 arranged in each backward channel directing from the demultiplexer 205 to each subscriber line processing device 203.

An EFCI bit calculating unit 601 detects a cell whose EFCI bit is set to "1" among cells transmitted from the demultiplexer 205 to the subscriber line processing device 203, and increments the number of cells Now(n) indicating the degree of congestion each time that cell is detected. At this time, each observation period is set by a timer 602.

The number of cells Now(n) indicating the degree of congestion, which is obtained for each observation period, is notified to a congestion degree calculating unit 603. The congestion degree calculating unit 603 smooths the degree of congestion using the number of cells Now(n) indicating the degree of notified congestion, and three values $\beta$, C(n), and C(n−1), based on the following equation.

$$C(n) = \beta \cdot \text{Now}(n) + (1-\beta) \cdot C(n-1)$$

where $\beta$ is a weight whose range is $0 < \beta \leq 1$, C(n) is a parameter indicating the degree of congestion to be calculated in a current observation period, and C(n−1) is a parameter indicating the degree of congestion calculated in a previous observation period. Such a smoothing operation prevents a traffic of a network from becoming unstable due to an extreme change in the explicit rate ER.

The ER changing unit 604 makes a comparison between the degree of congestion C(n) in the current observation period, which is calculated based on the above described equation, and a predetermined threshold value. It then calculates a divisor value for calculating the explicit rate ER from the allowed transmission rate Ba(n), which is notified by an RM cell from the above described rate calculating unit 206, based on the result of the comparison.

The ER writing unit 605 calculates the explicit rate ER by dividing the allowed transmission rate Ba(n) assigned to the ER field of the RM cell by the divisor value notified from the ER changing unit 604, when the RM cell is transferred from the demultiplexer 205. It then assigns the calculated explicit rate ER to the ER field of that RM cell, and transmits the RM cell to the subscriber line processing device 203.

In response to such a process performed on the ATM switch side, the subscriber terminal 202 on a transmitting side (refer to FIG. 21) extracts the explicit rate ER from the RM cell, recalculates the allowed cell rate ACR based on the explicit rate ER, and makes a communication at a rate equal to or lower than the ACR. In this way, an occurrence of congestion can be prevented in the switching unit 201 and the demultiplexer 205.

Figure 28:
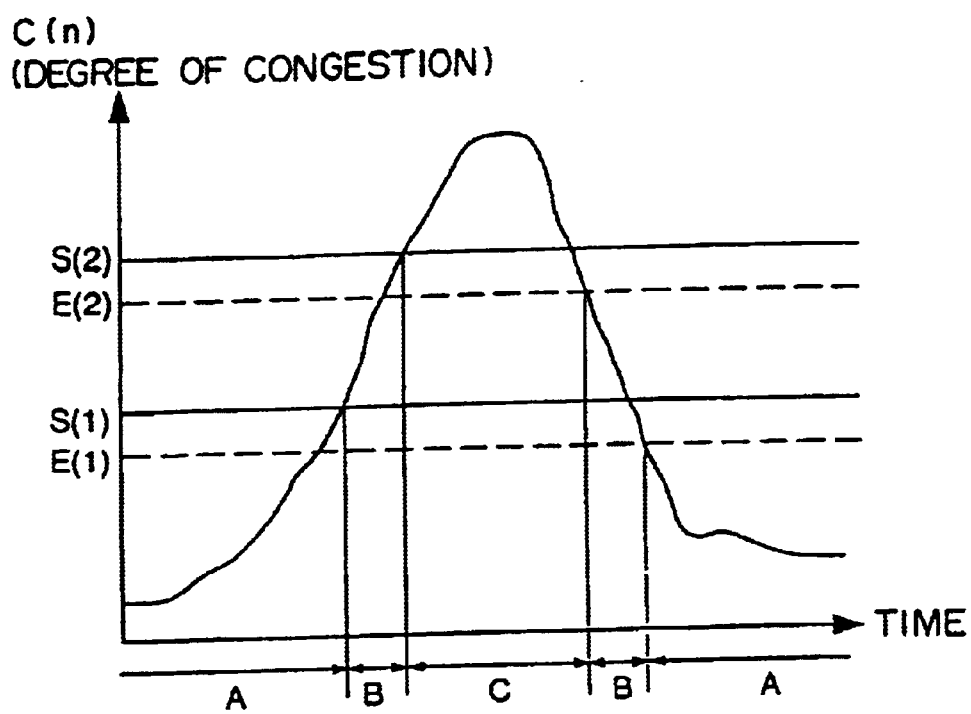
FIG. 28 is a schematic diagram explaining operations performed by an ER changing unit according to the present invention.

FIG. 28 exemplifies a relationship between the degree of congestion C(n) in a current observation period, and a predetermined threshold value, between which the ER changing unit 604 makes a comparison, and a relationship between the degree of congestion C(n), the predetermined threshold value, and the dividing process performed in the ER writing unit 605.

In this figure, the horizontal axis indicates time, while the vertical axis indicates the value of the degree of congestion C(n). As shown in this figure, C(n) becomes larger as time elapses in the first half of the relationship curve. This phenomenon indicates that congestion is occurring in the switching unit 201. In the example shown in this figure, S(1) and S(2) are set as threshold values for starting a change of the explicit rate ER, and E(1) and E(2) are set as threshold values for cancelling the change of the ER.

The ER changing unit 604 sets the divisor value "1" while C(n) does not exceed the threshold value (1) (in a period A). In this case, congestion does not occur in the switching unit 201. Accordingly, the ER writing unit 605 assigns the allowed transmission rate Ba(n) as the explicit rate ER as it is.

If C(n) exceeds a threshold value S(1) (period B), the ER changing unit 604 sets a divisor value 2. The switching unit 201 becomes lightly congested in this case. The ER writing unit 605 sets a value obtained by dividing the allowed transmission rate Ba(n) by the value (2), as the explicit rate ER.

If C(n) exceeds also the threshold value S(2) (period C), The ER changing unit 604 sets a divisor value "4". In this case, the switching unit 201 becomes heavily congested. Then, the ER writing unit 605 sets the value obtained by dividing the allowed transmission rate Ba(n) by the value "4", as the explicit rate ER.

If C(n) becomes smaller than the threshold value E(2) (period C→B), the ER changing unit 604 changes the devisor value "4" to the value "2". Additionally, the ER changing unit 604 changes the divisor value "2" to "1" if C(n) becomes smaller than the threshold value E(1) (period B→A).

In this way, the congested state of the switching unit 201 is properly reflected on the explicit rate ER to be set in an RM cell.

In the above described embodiment, the explicit rate ER is calculated by dividing the allowed transmission rate Ba(n) by a predetermined divisor value. The present invention, however, is not limited to this embodiment. A ratio of cells whose EFCI bit is set to the value "1" among cells transferred from the demultiplexer 205 to the subscriber line processing device 203, may be detected to change the allowed transmission rate Ba(n) based on the ratio, according to a predetermined rule.

Additionally, not the number of cells whose EFCI bit is set to "1" in each predetermined observation period, but an arrival interval of cells whose EFCI bit is set to "1", may be measured to perform the above described control based on the result of the measurement.

In the above described embodiment, the allowed transmission rate Ba(n) calculated by the rate calculating unit 206 is once set in an RM cell in a network, the RM cell is extracted by the rate changing unit 207, the explicit rate ER assigned to the RM cell is changed, and the changed ER is reassigned to the RM cell. With this configuration, the explicit rate can be efficiently notified from the rate calculating unit 206 to the rate changing unit 207. Otherwise, the allowed transmission rate Ba(n) may be notified from the rate calculating unit 206 to the rate changing unit 207 via a dedicated control line.

The method for calculating the allowed transmission rate Ba(n) performed in the rate calculating unit 206 is not limited to the above described method.

Figure 29:
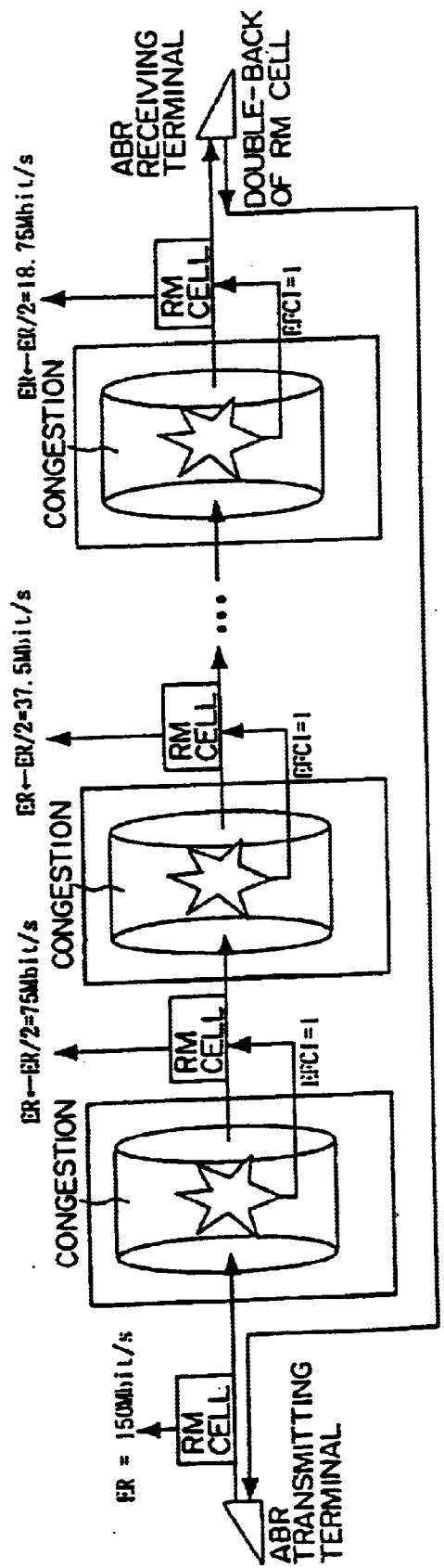
FIG. 29 is a schematic diagram showing a relationship between an occurrence of congestion and an ER.

FIG. 29 is a schematic diagram showing the change of the explicit rate ER in the case that congestion occurs in each SRM in the switching unit 201 shown in FIG. 21.

If congestion occurs in a first SRM in the switching unit 201 when a cell whose ER is set to 150 Mbits/s passes through the switching unit 201, the EFCI bit of that cell is set to "1" in order to notify the congestion, as shown in this figure. If the ER changing unit 604 sets a divisor value, for example, as "2", for this congestion according to the above described method, the ER writing unit 605 assigns the value obtained by dividing the explicit rate ER by 2, that is, 75 Mbits/s, to the cell as a new ER.

As a result, it is notified to a transmitting terminal of this cell that the allowed transmission rate for a communication route for the above described cell is 75 Mbits/s.

If congestion occurs in another SRM in the communication route of the above described cell (a the 2nd congestion occurs), the ER is again set to one half of the allowed transmission rate, that is, 37.5 Mbits/s according to the method similar to that described above. If congestion occurs in a further SRM (a 3rd congestion occurs), the ER is set to one half of 37.5 Mbit/s, that is, 18.75 Mbits/s.

Figure 30:
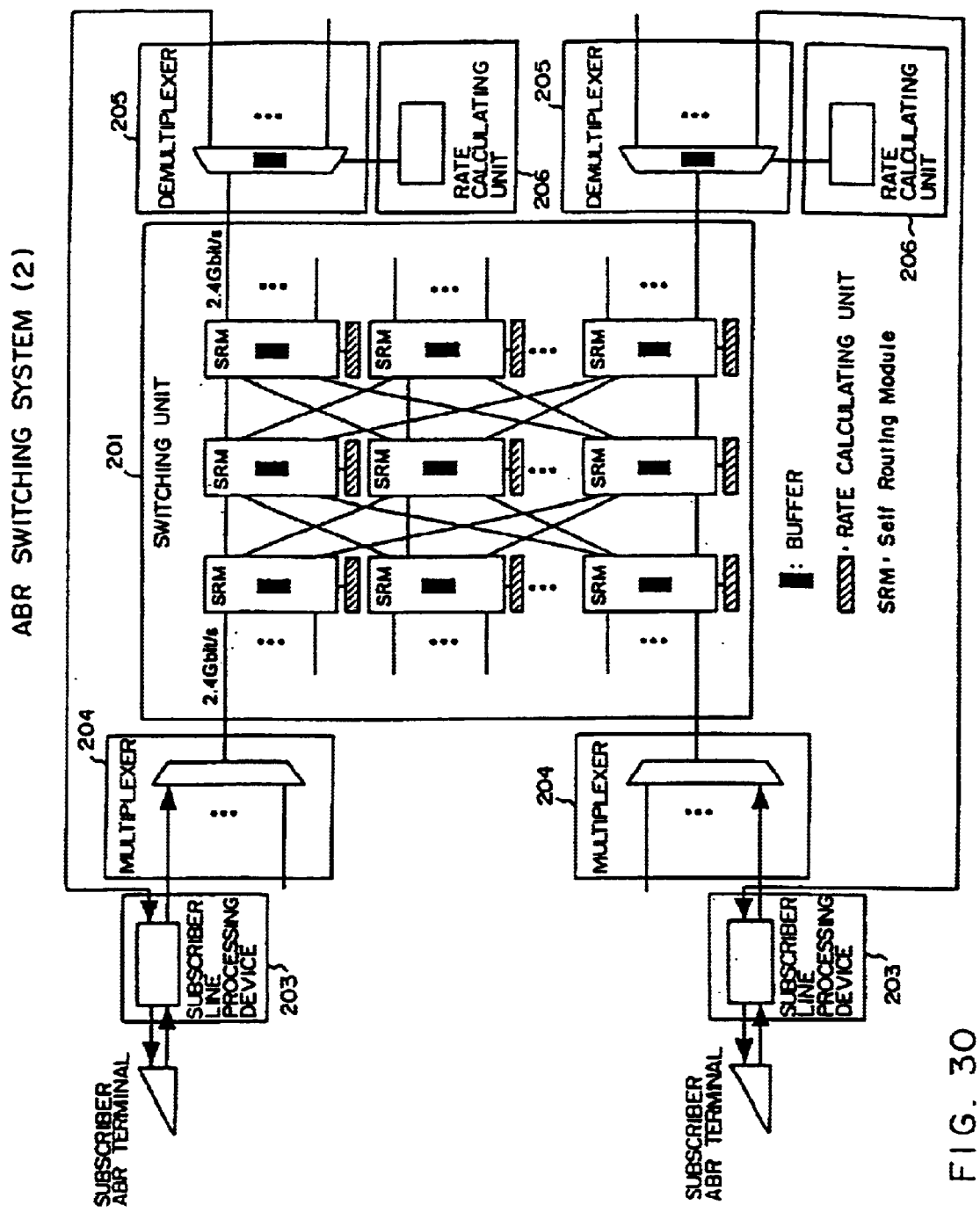
FIG. 30 is a schematic diagram showing the second configuration of the ABR switching system according to the present invention.

FIG. 30 is a schematic diagram showing the second configuration of the ATM switching system according to the present invention. This figure shows the configuration of the system in which a rate calculating unit is arranged for each of the SRMs in the switching unit 201 shown in FIG. 21. The portions having the same capabilities as those shown in FIG. 21 are denoted by the same reference numerals, and their explanations are omitted here.

Figure 31:
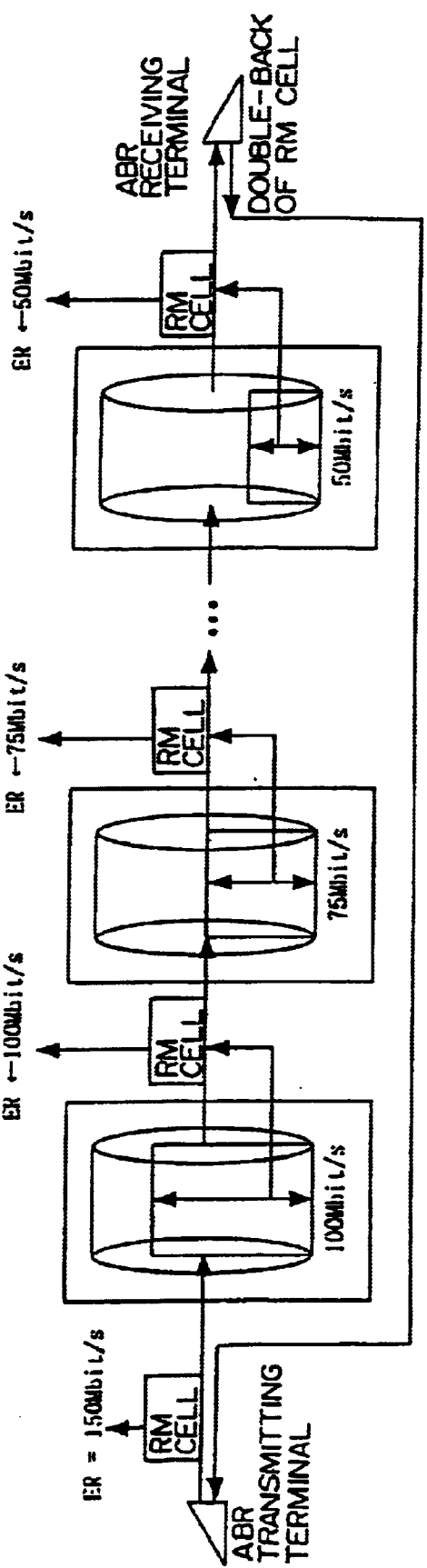
FIG. 31 is a schematic diagram showing a relationship between an occurrence of congestion and an ER.

The switching unit 201' in the ATM switching system comprises a plurality of SRMs in a similar manner as in the switching unit shown in FIG. 21. The rate calculating unit shown in FIG. 25 is arranged for each of the SRMs. Each of the rate calculating units 206 calculates the allowed transmission rate Ba(n) based on a congested state in a corresponding SRM, according to the above described method. The calculated allowed transmission rate Ba(n) is transmitted to the ER writing unit 404, which may be arranged for each of the SRMs in order to correspond to the rate calculating unit 206 of each of the SRMs. Furthermore, the rate changing unit 207 shown in FIG. 21 may be arranged for each of the SRMs. For example, a new ER value is assigned to the ER field of a cell each time the cell passes through an SRM, as shown in FIG. 31, in this case.

Figure 32:
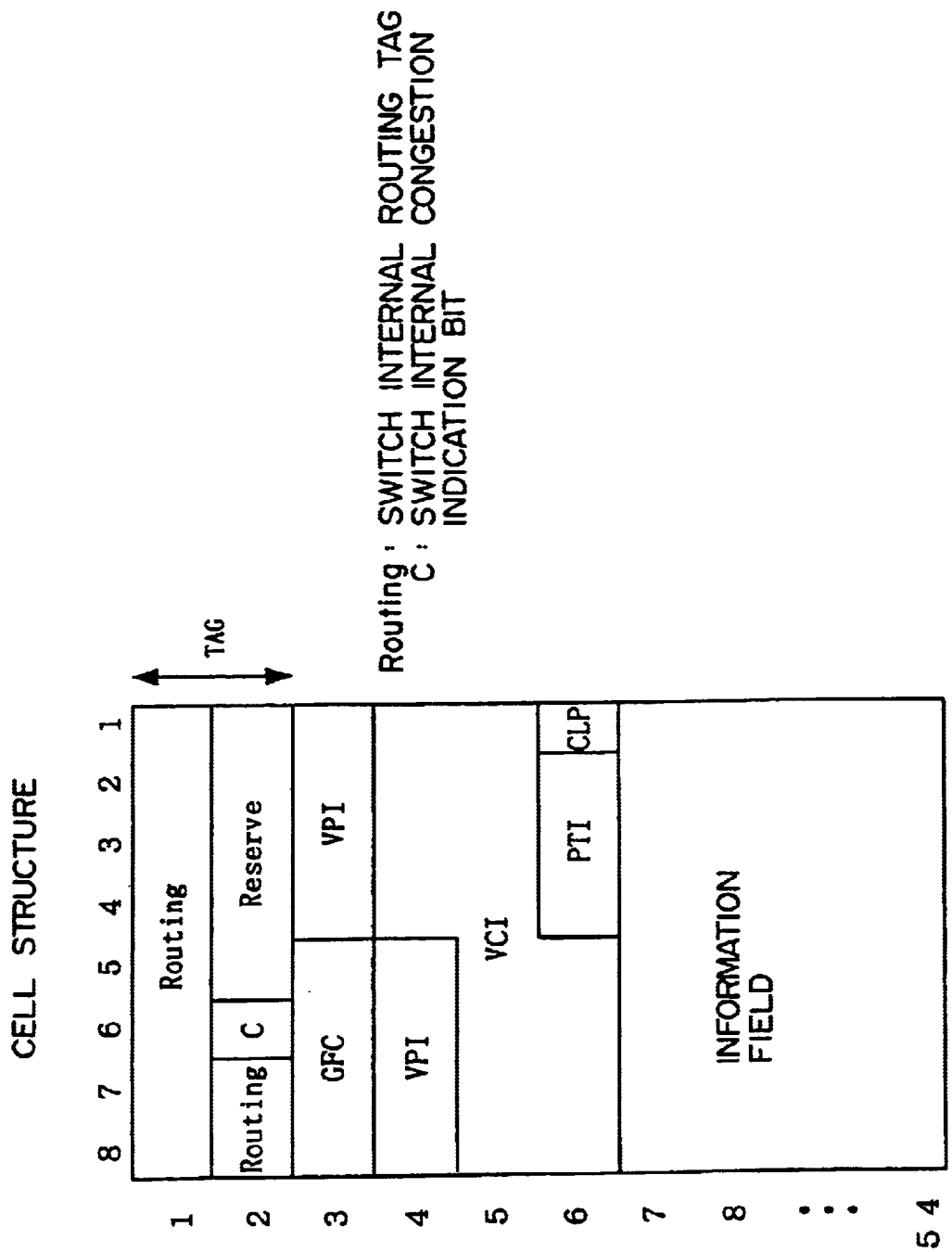
FIG. 32 is a schematic diagram showing the structure of a cell for use in the present invention.

FIG. 32 shows the data format of a cell with a routing tag attached. This data format includes a Routing field for a switch internal routing tag, a C field for a switch internal congestion indication bit, and a Reserve field which may be used for another purpose, in addition to the fields included in the data format shown in FIG. 23 or FIG. 26. This data format may be applied to a cell for use in the system shown in FIG. 21 or FIG. 30, and the rate changing unit 207 may be arranged in a portion after a switch in a channel designated by a routing tag, so that the above described rate changing process can be performed in the rate changing unit 207.

Provided next is the explanation about an embodiment of a communicating connection number counting method.

As described above, the specific method for calculating the ER in a switch supporting the control of the ER mode control in an ABR service, is not the target of standardization.

This specification refers to the example of the specific method for calculating the ER using the above described embodiment. The following operations are performed as the specific method for calculating the explicit rate ER in the above described embodiment (such as the one explained by referring to FIGS. 7 through 15), That is, an ABR connection in which at least one or more cells arrive at an ATM switch, is recognized as being active, the number of connections which are recognized as being active "Nvc" is observed in a period during which a predetermined number of cells arrive (or during a predetermined observation period), and a band Ba obtained by equally dividing a band B to be used for an ABR communication by Nvc, is defined as the explicit rate ER. FIGS. 7, 8, and 12 exhibit the system configuration for implementing this method. This specification refers to some other ER calculation methods, all of which observe the number of active connections in a predetermined observation period.

The above described embodiment also refers to the specific method for counting the number of active connections. An ATM switch comprises a table memory for storing active connections, and a counter for counting the number of active connections in an observation period. The table memory includes, for example, a field for an identifier of a connection which is recognized as being active, and a field for setting an identification flag bit.

FIG. 33 exemplifies the structure of the table memory. When a cell arrives, its connection identifier and identification flag bit are set, and at the same time, the counter is incremented to count the number of active connections. Note that, however, if the same connection identifier as that of the arrived cell is included in the table memory, the counter is not incremented.

The size of the above described table memory requires a capacity which enables storage of the maximum number of ABR connections which can be set in an ATM switch. If the observation period is designated as a period during which a predetermined number of active connections arrive, the observation period equivalent to a period in which the maximum number of ABR connections which can be set, or the number of ABR connections established at that time, must be designated. Assuming that 100 connections can be set, and those connections actually transmit cells (that is, the connections are active), they cannot be recognized as being active unless a period during which 100 cells arrive is set as the observation period. Similarly, (the maximum number of ABR connections which can be set or the number of ABR connections established at that time)×(cell time) must be set as the observation period, in the case in which the observation period is set at predetermined time intervals.

The number of active ABR connections in each observation period can be determined using the above described method. However, if the maximum number of ABR connections which can be set is large, the following two problems may arise. Provided below are these problems and their solutions.

(1) Delay of an ER Calculation Time Due to a Prolonged Observation Period

If connections whose number is equal to the maximum number of ABR connections which can be set in an ATM switch (hereinafter referred to as "M" connections) are communicating, the observation period must be a duration during which "M" cells arrive, in order to determine that all of the connections are active, as described above. As "M" increases, the observation period becomes longer. The observation period for observing at least "M" cells is also required to observe the "M" active connections, similarly with the method for observing connections in each predetermined observation period. Accordingly, the observation period must be made longer as "M" increases.

Considering the operations for calculating the explicit rate ER performed by a switch, the prolongment of the observation period means that an interval between ER calculation times becomes longer. That is, the interval between ER calculation times becomes longer due to the prolonged observation period because the ER is calculated each time one observation period elapses. Furthermore, it causes a delay in a notification to a terminal. As a result, rate control operations do not function effectively, and congestion may occur in the switch. To prevent such a delay of the ER calculation, the capability for calculating the ER in an observation period which is shorter than a specified observation period, that is, the capability for determining the number of active connections in a period shorter than the observation period, is required. This capability serves as also an effective method.

(2) Increase in the Amount of the Table Memory Capacity

If the maximum number "M" of ABR connections which can be set becomes large, there is a possibility that the size of memory is limited because of a restriction in terms of hardware configuration or cost, and the number of connections which can be set is restricted to a number equal to or less than "M". When the table memory becomes full during an observation period, no more active connections can be counted in this case. Therefore, the number of connections to be observed is underestimated in comparison with the actual number of active connections.

Because the explicit rate ER notified to a terminal is the value obtained by dividing an ABR band by the number of active connections, the value of the ER becomes larger than that of the ER calculated based on the actual number of active connections, in the case in which the number of active connections is underestimated. This is a dangerous value for a network side, and congestion can occur in a switch if a terminal to which this value is notified transmits cells at a rate according to this ER. Accordingly, the capability for determining the number of connections is required so that the resultant calculated value will be not dangerous to the network side, if the table memory becomes full.

To overcome the above described problems, an embodiment of the present invention, which will be described later, employs the following method.

(1) A Delay in the ER Calculation Time Due to a Prolonged Observation Period:

(a) Counting not the number of active connections in each predetermined observation period, but the number of active connections observed in a period from a first time point (the observation point) to a second time point retroactive to the first time point by a certain amount of time, in each period shorter than the predetermined observation period. With this operation, the number of active connections can be obtained at time intervals shorter than the specified observation period, thereby preventing a delay in the ER calculation time.

(b) Estimating the number of active connections to be observed by the termination time of an observation period, before that observation period terminates.

(c) Dividing an observation period into shorter periods, and estimating the number of active connections to be observed before each shorter observation period terminates, for each shorter period.

(d) Setting a coefficient for determining an estimated number, updating the estimating coefficient based on a comparison made between the estimated number of active connections and the actual number of active connections each time the observation period terminates, thereby decreasing an error between the estimated number and the actual number.

With the above described operations, the number of active connections can be obtained in each shorter observation period which is shorter than the designated observation period, thereby preventing the delay in the ER calculation.

(2) For an Increase in the Size of Table Memory (a) When the number of active connections stored in a table memory reaches the maximum number "L" of connections which can be stored (also referred to as the maximum number) (refer to FIG. 33) in the table during an observation period, the maximum number "M" of ABR connections which can be set is defined as the number of active connections during the observation period, at the termination of the observation period. Otherwise, the number of established ABR connections at that time point is defined as the number of active connections.

(b) When the number of active connections stored in the table memory during the observation period, reaches the maximum number "L" of the table, the number of active connections at the termination of the observation period is estimated based on the number of active connections (the maximum number of the table) up to that time point.

Provided below is the explanation about the specific example for implementing the above described method (the communicating connection number counting system). Note that this invention is basically used to calculate the ER in the ABR service, but it can be applied to a communication service which requires obtaining of the number of active connections, in addition to the ABR service.

Figure 34:
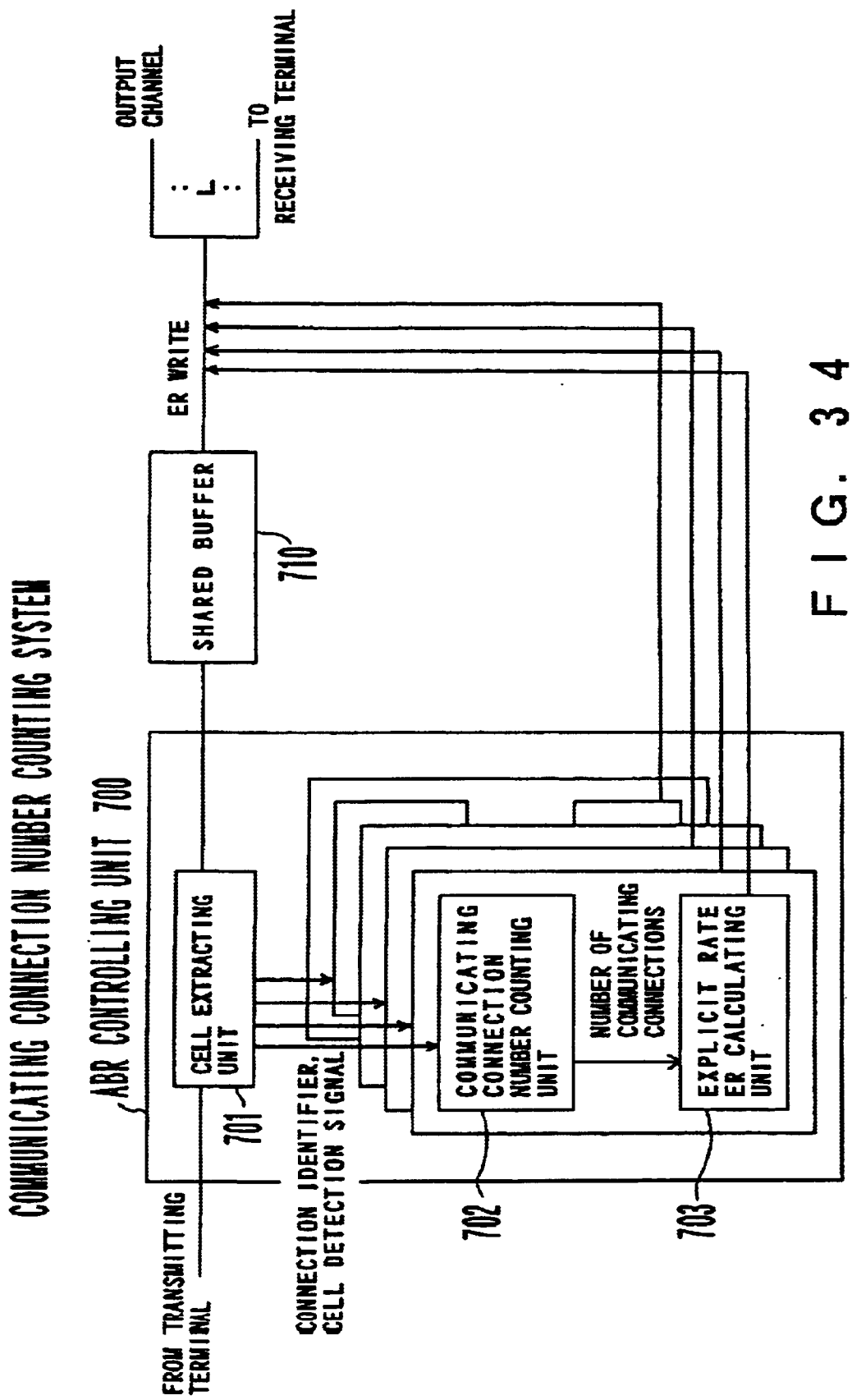
FIG. 34 is a schematic diagram showing the configuration of a communicating connection number counting system according to the present invention.

FIG. 34 is a schematic diagram showing the configuration of the communicating connection number counting system (also referred to as the counting system) according to the present invention. In the ABR service, the ER calculation is made at a point at which congestion can occur, in a switch. Accordingly, this counting system is applied to such a point. It is used to count the number of connections of cells passing through a cell buffer in which congestion can occur, that is, the number of active connections (hereinafter referred to as the number of communicating connections), and suitably divide and assign a band of an output channel for those connections.

As shown in FIG. 34, the counting system according to the present invention comprises an ABR controlling unit 700, and a shared buffer 710 having a capability similar to that of the shared buffers shown in FIGS. 71, 16, 22, 24, etc. The ABR controlling unit 700 comprises a cell extracting unit 701 for extracting a connection identifier from each cell prior to the shared buffer 710, a communicating connection number counting unit 702, and an explicit rate ER calculating unit 703. Since FIG. 34 shows the system configuration in the case in which cells proceeding to a plurality of output channels share a single buffer, a plurality of ABR controlling units 700 are arranged (this figure, however, shows only one of them). Each of the controlling units 700 counts the number of communicating connections corresponding to the plurality of output channels, and calculates the ER.

When receiving a cell from a transmitting terminal, the cell extracting unit 701 outputs a cell detection signal indicating that the cell is detected, to the communicating connection number counting unit 702, extracts a connection identifier from that cell, and outputs the extracted identifier to the communicating connection number counting unit 702. The communicating connection number counting unit 702 counts the number of communicating connections according to the method of the present invention, and outputs the result to the explicit rate ER calculating unit 703 (ER controlling unit). The explicit rate ER calculating unit 703 calculates the ER based on the counted number of communicating connections, and writes the result to that cell.

Provided first is the explanation about a method for overcoming the above described problem (1) of a delay in the ER calculation time due to a prolonged observation period. One method is to count the number of communicating connections of cells arrived in a period from a first time point till a second time point retroactive to the first time point, for each period shorter than a designated observation period. Its principle is presented below.

This method is divided into two types: that is, one type is that an observation period is set as a period during which a predetermined number of cells arrive, while the other is that the observation period is set as a fixed time (fixed cell time).

To implement these methods, the ABR controlling unit in the counting system comprises a plurality of pairs of the communicating connection number counting unit 702 and the explicit rate ER calculating unit 703, as shown in FIG. 34. Each of the pairs counts the number of active connections, and calculates the ER, at a timing depending on a different observation period.

Figure 35:
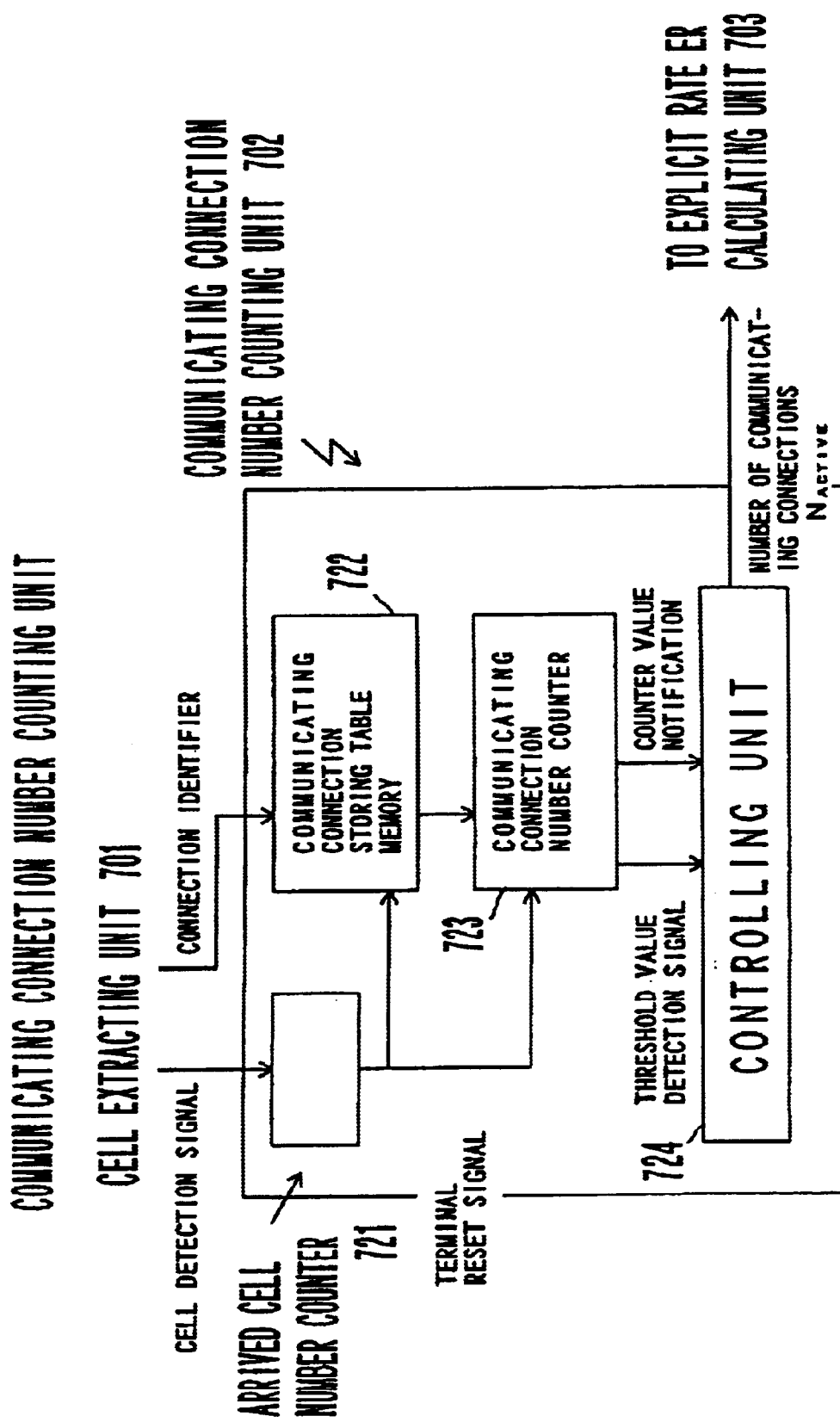
FIG. 35 is a schematic diagram showing the configuration of a communicating connection number counting unit according to the present invention.

FIG. 35 is a schematic diagram showing the structure of the communicating connection number counting unit 702.

As shown in this figure, the communicating connection number counting unit 702 comprises an arrived cell number counter 721, a communicating connection storage table memory 722, a communicating connection number counter 723, and a controlling unit 724. The arrived cell number counter 721 counts a predetermined number "Np" of arrived cells. The number of the above described pairs may be designated as, for example, "Np". If the observation period is designated as a fixed time, the arrived cell number counter 721 is replaced with a timer for measuring an observation time. The number of the above described pairs may be set to a number which eliminates any gap between observation periods. The communicating connection storage table memory 722 is composed of respective fields for setting a connection identifier and an identification flag bit, as shown in FIG. 33.

Once the observation period starts, the arrived cell number counter 721 is incremented, and at the same time, a connection identifier and an identification flag bit are set in the table memory 722, upon arrival of a cell. Furthermore, the connection number counter 723 is incremented, and the number of communicating connections is counted. If the connection identifier of the arrived cell is the same as that set in the table memory 722, that is, if the identification bit of that connection identifier is set, the value of the counter 723 is not incremented. When the value of the arrived cell number counter 721 reaches the predetermined number Np, one observation period terminates. Then, the value of the communicating connection number counter 723 is transmitted to the controlling unit 724, and the contents of the table memory 722 and the connection number counter 723 are cleared according to a termination reset signal from the arrived cell number counter 721.

When receiving this signal, the controlling unit 724 assigns the value of the counter 723 as the number of communicating connections $N_{ACTIVE}$ ($N_A$). The assigned value is notified to the ER calculating unit 703, which calculates the ER using this value until a next $N_{ACTIVE}$ value is notified.

Figure 36:
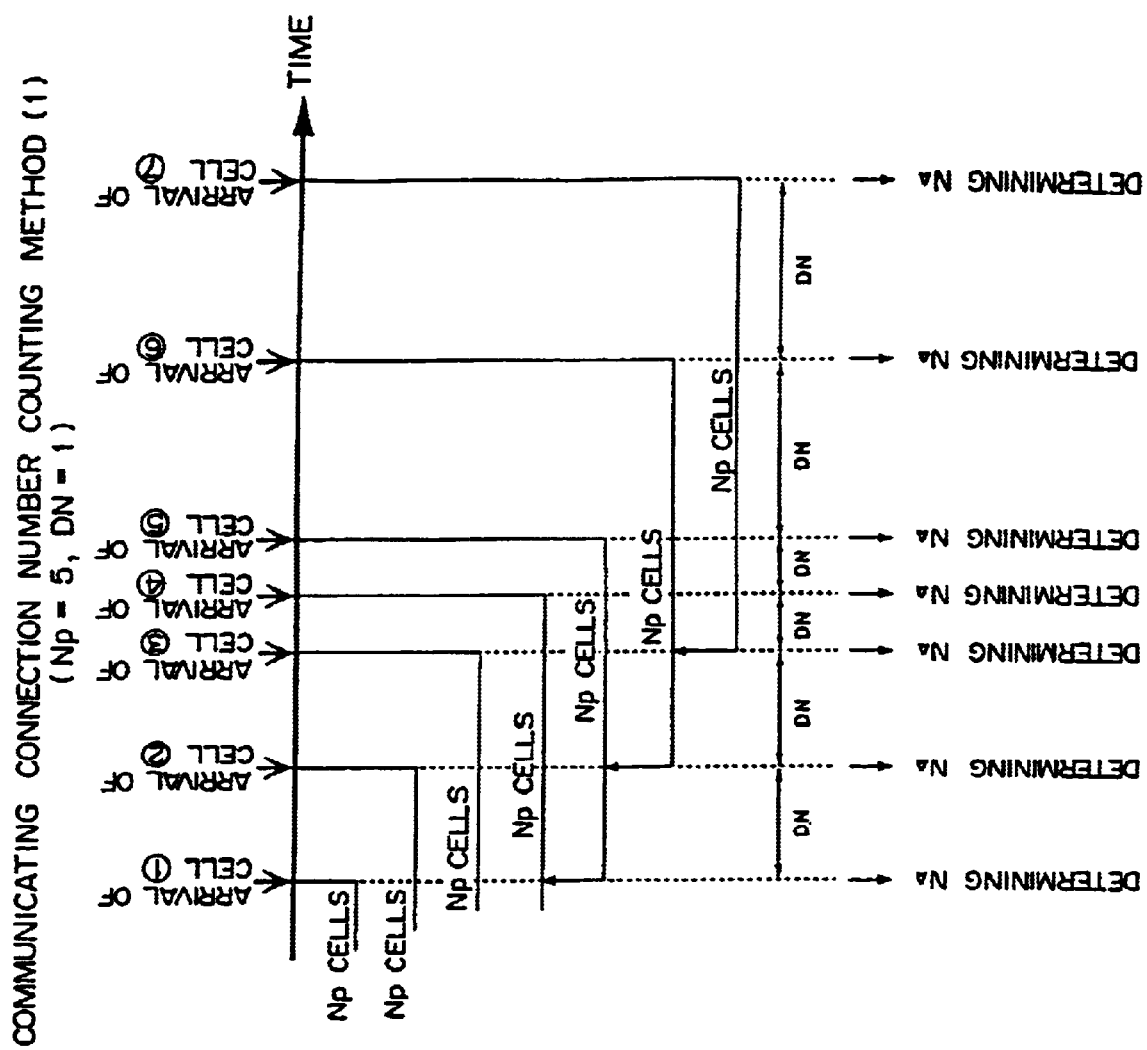
FIG. 36 is a schematic diagram showing a first communicating connection number counting method according to the present invention.

FIG. 36 is a schematic diagram showing the principle of the above described method in the case in which the observation period is designated as a period during which a predetermined number (Np=S) of cells arrive. Here, arrivals of cells (1) through (7) are indicated by arrows on a time axis. The number of connections is counted for Np=S cells arrived by the respective arrival time. By performing this count operation at each cell arrival (DN=1), the number of communicating connections can be obtained at each cell arrival time. For example, the number of connections is counted for 5 most-recently arrived cells (1) through (5), when the cell (5) arrives. Additionally, the number of connections is counted for 5 most-recently arrived cells, that is, the cells (2) through (6), when the next cell (6) arrives.

According to the system shown in FIG. 34, the number of communicating connections is determined each time one cell arrives (m=1). However, the number of communicating connections may be counted each time $DN \geq 2$ cells arrive. Assuming that the number of communicating connections is determined each time 5 cells arrive (m=5) according to the system shown in FIG. 34, an observation period Np=5, which is the same as the result of the conventional method for observing communicating connections in each observation period (Np=5).

Figure 37:
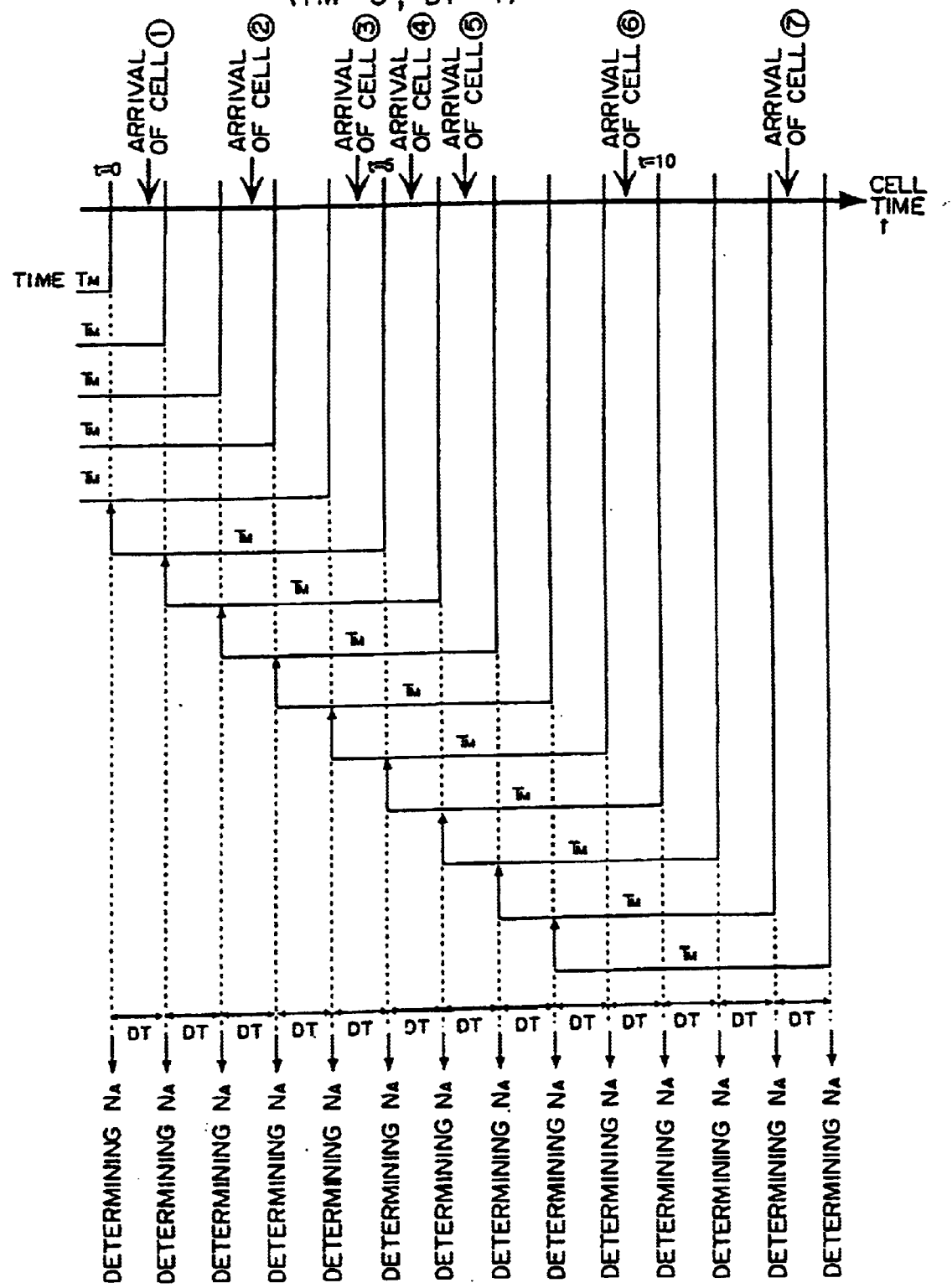
FIG. 37 is a schematic diagram showing a second communicating connection number counting method according to the present invention.

FIG. 37 is a schematic diagram explaining the method for counting the number of communicating connections in the case in which the observation period is designated as a fixed time interval (TM=S). Here, the observation period at fixed time intervals is represented by a cell time. Assuming that the processing speed of a device is 149.76 Mbits/s, one cell time is approximately 2.78 $\mu$sec. For an observation at fixed time intervals, the number of communicating connections is determined, not at each cell arrival time, but in each cell time (DT=1). Let it be supposed that the cell time t=5. The number of connections is counted for cells (1) through (3), arrived in 5 cell times in this case. Since most-recently arrived cells in the 5 cell times, are (2) through (4) at the next cell time t=6, the number of connections among these cells is counted. By repeating this operation at each cell time, the number of communicating connections can be obtained at each cell time. Additionally, the interval for determining the number of communicating connections may be set to an interval of $D \geq 2$ for an observation. Let it be supposed that DT=5 in FIG. 37. This interval becomes equal to the observation period TM=5, which results in being the same as the observation period TM=5 according to the conventional observation method.

Provided next is the explanation about a method for eliminating a delay in the ER calculation time, which is different from the above described method. According to this method, the number of communicating connections is determined using an estimate before a specified observation period is terminated. There are several methods for determining the number of communication connections based on an estimate. Provided below is the explanation about these methods. Estimates are made in the communicating connection number counting unit 702 shown in FIG. 34. With the method to be described later, only one pair of the communicating connection number calculating unit 702 and the explicit rate ER calculating unit 703 may be arranged in the ABR controlling unit 700.

(1) When the number of communicating connections reaches a certain threshold number "N" before a time TM elapses from an observation start time, based on the assumption that the observation period is designated as a fixed period TM, the number of communicating connections $N_{ACTIVE}$ after the time TM elapses is estimated as:

$$N_{ACTIVE} = \alpha \times N \times TM/T$$

where α is a suitable coefficient, and T is a period during which "N" communicating connections are observed from the start of the observation. This method is intended to estimate the number of communicating connections at the termination of an observation period, based on a ratio of a period during which a predetermined number of connections is counted, to an observation period. Furthermore, the estimated number can be modified by determining the coefficient α appropriately.

Figure 38:
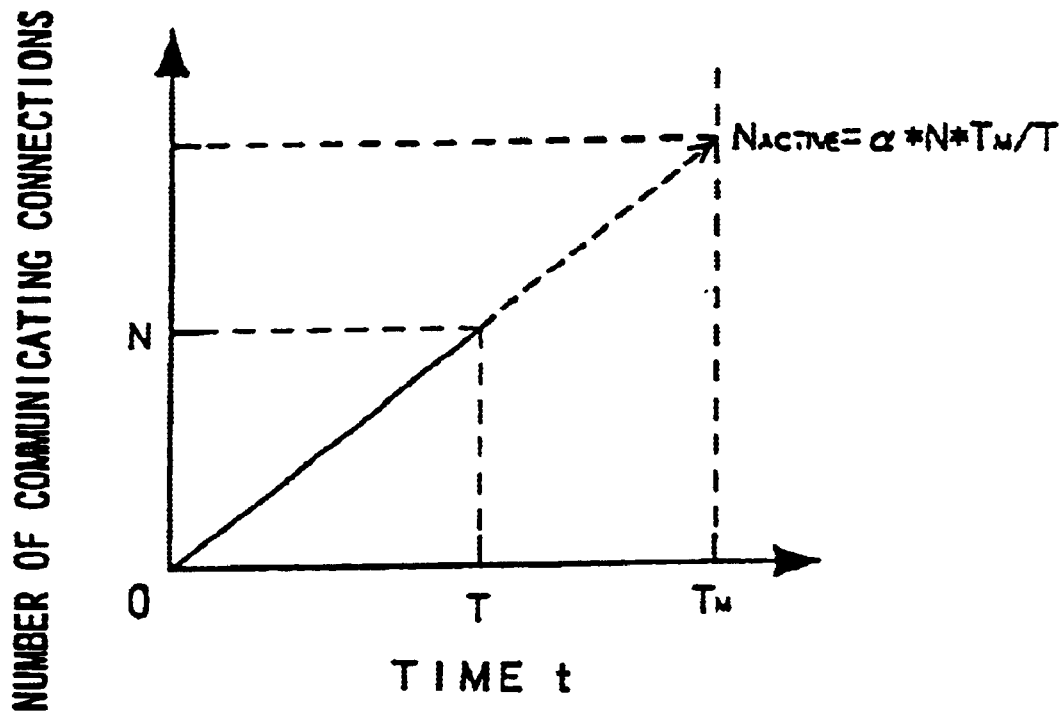
FIG. 38 is a schematic diagram showing the first example of a connection number counting method using an estimate according to the present invention.

FIG. 38 is a schematic diagram explaining the first method implemented by using such an estimate. As shown in this figure, the number of communicating connections after the time TM elapses is calculated by multiplying N by TM/T, and further by a modifying coefficient α (α=1 in this figure), at a time T at which the number of communicating connections reaches "N".

(2) Each time the number of communicating connections reaches a plurality of threshold values Nis (i=1, 2, 3,..., m) before the time TM elapses from an observation start, the number of communicating connections $N_{ACTIVE}$ after the time TM elapses, is estimated as:

$$N_{ACTIVE} = \alpha \times Ni \times TM/Ti$$

where Ti is a period during which "Ni" communicating connections are observed from the observation start. This method is intended to set a plurality of timings at which estimates are made, and estimate the number of communicating connections at the termination of the observation period each time the number of communicating connections exceeds a certain number of connections, based on the number of connections and elapsed time until that time.

Figure 39:
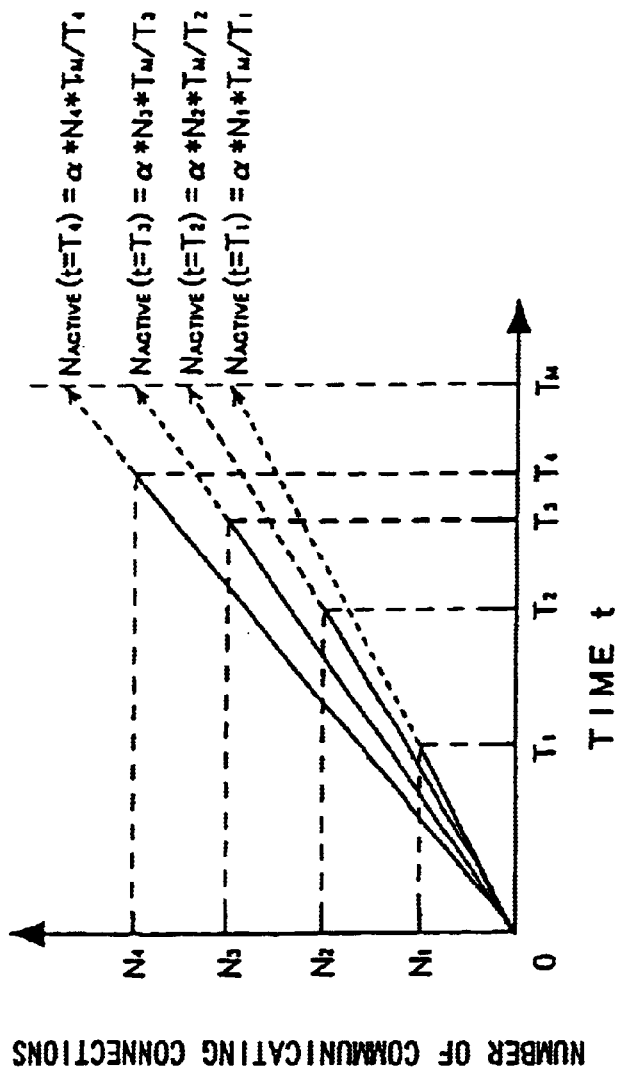
FIG. 39 is a schematic diagram showing the second example of the connection number counting method using an estimate according to the present invention.

FIG. 39 is a schematic diagram explaining the second method implemented by using an estimate. As shown in this figure, the number of communicating connections after the time TM elapses is calculated by multiplying Ni by TM/T, and further by a modifying coefficient α (α=1 in this figure), at a time Ti at which the number of communicating connections reaches "Ni".

(3) Assuming that the fixed observation period TM is divided into "n" periods, each of which is defined as Tk (k=1, 2, 3,..., n), and the number of connections recognized until a time Ti elapses from an observation start time is assumed to be "N", the number of commu nicating connections $N_{ACTIVE}$ after the time TM elapses from the observation start, at the time Ti is estimated as:

$$N_{ACTIVE} = \alpha \times N \times n$$

where α is a suitable coefficient. This method is intended to estimate the number of active connections at the termination of the observation period by dividing an observation period into "n" periods, and multiplying the number of communicating connections observed until a first divided period elapses. The estimated value can be modified by determining the coefficient α appropriately.

Figure 40:
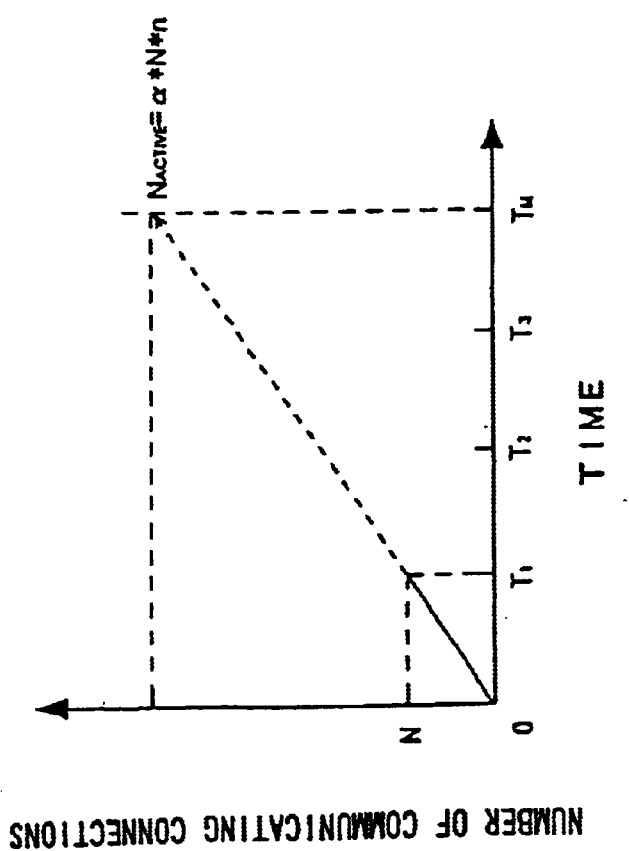
FIG. 40 is a schematic diagram showing the third example of the connection number counting method using an estimate according to the present invention.

FIG. 40 is a schematic diagram showing the third method implemented by using an estimate.

As shown in this figure, the number of communicating connections after the time TM elapses, is calculated by multiplying N by n, and further by a modifying coefficient α (α=1 in this figure).

(4) Assuming that the fixed observation period TM is divided into "n" periods, each of the divided periods is defined as Tk (k=1, 2, 3,..., n), the number of connections recognized after each Tk period elapses from an observation start time Nk, and the number of communicating connections after the time TM elapses from the observation start, is estimated as:

$$N_{ACTIVE} = Nk + (Nk - N_{k-1}) \times (n-k)$$

This method is intended to divide an observation period into shorter periods, calculates a slope of the number of connections based on the number of communicating connections counted until each of the shorter periods elapses, and the number of communicating connections counted in the preceding period, and estimate the number of communicating connections based on the slope.

FIG. 41 is a schematic diagram explaining the fourth method implemented by using this estimate.

(5) The coefficient α is obtained by performing a normal observation (for each observation period TM) simultaneously with the calculation of the number of communicating connections using an estimate, according to (1) and (3), and making a comparison between the value of the observation and the estimated value for each TM. This process allows the change of the modifying coefficient α suitable for each observation period, to change, and a more accurate estimate of the number of connections.

Provided next is the explanation about the method for working around the above described increase of the size of table memory.

FIG. 42 shows the structure of the communicating connection number counting unit 702.

The communicating connection number counter 702 comprises a arrived cell number counter 731 for counting the predetermined number "Np" of arrived cells, a communicating connection storage table memory 732, a communicating connection number counter 733 for counting the number of communicating connections, and a controlling unit 734. Provided here is the explanation about the case in which an observation period is designated as an arrival interval of cells whose number is predetermined. If the observation period is designated as a fixed period, the arrived cell number counter 731 is replaced with a timer for measuring the observation time. The communicating connection storage table memory 732 is composed of respective fields for setting a connection identifier and an identification flag bit of a connection which is recognized as being active (refer to FIG. 33). The maximum number of connections which can be stored in the table is represented as "L".

When a cell arrives after the observation period starts, the arrived cell number counter 731 is incremented and the connection identifier and the identification flag are set in the table. In addition, the communicating connection number counter 733 is incremented to count the number of communicating connections. However, if the connection identifier which is the same as that of the arrived cell is included in the communicating connection storage table memory 732, that is, the identification bit of that connection identifier has been set, the counter value is not incremented. Normally, one observation period is terminated when the arrived cell number counter 731 reaches "Np". The value of the communicating connection number counter 733 is then transmitted to the controlling unit 734, and the contents of the communicating connection number storage table memory 732 and the communicating connection number counter 733 are cleared according to a termination reset signal from the arrived cell number counter 731. If the value of the communicating connection number counter 733 becomes equal to "L", a threshold value detection signal for notifying that the counter value exceeds the threshold value is transmitted to the controlling unit 734.

Upon receipt of this signal, the controlling unit 734 sets the maximum number of ABR connections which can be set "M" in a channel, which is provided in advance, and targeted by the ER calculating unit, as the number of communication connections $N_{ACTIVE}$, or sets the number of ABR connections established at that time, as $N_{ACTIVE}$. The number of established ABR connections, for example, is managed by software, and notified to the ER calculating unit via the software. The set value of $N_{ACTIVE}$ is notified to the ER calculating unit 703, which calculates the ER using this value until the next $N_{ACTIVE}$ value is notified.

The operations of the controlling unit 734 shown in FIG. 42 vary depending on either in the case in which the maximum number of ABR connections which can be set or the number of established connections, is set as $N_{ACTIVE}$ when the value of the communicating connection number counter 733, reaches the threshold value "L", or in the case in which the value calculated with any of the above described methods using an estimate, is set as $N_{ACTIVE}$.

FIG. 43 is a schematic diagram explaining the operations performed by the controlling unit 734 in the case in which the maximum number of ABR connections which can be set or the number of established connections as $N_{ACTIVE}$.

As shown in this figure, the controlling unit 734 determines the maximum number of ABR connections which can be set and managed by software of an upper (a higher) level, or the number of established connections, as $N_{ACTIVE}$, when receiving a threshold control signal indicating that the value of the communicating connection number counter 733 exceeds the threshold value "L", and notifies the value of $N_{ACTIVE}$ to the ER calculating unit.

Figure 44:
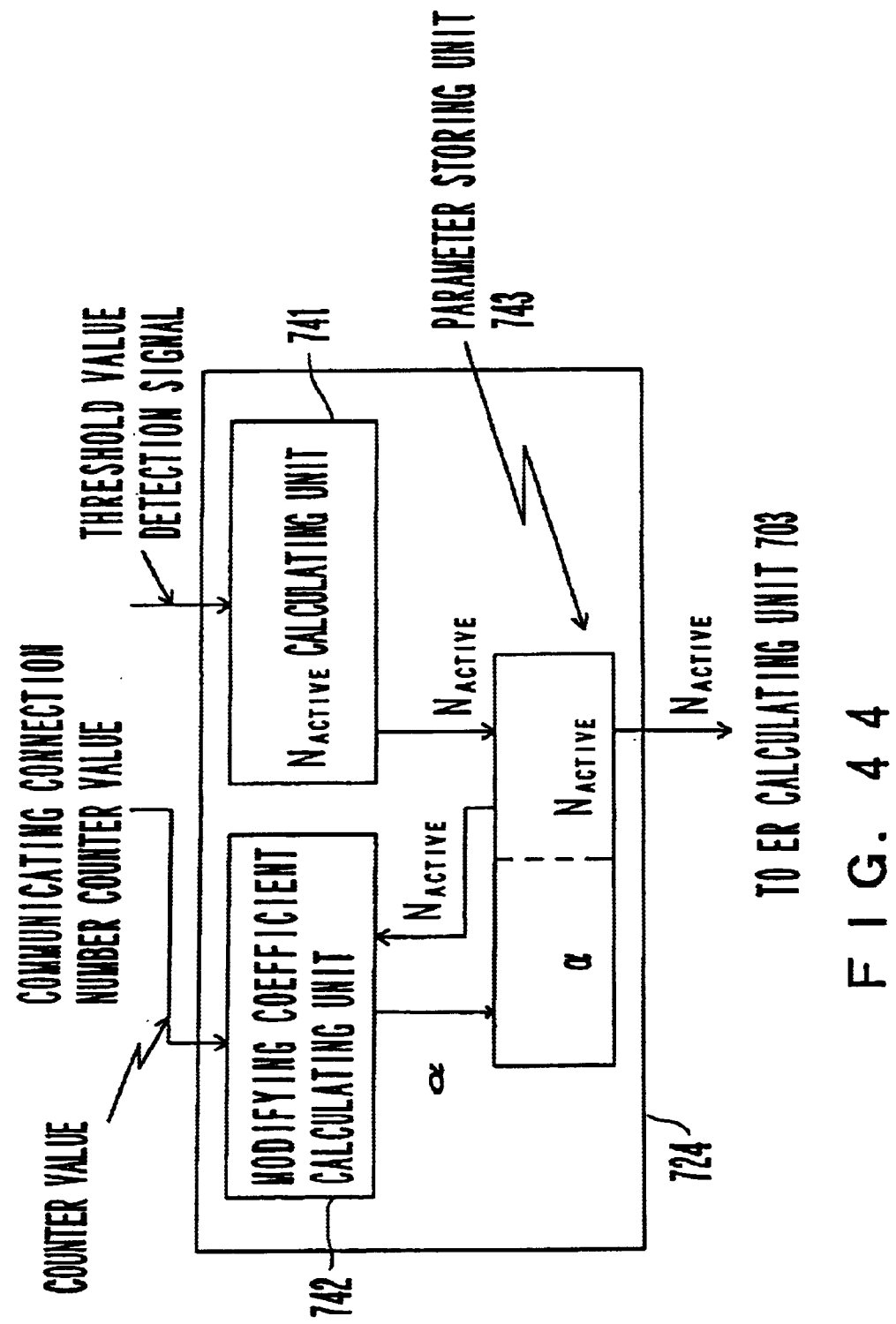
FIG. 44 is a schematic diagram showing the second process performed by the controlling unit according to the present invention.

FIG. 44 is a schematic diagram explaining the operations performed by the controlling unit 734 in the case in which an estimated value is used as $N_{ACTIVE}$. As shown in this figure, the controlling unit 734 comprises an $N_{ACTIVE}$ calculating unit 741, a modifying coefficient calculating unit 742, and a parameter storing unit 743.

The $N_{ACTIVE}$ calculating unit 741 calculates and determines the number of communicating connections $N_{ACTIVE}$ from a time point at which an observation starts till a time point at which a time TM elapses (or till a time point at which Np cells arrive). The modifying coefficient calculating unit 742 calculates the modifying coefficient α each time an observation period terminates. The parameter storing unit 743 stores the calculated $N_{ACTIVE}$ and the modifying coefficient α.

When the threshold value detection signal indicating that the value of the communicating connection number counter exceeds the threshold value "L", is transmitted from the counter, the $N_{ACTIVE}$ calculating unit 741 that detects this signal calculates $N_{ACTIVE}$ according to the above described estimating methods (1) through (4). The calculated $N_{ACTIVE}$ value is transmitted to the ER calculating unit 703, and stored in the parameter storing unit 743 at the same time. When the value of the communicating connection number counter is notified to the modifying coefficient calculating unit 742 as the actual number of communicating connections during an observation period, the modifying coefficient calculating unit 742 extracts the value of $N_{ACTIVE}$ from the parameter storing unit 743, and determines the modifying coefficient α based on the number of communicating connections, that is, the value of $N_{ACTIVE}$. For example, the following equation can be used as this determination method.

$$\alpha = N_{REAL}/N_{ACTIVE}$$

where $N_{REAL}$ is the number of communicating connections, which is notified from the communicating connection number counter 733. The modifying coefficient α so determined is stored in the parameter storing unit 743, and used for the estimating calculation of $N_{ACTIVE}$.

According to the above described method, there is a possibility that the number of communicating connections $N_{ACTIVE}$ is estimated as a number larger than the actual number of communicating connections. Since the value of the ER is obtained by dividing a band of an output channel by the number of communicating connections, and used as the rate for permitting an ABR terminal to perform a transmission, the value of the ER calculated based on the number of communicating connections, which is estimated as a value larger than the actual number, is a safe value, but it might degrade the use efficiency of a network. To avoid this phenomenon, $N_{ACTIVE}$ at the time of the termination of an observation period is calculated according to the above described method using an estimate, when the number of communicating connections, which is stored in the table memory, reaches the maximum value "L" during a communication. With this operation, the number of communicating connections can be prevented from being overestimated. This $N_{ACTIVE}$ calculation using an estimate is performed in the controlling unit 734 of the communicating connection number counting unit 702 shown in FIG. 42. If the value of $N_{ACTIVE}$ obtained by using this estimate exceeds the maximum number "M" of ABR connections which can be set or the number of established ABR connections, these values are set as $N_{ACTIVE}$.

Figure 45:
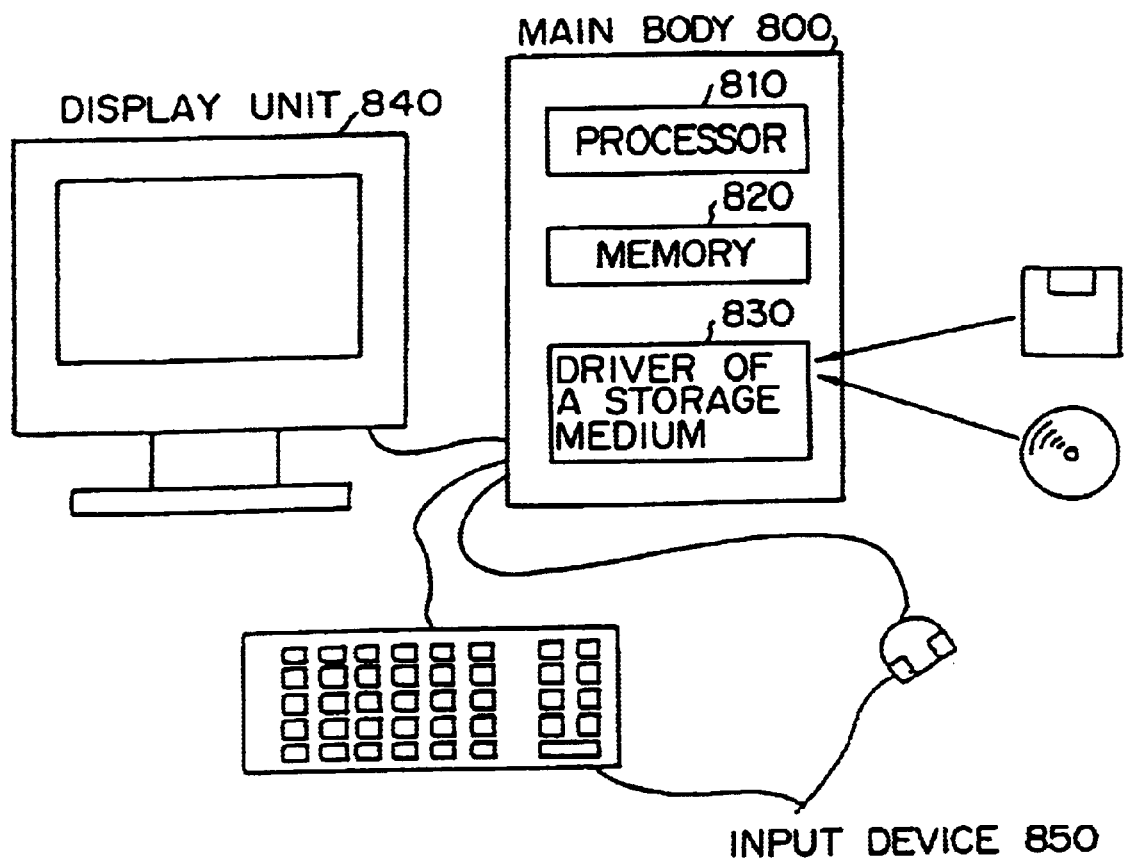
FIG. 45 exemplifies a computer system for implementing the method of the present invention by using a storage medium of the present invention.

FIG. 45 exemplifies a computer system for executing programs in the case in which the methods according to the present invention, such as the above described delay time measuring method, allowed transmission rate determining method, ATM switching method, and communicating connection number counting method, etc. are stored as computer programs in a storage medium.

This computer system comprises a main body 800, display unit 840, and an input device 850 composed of a keyboard and a mouse. The main body 800 includes a processor 810, memory 820, and a driver of a storage medium 830.

The processor 810 executes the methods of the present invention according to the above described programs, while the memory 820 stores those programs and the data required for executing the programs. The driver 830 is intended to load the programs and data stored in an external storage medium into the processor 810 or the memory 820. If the storage medium of the present invention is an external storage medium, the programs stored in the storage medium are executed via the driver 830. The input device 850 is used by a user, in order to make an entry required for executing the programs.

If the storage medium of the present invention is an external storage medium, it may be implemented by an optical disk such as a CD-ROM, magnetic disk such as a floppy disk, and a magneto-optical disk such as an MD. Additionally, the storage medium of the present invention may be implemented as an internal storage medium such as a hard disk, ROM, RAM, etc.

According to the present invention, a delay time between a switch and a terminal is measured in an ATM network performing an ABR communication, and suitable values can be set as delay parameters for a UPC. With these operations, cells flowing from a transmitting terminal into the network can be accurately monitored in the ABR communication, thereby preventing the quality of the communication from degrading.

Additionally, a connection at which at least one cell arrives during an observation period is recognized as being active in an ATM network using an ABR service, and an allowed transmission rate is obtained by dividing a band of an output channel by the number of active connections corresponding to the output channel, according to the present invention. Therefore, a faster allowed transmission rate can be provided to an output channel whose number of active connections is small. If the number of active connections becomes larger, the allowed transmission rate can be lowered, accordingly, the prevention of congestion, and the recovery from congestion can quickly be made. As a result the ABR service can be provided efficiently.

Furthermore, only the capability for setting congestion indication information in a user data cell is arranged in a switching unit in a cell switch, the capability for calculating an explicit rate, which requires a considerable amount of time, is arranged in a low-speed transmission channel whose switching speed of cells is relatively low, the explicit rate calculated in the low-speed transmission channel is changed based on the setting status of the congestion indication information, and the changed explicit rate is assigned to a resource management cell, according to the present invention. With these operations, hardware restrictions can be avoided, and at the same time, the congested state of the switching unit can be properly reflected on the explicit rate assigned to the resource management cell.

As a result, a service such as the ABR service can be accommodated in a large-scale ATM switching system.

Still further, the explicit rate is notified from a rate calculating unit to a rate changing unit via the resource management cell, thereby notifying the rate efficiently.

Still further, the rate changing unit smooths the setting ratio of detected congestion indication information based on the setting ratio detected before and after that ratio, and changes the explicit rate based on the smoothed setting ratio, thereby preventing a traffic in a network from becoming unstable due to an extreme change in the explicit rate.

With the communicating connection number counting method according to the present invention, the number of communicating connections can be obtained in a period shorter than a specified observation period, even if the observation period for counting the number of communicating connections becomes longer due to the maximum number of connections which can be set by an ATM switch, in the switch required to count the number of communicating connections, thereby shortening a delay of the ER calculation in the ABR service. Still further, the suitable number of communicating connections can be determined if the size of a memory storing communicating connections is restricted to the number equal to or less than the maximum number of connections which can be set, thereby preventing the result of the ER calculation in the ABR communication from becoming a dangerous value for the network.

What is claimed is:

1. A controlling method for notifying an allowed transmission rate to a terminal in an ATM network, comprising the steps of:

obtaining a number of active connections in which more than one cells arrive during an observation period, in correspondence with an output channel;

obtaining a value by dividing a band of the output channel by the number of active connections, and defining the value as the allowed transmission rate;

notifying the allowed transmission rate to the terminal, and setting a threshold value for a memory which temporarily stores cells from a transmitting terminal, setting a decreasing coefficient in correspondence with the threshold value, and notifying a value obtained by multiplying the allowed transmission rate by the decreasing coefficient corresponding to the threshold value, to the terminal, when an amount of cells stored in the memory exceeds the threshold value.

2. The controlling method according to claim 1, further comprising the step of:

notifying the allowed transmission rate to the terminal as the minimum cell rate, when the amount of cells stored in the memory exceeds a certain threshold value.

3. The controlling method according to claim 1, further comprising the step of:

setting a threshold value for an address management memory managing addresses of the memory which temporarily stores the cells from the transmitting terminal, setting a decreasing coefficient in correspondence with the threshold value, and notifying a value obtained by multiplying the allowed transmission rate by the decreasing coefficient corresponding to the threshold value, when an amount of cells stored in the address management memory exceeds the threshold value.

4. The controlling method according to claim 3, further comprising the step of:

notifying the allowed transmission rate to the terminal as the minimum cell rate, when the amount of cells stored in the address management memory exceeds a certain threshold value.

5. The controlling method according to claim 1, wherein:

a number of arrived cells is counted in correspondence with an output channel, and a period during which a predetermined number of cells arrive, is designated as the observation period.

6. The controlling method according to claim 1, wherein:

the observation period is designated as a fixed period.

7. A controlling method for notifying an allowed transmission rate to a terminal in an ATM network, comprising the steps of:

obtaining a number of active connections in which more than one cells arrive during an observation period, in correspondence with an output channel;

calculating the allowed transmission rate by subtracting a value which is a total of minimum cell rates of the active connections corresponding to the output channel from a band of the output channel, dividing the result of the subtraction by the number of active connections, and adding the minimum cell rate corresponding to each of the active connections to the divided value; and notifying the allowed transmission rate to the terminal.

8. A controlling system for notifying an allowed transmission rate to a terminal in an ATM network, comprising:

a memory for temporarily storing cells transmitted from a transmitting terminal;

allowed transmission rate calculating means for calculating the allowed transmission rate in correspondence with an output channel;

an address management memory for managing addresses of cells stored in said memory;

congestion detection controlling means for detecting congestion based on one of an amount of storage of said address management memory and an amount of storage of said memory; and assigning means for writing one of the allowed transmission rate received from said allowed transmission rate calculating means, and a value obtained by lowering the allowed transmission rate according to a congestion notification signal received from said congestion detection controlling means, to a control cell, in order to notify the allowed transmission rate to the terminal, wherein said allowed transmission rate calculating means obtains a number of active connections in which more than one cells arrive during an observation period, in correspondence with an output channel, and calculates the allowed transmission rate by dividing a band of the output channel by the obtained number.

9. The controlling system according to claim 8, wherein said allowed transmission rate calculating means comprises:

an arrived cell number counter for counting a number of arrived cells in correspondence with the output channel, and defining a time point at which the counted number reaches a predetermined number, as a termination of the observation period;

an active table to which a connection identifier of an arrived cell, which corresponds to the output channel, is written;

an active number counter for counting the connection identifier, which corresponds to the output channel, and is written to the active table, and obtaining a number of active connections; and allowed transmission rate calculation controlling means for calculating the allowed transmission rate by dividing the band of the output channel by the number of active connections counted by said active number counter in correspondence with the output channel for which said arrived cell number counter counts the predetermined number.

10. The controlling system according to claim 9, wherein said allowed transmission rate calculating means comprises:

total MCR calculation controlling means for outputting a total MCR value by adding a minimum cell rate of an active connection corresponding to the output channel;

an active VC number counter for obtaining the number of active connections during the observation period; and allowed transmission rate calculation controlling means for calculating the allowed transmission rate by subtracting the total MCR value obtained by said total MCR calculation controlling means for the observation period, from the band of the output channel, dividing the subtracted value by the number of active connections, and adding the minimum cell rate corresponding to the connection, to the divided value.

11. The controlling system according to claim 8, wherein said assigning means comprising:

a change parameter table in which a plurality of threshold values for one of the amounts of storage of said address management memory and said memory, and decreasing coefficients corresponding to the plurality of threshold values, are set; and calculating means for multiplying the allowed transmission rate from said allowed transmission rate calculating means, by one of the decreasing coefficients read from said change parameter table, based on information conveying that one of the amount of cells stored in said address management memory and the amount of storage of said memory exceeds one of the plurality of threshold values.

12. A computer-readable storage medium for storing a program which executes a controlling capability for notifying an allowed transmission rate to a terminal, the controlling capability comprising the steps of:

obtaining a number of active connections in which more than one cells arrive during an observation period, in correspondence with an output channel;

obtaining a value by dividing a band of the output channel by the number of active connections, and defining the value as the allowed transmission rate;

notifying the allowed transmission rate to the terminal; and setting a threshold value for a memory which temporarily stores cells from a transmitting terminal, setting a decreasing coefficient in correspondence to the threshold value, and notifying a value obtained by multiplying the allowed transmission rate by the decreasing coefficient corresponding to the threshold value, to the terminal when an amount of cells stored in the memory exceeds the threshold value.

13. The storage medium according to claim 12, further comprising the step of:

notifying the allowed transmission rate to the terminal as the minimum cell rate, when the amount of cells stored in the memory exceeds a certain threshold value.

14. The storage medium according to claim 12, further comprising the step of:

setting a threshold value for an address management memory managing addresses of the memory which temporarily stores cells from a transmitting terminal, setting a decreasing coefficient corresponding to the threshold value, and notifying a value obtained by multiplying the allowed transmission rate by the decreasing coefficient corresponding to the threshold value, to the terminal when an amount of cells stored in the address management memory exceeds the threshold value.

15. The storage medium according to claim 14, further comprising the step of:

notifying the allowed transmission rate to the terminal as the minimum cell rate, when the amount of cells stored in the address management memory exceeds a certain threshold value.

16. The storage medium according to claim 12, wherein a number of arrived cells is counted in correspondence with the output channel, and a period during which a predetermined number of cells arrive, is designated as the observation period.

17. The storage medium according to claim 12, wherein the observation period is designated as a fixed period.

18. A computer-readable storage medium for storing a program which executes a controlling capability for notifying an allowed transmission rate to a terminal, the controlling capability comprising the steps of:

obtaining a number of active connections in which more than one cells arrive during an observation period, in correspondence with an output channel;

calculating the allowed transmission rate by subtracting a minimum cell rate of an active connection corresponding to the output channel, dividing the subtracted result by the number of active connections, and adding the minimum cell rate corresponding to the connection to the divided value; and notifying the allowed transmission rate to the terminal.

* * * * *

UNITED STATES PATENT AND TRADEMARK OFFICE
CERTIFICATE OF CORRECTION

PATENT NO.    : 6,671,257 B1
DATED         : December 30, 2003
INVENTOR(S)   : T. Soumiya et al.

It is certified that error appears in the above-identified patent and that said Letters Patent is hereby corrected as shown below:

<u>Title page</u>,
Item [62], Related U.S. Application Data, please change the Filing Date to read:
-- March 7, 1997 --

Signed and Sealed this

Thirteenth Day of April, 2004

JON W. DUDAS
*Acting Director of the United States Patent and Trademark Office*